(12) United States Patent
Yu

(10) Patent No.: US 11,244,364 B2
(45) Date of Patent: Feb. 8, 2022

(54) UNIFIED MODELING OF TECHNOLOGY TOWERS

(71) Applicant: Apptio, Inc., Bellevue, WA (US)

(72) Inventor: Kiuk Yu, Bellevue, WA (US)

(73) Assignee: Apptio, Inc., Bellevue, WA (US)

( * ) Notice: Subject to any disclaimer, the term of this patent is extended or adjusted under 35 U.S.C. 154(b) by 0 days.

(21) Appl. No.: 14/180,308

(22) Filed: Feb. 13, 2014

(65) Prior Publication Data
US 2015/0227991 A1 Aug. 13, 2015

(51) Int. Cl.
G06Q 30/02 (2012.01)
G06Q 10/06 (2012.01)

(52) U.S. Cl.
CPC ....... *G06Q 30/0283* (2013.01); *G06Q 10/067* (2013.01)

(58) Field of Classification Search
CPC ... G06Q 10/067; G06Q 10/101; G06Q 10/103
USPC .......................................... 705/300–301, 348
See application file for complete search history.

(56) References Cited

U.S. PATENT DOCUMENTS

| 4,744,026 | A | 5/1988 | Vanderbei |
|---|---|---|---|
| 5,249,120 | A | 9/1993 | Foley |
| 5,615,121 | A | 3/1997 | Babayev et al. |
| 5,721,919 | A | 2/1998 | Morel et al. |
| 5,758,327 | A | 5/1998 | Gardner et al. |
| 5,799,286 | A | 8/1998 | Morgan et al. |
| 5,802,508 | A | 9/1998 | Morgenstern |
| 5,903,453 | A | 5/1999 | Stoddard, II |
| 5,970,476 | A | 10/1999 | Fahey |
| 5,991,741 | A | 11/1999 | Speakman et al. |
| 6,014,640 | A | 1/2000 | Bent |
| 6,032,123 | A | 2/2000 | Jameson |
| 6,047,290 | A | 4/2000 | Kennedy et al. |
| 6,208,993 | B1 | 3/2001 | Shadmon |

(Continued)

FOREIGN PATENT DOCUMENTS

JP 2011134268 A 7/2011

OTHER PUBLICATIONS

US 5,649,211 A, 04/1997, Horkin et al. (withdrawn)
(Continued)

*Primary Examiner* — Andrew B Whitaker
(74) *Attorney, Agent, or Firm* — John W. Branch; Branch Partners PLLC

(57) ABSTRACT

Embodiments are directed toward unified modeling of technology towers. Template information that corresponds to a technology tower may be selected by a user such that the template information identifies cost items, cost pools, and cost drivers. Cost information corresponding to the cost items may be determined from a dataset and mapped to the cost pools based on the template information. Cost driver information for the cost drivers may be determined from the information that was included in the dataset. A technology tower may be generated based on the cost pools and the cost drivers such that the cost pools and cost drivers correspond to the cost items. The technology tower may be provided to an application for generating one or more financial models. Key performance indicators for cost items may be generated based on the cost pools and the cost drivers.

30 Claims, 47 Drawing Sheets

(56) References Cited

U.S. PATENT DOCUMENTS

| | | |
|---|---|---|
| 6,249,769 B1* | 6/2001 | Ruffin ............... G06Q 10/06 705/7.13 |
| 6,253,192 B1 | 6/2001 | Corlett et al. |
| 6,308,166 B1 | 10/2001 | Breuker et al. |
| 6,321,207 B1 | 11/2001 | Ye |
| 6,330,652 B1 | 12/2001 | Farrar et al. |
| 6,424,969 B1 | 7/2002 | Gruenwald |
| 6,507,825 B2 | 1/2003 | Suh |
| 6,578,005 B1 | 6/2003 | Lesaint et al. |
| 6,594,672 B1 | 7/2003 | Lampson et al. |
| 6,647,370 B1 | 11/2003 | Fu et al. |
| 6,738,736 B1 | 5/2004 | Bond |
| 6,789,252 B1 | 9/2004 | Burke et al. |
| 6,832,212 B1 | 12/2004 | Zenner et al. |
| 6,839,719 B2 | 1/2005 | Wallace |
| 6,877,034 B1 | 4/2005 | Machin et al. |
| 6,882,630 B1 | 4/2005 | Seaman |
| 6,965,867 B1 | 11/2005 | Jameson |
| 6,983,321 B2 | 1/2006 | Trinon et al. |
| 7,050,997 B1 | 6/2006 | Wood, Jr. |
| 7,130,822 B1 | 10/2006 | Their et al. |
| 7,149,700 B1 | 12/2006 | Munoz et al. |
| 7,177,850 B2 | 2/2007 | Argenton et al. |
| 7,263,527 B1 | 8/2007 | Malcolm |
| 7,305,491 B2 | 12/2007 | Miller et al. |
| 7,308,427 B1 | 12/2007 | Hood |
| 7,321,869 B1 | 1/2008 | Phibbs, Jr. |
| 7,386,535 B1 | 6/2008 | Kalucha et al. |
| 7,418,438 B2 | 8/2008 | Gould et al. |
| 7,505,888 B2 | 3/2009 | Legault et al. |
| 7,590,937 B2 | 9/2009 | Jacobus et al. |
| 7,634,431 B2 | 12/2009 | Stratton |
| 7,653,449 B2 | 1/2010 | Hunter et al. |
| 7,664,729 B2 | 2/2010 | Klein et al. |
| 7,703,003 B2 | 4/2010 | Payne et al. |
| 7,725,343 B2 | 5/2010 | Johanson et al. |
| 7,742,961 B2 | 6/2010 | Aaron et al. |
| 7,752,077 B2 | 7/2010 | Holden et al. |
| 7,761,548 B2 | 7/2010 | Snyder et al. |
| 7,769,654 B1 | 8/2010 | Hurewitz |
| 7,774,458 B2 | 8/2010 | Trinon et al. |
| 7,783,759 B2 | 8/2010 | Eilam et al. |
| 7,801,755 B2 | 9/2010 | Doherty et al. |
| 7,805,400 B2 | 9/2010 | Teh et al. |
| 7,813,948 B2 | 10/2010 | Ratzloff |
| 7,852,711 B1 | 12/2010 | Fitzgerald et al. |
| 7,870,051 B1 | 1/2011 | En et al. |
| 7,877,742 B2 | 1/2011 | Duale et al. |
| 7,899,235 B1 | 3/2011 | Williams et al. |
| 7,917,555 B2 | 3/2011 | Gottumukkala et al. |
| 7,930,396 B2 | 4/2011 | Trinon et al. |
| 7,933,861 B2 | 4/2011 | Zadorozhny |
| 7,945,489 B2 | 5/2011 | Weiss et al. |
| 7,966,235 B1 | 6/2011 | Capelli et al. |
| 7,966,266 B2 | 6/2011 | Delvat |
| 8,010,584 B1 | 8/2011 | Craver et al. |
| 8,024,241 B2 | 9/2011 | Bailey et al. |
| 8,073,724 B2 | 12/2011 | Harthcryde et al. |
| 8,121,959 B2 | 2/2012 | Delvat |
| 8,175,863 B1 | 5/2012 | Ostermeyer et al. |
| 8,195,524 B2 | 6/2012 | Sandholm et al. |
| 8,195,785 B2 | 6/2012 | Snyder et al. |
| 8,200,518 B2 | 6/2012 | Bailey et al. |
| 8,200,561 B1 | 6/2012 | Scott et al. |
| 8,209,218 B1* | 6/2012 | Basu et al. .................. 705/7.39 |
| 8,214,829 B2 | 7/2012 | Neogi et al. |
| 8,260,959 B2 | 9/2012 | Rudkin et al. |
| 8,370,243 B1 | 2/2013 | Cemyar |
| 8,396,775 B1 | 3/2013 | Mindlin |
| 8,423,428 B2 | 4/2013 | Grendel et al. |
| 8,484,355 B1 | 7/2013 | Lochhead et al. |
| 8,533,904 B2 | 9/2013 | Conrad |
| 8,543,438 B1 | 9/2013 | Fleiss |
| 8,600,830 B2 | 12/2013 | Hoffberg |
| 8,601,263 B1 | 12/2013 | Shankar et al. |
| 8,606,827 B2 | 12/2013 | Williamson |
| 8,655,714 B2 | 2/2014 | Weir et al. |
| 8,667,385 B1 | 3/2014 | Mui et al. |
| 8,766,981 B2 | 7/2014 | McLachlan et al. |
| 8,768,976 B2 | 7/2014 | McLachlan et al. |
| 8,826,230 B1 | 8/2014 | Michelsen |
| 8,935,301 B2 | 1/2015 | Chmiel et al. |
| 8,937,618 B2 | 1/2015 | Erez et al. |
| 8,970,476 B2 | 3/2015 | Chan |
| 8,996,552 B2 | 3/2015 | Mukes et al. |
| 9,015,692 B1 | 4/2015 | Clavel |
| 9,020,830 B2 | 4/2015 | Purpus et al. |
| 9,104,661 B1 | 8/2015 | Evans |
| 9,213,573 B2 | 12/2015 | French et al. |
| 9,268,964 B1 | 2/2016 | Schepis et al. |
| 9,281,012 B2 | 3/2016 | Hedges |
| 9,384,511 B1 | 7/2016 | Purpus |
| 9,529,863 B1 | 12/2016 | Gindin et al. |
| 9,805,311 B1 | 10/2017 | Mohler |
| 10,152,722 B2 | 12/2018 | Heath |
| 2002/0002557 A1 | 1/2002 | Straube et al. |
| 2002/0016752 A1 | 2/2002 | Suh |
| 2002/0056004 A1 | 5/2002 | Smith |
| 2002/0069102 A1* | 6/2002 | Vellante et al. ............... 705/10 |
| 2002/0082966 A1 | 6/2002 | O'Brien et al. |
| 2002/0087441 A1 | 7/2002 | Wagner, Jr. et al. |
| 2002/0107914 A1 | 8/2002 | Charisius et al. |
| 2002/0123945 A1* | 9/2002 | Booth ............... G06Q 10/06 705/30 |
| 2002/0129342 A1 | 9/2002 | Kil et al. |
| 2002/0145040 A1 | 10/2002 | Grabski |
| 2002/0154173 A1 | 10/2002 | Etgen et al. |
| 2002/0156710 A1 | 10/2002 | Ryder |
| 2002/0174006 A1 | 11/2002 | Rugge et al. |
| 2002/0174049 A1 | 11/2002 | Kitahara |
| 2002/0178198 A1 | 11/2002 | Steele |
| 2002/0194329 A1 | 12/2002 | Alling |
| 2003/0019350 A1 | 1/2003 | Khosla |
| 2003/0074269 A1 | 4/2003 | Viswanath |
| 2003/0083388 A1 | 5/2003 | L'Alloret |
| 2003/0083888 A1 | 5/2003 | Argenton et al. |
| 2003/0083912 A1 | 5/2003 | Covington et al. |
| 2003/0093310 A1 | 5/2003 | Macrae |
| 2003/0110113 A1 | 6/2003 | Martin |
| 2003/0139080 A1 | 7/2003 | Nishikawa et al. |
| 2003/0139986 A1 | 7/2003 | Roberts, Jr. |
| 2003/0158724 A1 | 8/2003 | Uchida |
| 2003/0158766 A1 | 8/2003 | Mital et al. |
| 2003/0172018 A1 | 9/2003 | Chen et al. |
| 2003/0172368 A1 | 9/2003 | Alumbaugh et al. |
| 2003/0195780 A1 | 10/2003 | Arora et al. |
| 2003/0208493 A1 | 11/2003 | Hall et al. |
| 2003/0217033 A1 | 11/2003 | Sandler et al. |
| 2003/0233301 A1 | 12/2003 | Chen et al. |
| 2003/0236721 A1* | 12/2003 | Plumer ............... G06Q 40/12 705/30 |
| 2004/0030628 A1 | 2/2004 | Takamoto et al. |
| 2004/0039685 A1 | 2/2004 | Hambrecht et al. |
| 2004/0059611 A1* | 3/2004 | Kananghinis et al. ........... 705/7 |
| 2004/0059679 A1 | 3/2004 | Mizumachi et al. |
| 2004/0073477 A1 | 4/2004 | Heyns et al. |
| 2004/0093344 A1 | 5/2004 | Berger et al. |
| 2004/0103013 A1 | 5/2004 | Jameson |
| 2004/0133876 A1 | 7/2004 | Sproule |
| 2004/0138942 A1 | 7/2004 | Pearson et al. |
| 2004/0111609 A1 | 8/2004 | Eilam et al. |
| 2004/0186762 A1 | 9/2004 | Beaven et al. |
| 2004/0243438 A1 | 12/2004 | Mintz |
| 2004/0249737 A1 | 12/2004 | Tofte |
| 2005/0004856 A1 | 1/2005 | Brose et al. |
| 2005/0033631 A1 | 2/2005 | Wefers et al. |
| 2005/0037326 A1 | 2/2005 | Kuntz et al. |
| 2005/0038788 A1 | 2/2005 | Dettinger et al. |
| 2005/0044224 A1 | 2/2005 | Jun et al. |
| 2005/0060298 A1 | 3/2005 | Agapi et al. |
| 2005/0060317 A1 | 3/2005 | Lott et al. |
| 2005/0071285 A1 | 3/2005 | Laicher et al. |
| 2005/0091102 A1 | 4/2005 | Retsina |
| 2005/0120032 A1 | 6/2005 | Liebich et al. |

(56) References Cited

U.S. PATENT DOCUMENTS

| | | |
|---|---|---|
| 2005/0131870 A1 | 6/2005 | Krishnaswamy et al. |
| 2005/0131929 A1 | 6/2005 | Bailey |
| 2005/0144110 A1 | 6/2005 | Chen et al. |
| 2005/0171918 A1 | 8/2005 | Eden et al. |
| 2005/0235020 A1 | 10/2005 | Gabelmann et al. |
| 2005/0246482 A1 | 11/2005 | Gabelmann et al. |
| 2006/0010156 A1 | 1/2006 | Netz et al. |
| 2006/0010294 A1 | 1/2006 | Pasumansky et al. |
| 2006/0041458 A1 | 2/2006 | Ringrose et al. |
| 2006/0041501 A1 | 2/2006 | Tabata et al. |
| 2006/0059032 A1 | 3/2006 | Wong et al. |
| 2006/0074980 A1 | 4/2006 | Sarkar |
| 2006/0080264 A1 | 4/2006 | Zhang et al. |
| 2006/0085302 A1 | 4/2006 | Weiss et al. |
| 2006/0085465 A1 | 4/2006 | Nori et al. |
| 2006/0106658 A1 | 5/2006 | Johanson et al. |
| 2006/0116859 A1 | 6/2006 | Legault et al. |
| 2006/0116975 A1 | 6/2006 | Gould et al. |
| 2006/0126552 A1 | 6/2006 | Lee et al. |
| 2006/0136281 A1 | 6/2006 | Peters et al. |
| 2006/0143219 A1 | 6/2006 | Smith et al. |
| 2006/0161879 A1 | 7/2006 | Lubrecht et al. |
| 2006/0167703 A1 | 7/2006 | Yakov |
| 2006/0178960 A1 | 8/2006 | Lepman |
| 2006/0179012 A1 | 8/2006 | Jacobs |
| 2006/0190497 A1 | 8/2006 | Inturi et al. |
| 2006/0200400 A1 | 9/2006 | Hunter et al. |
| 2006/0200477 A1 | 9/2006 | Barrenechea |
| 2006/0212146 A1 | 9/2006 | Johnson et al. |
| 2006/0212334 A1 | 9/2006 | Jackson |
| 2006/0224740 A1 | 10/2006 | Sievers-Tostes |
| 2006/0224946 A1 | 10/2006 | Barrett et al. |
| 2006/0228654 A1 | 10/2006 | Sanjar et al. |
| 2006/0235785 A1 | 10/2006 | Chait et al. |
| 2006/0259468 A1 | 11/2006 | Brooks et al. |
| 2006/0277074 A1 | 12/2006 | Einav et al. |
| 2006/0282429 A1 | 12/2006 | Hernandez-Sherrington et al. |
| 2007/0038494 A1 | 2/2007 | Kreitzbert et al. |
| 2007/0088641 A1 | 4/2007 | Aaron et al. |
| 2007/0113289 A1 | 5/2007 | Blumenau |
| 2007/0118516 A1 | 5/2007 | Li et al. |
| 2007/0124162 A1 | 5/2007 | Mekyska |
| 2007/0129892 A1 | 6/2007 | Smartt et al. |
| 2007/0179975 A1 | 8/2007 | Teh et al. |
| 2007/0185785 A1 | 8/2007 | Carlson et al. |
| 2007/0198317 A1 | 8/2007 | Harthcryde et al. |
| 2007/0198390 A1 | 8/2007 | Lazear et al. |
| 2007/0198982 A1 | 8/2007 | Bolan et al. |
| 2007/0214413 A1 | 9/2007 | Boeckenhauer |
| 2007/0226064 A1 | 9/2007 | Yu et al. |
| 2007/0226090 A1 | 9/2007 | Stratton |
| 2007/0233439 A1 | 10/2007 | Carroll et al. |
| 2007/0002605 A1 | 11/2007 | Blake, III |
| 2007/0265896 A1 | 11/2007 | Smith |
| 2007/0271203 A1 | 11/2007 | Delvat |
| 2007/0276758 A1 | 11/2007 | Rapp |
| 2007/0282626 A1 | 12/2007 | Zhang et al. |
| 2008/0027957 A1 | 1/2008 | Bruckner et al. |
| 2008/0033774 A1 | 2/2008 | Kimbrel et al. |
| 2008/0059945 A1 | 3/2008 | Sauer et al. |
| 2008/0060058 A1 | 3/2008 | Shea et al. |
| 2008/0065435 A1 | 3/2008 | Ratzloff |
| 2008/0071844 A1 | 3/2008 | Gopal et al. |
| 2008/0082186 A1 | 4/2008 | Hood et al. |
| 2008/0082435 A1 | 4/2008 | O'Brien et al. |
| 2008/0120122 A1 | 5/2008 | Olenski et al. |
| 2008/0201269 A1 | 8/2008 | Hollins et al. |
| 2008/0201297 A1 | 8/2008 | Choi et al. |
| 2008/0208647 A1 | 8/2008 | Hawley et al. |
| 2008/0208667 A1 | 8/2008 | Lymbery et al. |
| 2008/0221949 A1 | 9/2008 | Delurgio et al. |
| 2008/0222638 A1 | 9/2008 | Beaty et al. |
| 2008/0239393 A1 | 10/2008 | Navon |
| 2008/0255912 A1 | 10/2008 | Christiansen et al. |
| 2008/0295096 A1 | 11/2008 | Beaty et al. |
| 2003/0312979 | 12/2008 | Lee et al. |
| 2008/0312979 A1* | 12/2008 | Lee .................. G06Q 10/06375 705/7.28 |
| 2008/0319811 A1 | 12/2008 | Casey |
| 2009/0012986 A1 | 1/2009 | Arazi et al. |
| 2009/0013325 A1 | 1/2009 | Kobayashi et al. |
| 2009/0018880 A1* | 1/2009 | Bailey .................. G06Q 10/06 705/7.37 |
| 2009/0018996 A1 | 1/2009 | Hunt et al. |
| 2009/0063251 A1 | 3/2009 | Rangarajan et al. |
| 2009/0063540 A1 | 3/2009 | Mattox et al. |
| 2009/0100017 A1 | 4/2009 | Graves et al. |
| 2009/0100406 A1 | 4/2009 | Greenfield et al. |
| 2009/0144120 A1 | 6/2009 | Ramachandran |
| 2009/0150396 A1 | 6/2009 | Elisha et al. |
| 2009/0195350 A1 | 8/2009 | Tsern et al. |
| 2009/0198535 A1 | 8/2009 | Brown et al. |
| 2009/0199192 A1 | 8/2009 | Laithwaite et al. |
| 2009/0210275 A1 | 8/2009 | Andreev et al. |
| 2009/0216580 A1 | 8/2009 | Bailey et al. |
| 2009/0222742 A1 | 9/2009 | Pelton et al. |
| 2009/0234892 A1 | 9/2009 | Anglin et al. |
| 2009/0300173 A1 | 12/2009 | Bakman et al. |
| 2009/0307597 A1 | 12/2009 | Bakman |
| 2009/0319316 A1 | 12/2009 | Westenfeld et al. |
| 2010/0005014 A1 | 1/2010 | Castle et al. |
| 2010/0005173 A1 | 1/2010 | Baskaran et al. |
| 2010/0017344 A1 | 1/2010 | Hambrecht et al. |
| 2010/0042455 A1 | 2/2010 | Liu et al. |
| 2010/0049494 A1 | 2/2010 | Radibratovic et al. |
| 2010/0082380 A1 | 4/2010 | Merrifield, Jr. et al. |
| 2010/0094740 A1 | 4/2010 | Richter |
| 2010/0125473 A1 | 5/2010 | Tung et al. |
| 2010/0125479 A1 | 5/2010 | Tung et al. |
| 2010/0153282 A1 | 6/2010 | Graham |
| 2010/0161371 A1 | 6/2010 | Cantor et al. |
| 2010/0161634 A1 | 6/2010 | Caceres |
| 2010/0169477 A1 | 7/2010 | Stienhans et al. |
| 2010/0185557 A1 | 7/2010 | Hunter et al. |
| 2010/0198750 A1 | 8/2010 | Ron et al. |
| 2010/0211667 A1 | 8/2010 | O'Connell, Jr. |
| 2010/0250419 A1 | 9/2010 | Ariif et al. |
| 2010/0250421 A1 | 9/2010 | Ariff et al. |
| 2010/0250642 A1 | 9/2010 | Yellin et al. |
| 2010/0293163 A1 | 11/2010 | McLachlan et al. |
| 2010/0299233 A1 | 11/2010 | Licardi et al. |
| 2010/0306382 A1 | 12/2010 | Cardosa et al. |
| 2010/0323754 A1 | 12/2010 | Nakagawa |
| 2010/0325506 A1 | 12/2010 | Cai et al. |
| 2010/0325606 A1 | 12/2010 | Sundararajan et al. |
| 2010/0332262 A1 | 12/2010 | Horvitz et al. |
| 2010/0333109 A1 | 12/2010 | Milnor |
| 2011/0016214 A1 | 1/2011 | Jackson |
| 2011/0016448 A1 | 1/2011 | Bauder et al. |
| 2011/0022861 A1 | 1/2011 | Agneeswaran et al. |
| 2011/0066472 A1 | 3/2011 | Scheider |
| 2011/0066628 A1 | 3/2011 | Jayaraman |
| 2011/0072340 A1 | 3/2011 | Miller |
| 2011/0106691 A1 | 5/2011 | Clark et al. |
| 2011/0107254 A1 | 5/2011 | Moroze |
| 2011/0167034 A1 | 7/2011 | Knight et al. |
| 2011/0196795 A1 | 8/2011 | Pointer |
| 2011/0226277 A1 | 9/2011 | Freimuth et al. |
| 2011/0238608 A1 | 9/2011 | Sathish |
| 2011/0261049 A1 | 10/2011 | Cardno et al. |
| 2011/0295766 A1 | 12/2011 | Tompkins |
| 2011/0313947 A1 | 12/2011 | Grohavaz |
| 2012/0016811 A1 | 1/2012 | Jones |
| 2012/0023170 A1 | 1/2012 | Matignon et al. |
| 2012/0066020 A1 | 3/2012 | Moon et al. |
| 2012/0116990 A1 | 5/2012 | Huang |
| 2012/0131591 A1 | 5/2012 | Moorthi et al. |
| 2012/0150736 A1 | 6/2012 | Dickerson et al. |
| 2012/0185368 A1 | 7/2012 | Schloter et al. |
| 2012/0232947 A1 | 9/2012 | McLachlan |
| 2012/0233217 A1 | 9/2012 | Purpus et al. |
| 2012/0233547 A1* | 9/2012 | McLachlan .......... G06Q 10/06 715/733 |
| 2012/0239739 A1 | 9/2012 | Manglik et al. |

(56) References Cited

U.S. PATENT DOCUMENTS

| | | |
|---|---|---|
| 2012/0246046 A1 | 9/2012 | Hirsch |
| 2012/0272234 A1 | 10/2012 | Kaiser et al. |
| 2012/0330869 A1 | 12/2012 | Durham |
| 2013/0014057 A1 | 1/2013 | Reinpoldt et al. |
| 2013/0028537 A1 | 1/2013 | Miyake et al. |
| 2013/0041792 A1 | 2/2013 | King et al. |
| 2013/0041819 A1 | 2/2013 | Khasho |
| 2013/0060595 A1 | 3/2013 | Bailey |
| 2013/0066866 A1 | 3/2013 | Chan et al. |
| 2013/0091456 A1 | 4/2013 | Sherman et al. |
| 2013/0091465 A1 | 4/2013 | Kikin-Gil et al. |
| 2013/0103369 A1 | 4/2013 | Huynh et al. |
| 2013/0103654 A1 | 4/2013 | McLachlan et al. |
| 2013/0124454 A1 | 5/2013 | Bhide et al. |
| 2013/0124459 A1 | 5/2013 | Iwase et al. |
| 2013/0138470 A1* | 5/2013 | Goyal et al. ............... 705/7.26 |
| 2013/0159926 A1 | 6/2013 | Vainer et al. |
| 2013/0173159 A1 | 7/2013 | Trum et al. |
| 2013/0179371 A1 | 7/2013 | Jain et al. |
| 2013/0201193 A1 | 8/2013 | McLachlan et al. |
| 2013/0227584 A1 | 8/2013 | Greene et al. |
| 2013/0232537 A1 | 10/2013 | Snider |
| 2013/0268307 A1 | 10/2013 | Li et al. |
| 2013/0290470 A1 | 10/2013 | CaraDonna et al. |
| 2013/0293551 A1 | 11/2013 | Erez et al. |
| 2013/0339274 A1 | 12/2013 | Willis et al. |
| 2013/0346390 A1 | 12/2013 | Jerzak et al. |
| 2014/0006085 A1 | 1/2014 | McLachlan et al. |
| 2014/0006222 A1 | 1/2014 | Hericks et al. |
| 2014/0067632 A1 | 3/2014 | Curtis |
| 2014/0075004 A1 | 3/2014 | Van Dusen et al. |
| 2014/0089509 A1 | 3/2014 | Akolkar et al. |
| 2014/0108295 A1 | 4/2014 | Renshaw |
| 2014/0122374 A1 | 5/2014 | Hacigumus et al. |
| 2014/0129583 A1 | 5/2014 | Munkes et al. |
| 2014/0136295 A1 | 5/2014 | Wasser |
| 2014/0143175 A1 | 5/2014 | Greenshields et al. |
| 2014/0172918 A1 | 6/2014 | Kornmann et al. |
| 2014/0229212 A1 | 8/2014 | MacElheron et al. |
| 2014/0244364 A1 | 8/2014 | Evers |
| 2014/0252095 A1 | 9/2014 | Kikin |
| 2014/0257928 A1 | 9/2014 | Chen et al. |
| 2014/0278459 A1 | 9/2014 | Morris |
| 2014/0279121 A1 | 9/2014 | George et al. |
| 2014/0279201 A1 | 9/2014 | Iyoob et al. |
| 2014/0279676 A1 | 9/2014 | Schafer et al. |
| 2014/0279947 A1 | 9/2014 | Chachra et al. |
| 2014/0288987 A1 | 9/2014 | Liu |
| 2014/0310233 A1 | 10/2014 | Catalano et al. |
| 2014/0337007 A1 | 11/2014 | Waibel et al. |
| 2014/0351166 A1 | 11/2014 | Schlossberg |
| 2014/0365503 A1 | 12/2014 | Franceschini et al. |
| 2014/0365504 A1 | 12/2014 | Franceschini et al. |
| 2015/0006552 A1 | 1/2015 | Lord |
| 2015/0012328 A1 | 1/2015 | McLachlan et al. |
| 2015/0046363 A1 | 2/2015 | McNamara et al. |
| 2015/0066808 A1 | 3/2015 | Legare et al. |
| 2015/0074075 A1 | 3/2015 | Alexander |
| 2015/0088584 A1 | 3/2015 | Santiago, III et al. |
| 2015/0120370 A1 | 4/2015 | Agrawal et al. |
| 2015/0120373 A1 | 4/2015 | Bajaj et al. |
| 2015/0149257 A1* | 5/2015 | Bielat ............... G06Q 10/0637 705/7.36 |
| 2015/0227991 A1 | 8/2015 | Yu |
| 2015/0234944 A1 | 8/2015 | Marceau et al. |
| 2015/0278024 A1 | 10/2015 | Barman et al. |
| 2015/0294273 A1 | 10/2015 | Barraci et al. |
| 2015/0302303 A1 | 10/2015 | Hakim |
| 2015/0341230 A1 | 11/2015 | Dave et al. |
| 2015/0363725 A1 | 12/2015 | Anderson et al. |
| 2015/0379061 A1 | 12/2015 | Paraschivescu |
| 2016/0063577 A1 | 3/2016 | Yellin et al. |
| 2016/0098234 A1 | 4/2016 | Weaver et al. |
| 2016/0266594 A1 | 9/2016 | Kauffman et al. |
| 2017/0091689 A1 | 3/2017 | Elliott |
| 2017/0102246 A1 | 4/2017 | Yang |
| 2017/0154088 A1 | 6/2017 | Sherman |
| 2018/0068246 A1 | 3/2018 | Crivat et al. |

OTHER PUBLICATIONS

"Activity Based Costing is the best allocation methodology," APPTIO, Community for Technology Business Management, Mar. 16, 2010, 2 pages.

"Amazon Elastic Computer Cloud (Amazon EC2)", archive.org, Oct. 21, 2011, 9 pages http://web.archive.org/web/20111029130914/ http://aws.amazon.com/ec2/#pricing.

"Apptio Extends Leadership in Cloud Business Management with Launch of Apptio Cloud Express," Apptio, Dec. 12, 2012, 2 pages http://www.apptio.com/news/apptio-extends-leadership-cloud-business-management-launch-apptio-cloud-express#.Ukm4r8X7Lco.

"Apptio Optimizes Enterprise IT Costs Utilizing Amazon Web Services Cloud Computing," Apptio, Apr. 7, 2009, 2 pages http://www.apptio.com/news/apptio-optimizes-enterprise-it-costs-utilizing-amazon-web-services-cloud-computing#.Ukm5XsX7Lco.

"Automating Cost Transparency," Apptio, 2008, 15 pages htto://www.cio.com/documents/whitepapers/AutomatedCostTransparency.pdf.

"Cloud Computing and Sustainability: The Environmental Benefits of Moving to the Cloud," Accenture, archive.org, Aug. 31, 2011, 17 pages http://web.archive.org/web/20110813022626/http://www.accenture.com/SiteCollectionDocuments/PDF/Accenture_Sustainability_Cloud_Computing_TheEnvironmentalBenefitsofMovingtotheCloud.pdf.

"IT Cost Transparency and Apptio," Dec. 4, 2008, 2 pages http://web.archive.org/web/20081204012158/http://www.apptio.com/solutions.

"Notice from the European Patent Office dated Oct. 1, 2007 concerning business methods," Official Journal EPO, Nov. 2007, pp. 592-593.

"Program Evaluation and Review Technique," Wikipedia, the free encyclopedia, accessed Mar. 13, 2012, 10 pages http://en.wikipedia.org/wiki/Program_Evaluation_and_Review_Technique—last modified Mar. 12, 2012.

"Project Management," Wikipedia, the free encyclopedia, accessed Mar. 13, 2012, 14 pages http://en.wikipedia.org/wiki/Project_management—last modified Mar. 7, 2012.

"Visualization for Production Management: Treemap and Fisheye Table Browser," Open-Video Organization webpages, 2001, 2 pages http://www.open-video.org/details.php?videoid=4547.

Busch, J., "Six Strategies for IT Cost Allocation," Spend Matters, Jan. 5, 2011, 3 pages http://spendmatters.com/2011/01/05/six-strategies-for-it-cost-allocation/.

Morgan, T. P., "Apptio puffs up freebie cost control freak for public clouds," The Register, Dec. 12, 2012, 2 pages http://www.theregister.co.uk/2012/12/12/apptio_cloud_express.

Ricknäs, M., "Apptio unveils tool to keep track of cloud costs," ComputerWorld, Dec. 12, 2012, 1 page http://www.computerworld.com/s/article/9234630/Apptio_unveils_tool_to_keep_track_of_cloud_costs.

Talbot, C., "Apptio Cloud Express Provides Free Usage Tracking Service" talkincloud.com, Dec. 12, 2012, 4 pages http://talkincloud.com/cloud-computing-management/apptio-cloud-express-provides-free-usage-tracking-service.

Vizard, M., "Free Service from Apptio Tracks Cloud Service Provider Pricing," IT Business Edge, Dec. 12, 2012, 6 pages http://www.itbusinessedge.com/blogs/it-unmasked/free-seryice-from-apptio-tracks-cloud-service-provider-pricing.html.

International Search Report and Written Opinion for International Patent Application No. PCT/US2010/035021 dated Jul. 14, 2010.

International Preliminary Report on Patentability for International Patent Application No. PCT/US2010/035021 dated Nov. 24, 2017.

International Search Report and Written Opinion for International Patent Application No. PCT/US2012/028353 dated Oct. 31, 2012.

International Preliminary Report on Patentability for International Patent Application No. PCT/US2012/028353 dated Sep. 19, 2013.

(56) References Cited

OTHER PUBLICATIONS

International Search Report and Written Opinion for International Patent Application No. PCT/US2012/028378 dated Sep. 12, 2012.
International Preliminary Report on Patentability for International Patent Application No. PCT/US2012/028378 dated Sep. 19, 2013.
Extended European Search Report in EP Application No. 13151967 0-1955, dated Apr. 19, 2013.
Official Communication for U.S. Appl. No. 12/467,120 dated Oct. 4, 2011.
Official Communication for U.S. Appl. No. 12/467,120 dated Jun. 20, 2012.
Official Communication for U.S. Appl. No. 12/467,120 dated Aug. 29, 2012.
Official Communication for U.S. Appl. No. 12/467,120 dated Oct. 23, 2013.
Official Communication tor U.S. Appl. No. 12/467,120 dated Mar. 26, 2013.
Official Communication for U.S. Appl. No. 13/324,253 dated Sep. 25, 2612.
Official Communication for U.S. Appl. No. 13/324,253 dated Jan. 10, 2013.
Official Communication for U.S. Appl. No. 13/324,253 dated Mar. 19, 2013.
Official Communication for U.S. Appl. No. 13/324,253 dated Sep. 6, 2013.
Official Communication tor U.S. Appl. No. 13/415,797 dated Oct. 3, 2013.
Official Communication for U.S. Appl. No. 13/452,628 dated Apr. 22, 2013.
Official Communication for U.S. Appl. No. 13/675,837 dated Oct. 10, 2013.
Official Communication for U.S. Appl. No. 13/837,615 dated Oct. 23, 2013.
Official Communication for U.S. Appl. No. 13/917,478 dated Nov. 7, 2013.
Official Communication for U.S. Appl. No. 13/917,503 dated Oct. 10, 2013.
Official Communication for U.S. Appl. No. 13/935,147 dated Oct. 22, 2013.
Official Communication for U.S. Appl. No. 13/462,628 dated Nov. 18, 2013.
Official Communication for U.S. Appl. No. 14/033,130 dated Dec. 16, 2013.
Official Ccmmunication for U.S. Appl. No. 13/324,263 dated Jan. 23, 2014.
Official Communication for U.S. Appl. No. 13/675,837 dated Jan. 31, 2014.
Official Communication for U.S. Appl. No. 13/917,503 dated Jan. 31, 2014.
Robinson Glen, Cloud Economics—Cost Optimization (selected slides), Amazon Web Services AWS, Slideshare, Feb. 28, 2012 http://www.slideshare.net/AmazonWebServices/whats-new-with-aws-london.
Skilton et al, Building Return on Investment from Cloud Computing, The open Group Whitepaper, mladina webpages. Apr. 2010 http://www.mladina.si/media/objave/dokumenti/2010/5/31/31_5_2010_open_group_building_return-on-investment-from-cloud-computing.pdf.
Ward Miles, Optimizing for Cost in the Cloud (selection), AWS Summit, Slideshare Apr. 2012 http://www.slideshare.net/AmazonWebServices/optimizing-your-infrastructure-costs-on-aws.
Amazon Reserved Instances, Amazon Web Services, archives org, Jan. 14, 2013 http://web.archive.org/web/2012011453849/http://aws.amazon.com/rds/reserved-instances/?.
Cost Optimisation with Amazon Web Services, extracied slides, Slideshare Jan. 30, 2012 http://www.slideshare.net/AmazonWebServices/cost-optomization-with-amazon-web-service?from_search=1.
Deciding an Approach to the cloud AWS Reserved Instances, Cloudyn webpages, Feb. 28, 2012 https://www.cloudyn.com/blog/deciding-an-approach-to-the-cloud-aws-reserved-aws.
Ganesan Harish, Auto Scaling using AWS, Amazon Web Services AWS (selected slides), Apr. 20, 2011 http://www.slideshare.net/harishganesan/auto-scaling-using-amazon-web-services-aws.
Office Communication for U.S. Appl. No. 13/416,797 dated Apr. 9, 2014.
Office Communication for U.S. Appl. No. 13/324,253 dated Apr. 9, 2014.
Office Communication for U.S. Appl. No. 13/324,253 dated Oct. 24, 2014.
Office Communication for U.S. Appl. No. 13/365,150 dated Dec. 3, 2014.
Office Communication for U.S. Appl. No. 13/452,628 dated Oct. 1, 2014.
Office Communication for U.S. Appl. No. 13/837,815 dated Apr. 7, 2014.
Office Communication for U.S. Appl. No. 13/675,837 dated Jan. 31, 2014.
Office Communication for U.S. Appl. No. 13/675,837 dated Apr. 2, 2014.
Office Communication for U.S. Appl. No. 13/917,503 dated Apr. 3, 2014.
Office Communication for U.S. Appl. No. 13/935,147 dated Apr. 11, 2014.
Office Communication for U.S. Appl. No. 13/935,147 dated Jun. 16, 2014.
Office Communication for U.S. Appl. No. 14/033,130 dated May 27, 2014.
Office Communication for U.S. Appl. No. 14/033,130 dated Aug. 5, 2014.
Office Communication for U.S. Appl. No. 13/415,797 dated Oct. 19, 2015, 3 pages.
Office Communication for U.S. Appl. No. 13/837,815 dated Sep. 28, 2015, 20 pages.
European Examination Report for Application No. 14159413.5 dated Jul. 15, 2015, 9 pages.
Office Communication for U.S. Appl. No. 13/415,701 dated Oct. 27, 2015, 16 pages.
Office Communication for U.S. Appl. No. 13/365,150 dated Dec. 7, 2015, 3 pages.
Office Communication for U.S. Appl. No. 13/675,837 dated Oct. 26, 2015, 20 pages.
Office Communication for U.S. Appl. No. 13/917,503 dated Oct. 22, 2015, 19 pages.
Office Communication for U.S. Appl. No. 14/722,663 dated Dec. 1, 2015, 37 pages.
Chien-Liang Fok et al., "Rapid Development and Flexible Deployment of Adaptive Wireless Sensor Network Applications," Proceedings of the 25th IEEE International Conference on Distributed Computing Systems, 2005, pp. 653-662 (10 pages).
Frans Flippo et al., "A Framework for Rapid Development of Multimodal Interfaces," Proceedings of the 5th International Conference on Multimodal Interfaces, 2003, pp. 109-116 (8 pages).
David B. Stewart et al., "Rapid Development of Robotic Applications Using Component-Based Real-Time Software," Intelligent Robots and Systems 1995, Human Robot Interaction and Cooperative Robots Proceedings, 1995, IEEE International Conference on vol. 1, pp. 465-470 (6 pages).
Office Communication for U.S. Appl. No. 14/846,349 dated Dec. 17, 2015, 23 pages.
Office Communication for U.S. Appl. No. 13/649,019 dated Sep. 23, 2015.
Office Communication for U.S. Appl. No. 13/365,150 dated Sep. 24, 2015.
Office Communication for U.S. Appl. No. 14/033,130 dated Sep. 15, 2015.
Office Communication for U.S. Appl. No. 13/452,628 dated Mar. 13, 2014.
SAS Activity-Based Management, 2010, Fact Sheet, 4 pages.
Official Communication for U.S. Appl. No. 14/869,721 dated Aug. 3, 2016, 5 pages.
Official Communication for U.S. Appl. No. 13/452,628 dated Aug. 18, 2016, 22 pages.

(56) References Cited

OTHER PUBLICATIONS

Office Communication for U.S. Appl. No. 13/415,797 dated Jul. 23, 2015.
International Search Report and Written Opinion for PCT/US2015/015486 dated Jun. 29, 2015.
Office Communication for U.S. Appl. No. 13/935,147 dated Jul. 9, 2015.
Official Communication for U.S. Appl. No. 14/869,721 dated Jun. 1, 2016, 35 pages.
Official Communication for U.S. Appl. No. 14/977,368 dated Jun. 7, 2016, 11 pages.
Office Communication for U.S. Appl. No. 14/971,944, dated May 19, 2016, 17 pages.
Stephen Muller and Hasso Platner, "An IN-Depth Analysis of Data Aggregation Cost Factors in a Columnar In-Memory Database", ACM DOLAP'12, Nov. 2, 2012, Maui, Hawaii, USA, pp. 65-72.
Official Communication for U.S. Appl. No. 13/935,147 dated Mar. 9, 2016, 10 pages.
Official Communication for U.S. Appl. No. 14/033,130 dated Feb. 18, 2016, 22 pages.
Office Communication for U.S. Appl. No. 13/415,797 dated Oct. 19, 2015.
Office Communication for U.S. Appl. No. 13/837,815 dated Sep. 28, 2015.
Official Communication for U.S. Appl. No. 13/649,019 dated Jan. 4, 2016, 8 pages.
Official Communication for U.S. Appl. No. 14/869,721 dated Jan. 13, 2016, 57 pages.
Official Communication for U.S. Appl. No. 13/452,628 dated Jan. 12, 2016, 21 pages.
International Search Report and Written Opinion for PCT/US2015/048697 dated Mar. 31, 2016, 9 pages.
Office Communication for U.S. Appl. No. 13/365,150, dated Apr. 6, 2016, 11 pages.
Office Communication for U.S. Appl. No. 14/722,663, dated Mar. 31, 2016, 5 pages.
Van Diessen et al., "Component Business Model for Digital Repositories: A Framework for Analysis," AAAI, 2008, 7 pages.
Melcher et al., "Visualization and Clustering of Business Process Collections Based on Process Metric Values," IEEE Computer Society, 2008, 4 pages.
Lee et al., "Value-Centric, Model-Driven Business Transformation," IEEE, 2008, 8 pages.
Lee et al., "Business Transformation Workbench: A Practitioner's Tool for Business Transformation," IEEE International Conference on Services Computing, 2008, 8 pages.
Risch et al., "Interactive Information Visualization for Exploratory Intelligence Data Analysis," IEEE Proceedings of VRAIS, 1996, 10 pages.
Office Communication for U.S. Appl. No. 13/415,797, dated Apr. 4, 2016, 24 pages.
Office Communication for U.S. Appl. No. 13/837,815, dated Apr. 13, 2016, 22 pages.
Office Communication for U.S. Appl. No. 14/867,552, dated Apr. 25, 2016, 12 pages.
Office Communication for U.S. Appl. No. 14/033,130, dated Apr. 25, 2016, 4 pages.
Extended European Search Report in EP Application No. 14159413.5 dated Jul. 4, 2014.
Office Communication for U.S. Appl. No. 13/415,797 dated Jan. 12, 2015.
Office Communication for U.S. Appl. No. 13/837,815 dated Sep. 25, 2014.
Office Communication for U.S. Appl. No. 13/324,253 dated Feb. 19, 2015.
Henriet et al. "Traffic-Based Cost Allocation in a Network." The Rand Journal of Economics, 1996, pp. 332-345.
Rudnick et al., "Marginal Pricing and Supplement Cost Allocation in Transmission Open Access." Power Systems, IEEE Transactions on 10.2, 1995, pp. 1125-1132.
Office Communication for U.S. Appl. No. 13/949,019 dated Feb. 10, 2015.
European Search Report for Application No. 12755613.2 dated Jan. 26, 2015.
Office Communication for U.S. Appl. No. 13/452,628 dated Mar. 30, 2015.
Office Communication for U.S. Appl. No. 13/917,503 dated Apr. 16, 2015.
Office Communication for U.S. Appl. No. 13/675,837 dated Apr. 16, 2015.
Office Communication for U.S. Appl. No. 13/837,815 dated Apr. 27, 2015.
Office Communication for U.S. Appl. No. 13/452,628 dated Jun. 23, 2015.
Official Communication for U.S. Appl. No. 13/837,815 dated Jun. 23, 2016, 3 pages.
Official Communication for U.S. Appl. No. 14/846,349 dated Jul. 1, 2016, 24 pages.
Official Communication for U.S. Appl. No. 14/981,747 dated Jul. 14, 2016, 29 pages.
Official Communication for U.S. Appl. No. 14/869,721 dated Oct. 17, 2017, 30 pages.
Official Communication for U.S. Appl. No. 15/379,267 dated Oct. 6, 2017, 3 pages.
Official Communication for U.S. Appl. No. 13/935,147 dated Nov. 3, 2017, 11 pages.
Official Communication for U.S. Appl. No. 14/846,349 dated Nov. 20, 2017, 3 pages.
Official Communication for U.S. Appl. No. 13/917,503 dated Nov. 28, 2017, 26 pages.
Official Communication for European Application No. 13151967.0 dated Aug. 18, 2017.
European Search Report for Application No. 10775648.8 dated Mar. 10, 2017.
Official Communication for European Application No. 12755613.2 dated Aug. 17, 2017.
Official Communication for U.S. Appl. No. 14/033,130 dated Sep. 7, 2017.
Official Communication for U.S. Appl. No. 14/846,349 dated Sep. 8, 2017.
Official Communication for U.S. Appl. No. 13/452,628 dated Sep. 28, 2017.
Official Communication for U.S. Appl. No. 13/837,815 dated Sep. 28, 2017.
Official Communication for U.S. Appl. No. 13/415,797 dated Sep. 7, 2017.
Official Communication for U.S. Appl. No. 15/379,267 dated Jun. 30, 2017, 16 pages.
Official Communication for U.S. Appl. No. 14/867,552 dated Jun. 29, 2017, 31 pages.
Official Communication for U.S. Appl. No. 14/033,130 dated Jun. 29, 2017, 18 pages.
Official Communication for U.S. Appl. No. 13/837,815 dated Jun. 12, 2017, 12 pages.
Official Communication for U.S. Appl. No. 13/837,815 dated Nov. 9, 2016, 11 pages.
Official Communication for U.S. Appl. No. 15/260,221 dated Dec. 20, 2016, 21 pages.
Official Communication for U.S. Appl. No. 15/271,013 dated Dec. 15, 2016, 50 pages.
Official Communication for U.S. Appl. No. 15/351,313 dated Jan. 12, 2017, 7 pages.
Official Communication for U.S. Appl. No. 13/675,837 dated Jan. 11, 2017, 29 pages.
Efficient frontier—Wikipedia, Efficient frontier, Wikipedia webpages, Oct. 30, 2016, https://en.wikipedia.org/wiki/Efficient_frontier, 2 pages.
Official Communication for U.S. Appl. No. 13/917,503 dated Jan. 12, 2017, 27 pages.
Official Communication for U.S. Appl. No. 14/033,130 dated Jan. 11, 2017, 12 pages.
Official Communication for U.S. Appl. No. 14/867,552 dated Jan. 9, 2017, 3 pages.

(56) References Cited

OTHER PUBLICATIONS

Official Communication for U.S. Appl. No. 13/365,150 dated Oct. 24, 2016, 19 pages.
Official Communication for U.S. Appl. No. 14/846,349 dated Mar. 1, 2017, 27 pages.
Official Communication for U.S. Appl. No. 13/935,147 dated Mar. 7, 2017, 12 pages.
Official Communication for U.S. Appl. No. 13/365,150 dated Mar. 15, 2017, 19 pages.
Official Communication for U.S. Appl. No. 13/452,628 dated Mar. 9, 2017, 24 pages.
Official Communication for U.S. Appl. No. 15/379,267 dated Mar. 10, 2017, 11 pages.
Official Communication for U.S. Appl. No. 13/365,150 dated May 22, 2017, 3 pages.
Official Communication for U.S. Appl. No. 13/917,503 dated May 16, 2017, 29 pages.
Official Communication for U.S. Appl. No. 14/869,721 dated May 5, 2017, 49 pages.
Official Communication for U.S. Appl. No. 14/981,747 dated May 19, 2017, 43 pages.
Official Communication for U.S. Appl. No. 15/271,013 dated May 24, 2017, 37 pages.
Official Communication for U.S. Appl. No. 14/867,552 dated Oct. 3, 2016, 19 pages.
Official Communication for U.S. Appl. No. 14/977,368 dated Oct. 19, 2016, 5 pages.
Official Communication for U.S. Appl. No. 13/415,797 dated Jan. 11, 2017, 25 pages.
Official Communication for European Application No. 13151967.0 dated Aug. 18, 2017, 7 pages.
European Search Report for European Application No. 10775648.8 dated Mar. 10, 2017, 6 pages.
Official Communication for European Application No. 12755613.2 dated Aug. 17, 2017, 7 pages.
Official Communication for U.S. Appl. No. 14/033,130 dated Sep. 7, 2017, 3 pages.
Official Communication for U.S. Appl. No. 14/846,349 dated Sep. 8, 2017, 25 pages.
Official Communication for U.S. Appl. No. 13/452,628 dated Sep. 28, 2017, 26 pages.
Official Communication for U.S. Appl. No. 13/837,815 dated Sep. 28, 2017, 9 pages.
Official Communication for U.S. Appl. No. 13/415,797 dated Sep. 7, 2017, 26 pages.
Official Communication for U.S. Appl. No. 15/351,313 dated Jul. 18, 2017, 15 pages.
Official Communication for U.S. Appl. No. 15/260,221 dated Aug. 15, 2017, 21 pages.
Official Communication for U.S. Appl. No. 13/365,150 dated Aug. 23, 2017, 30 pages.
Official Conmmication for U.S. Appl. No. 14/867,552 dated Nov. 29, 2017, pp. 1-26.
Official Communication for U.S. Appl. No. 14/846,349 dated Jan. 2018, pp. 1-39.
Official Communication for U.S. Appl. No. 14/869,721 dated Jan. 2018, pp. 1-3.
Official Conmmunication for U.S. Appl. No. 14/981,747 dated Dec. 12, 2017, pp. 1-14.
Official Communication for U.S. Appl. No. 13/917,503 dated Nov. 20, 2018, pp. 1-55.
Official Communication for U.S. Appl. No. 14/869,721 dated Oct. 11, 2018, pp. 1-73.
Official Communication for U.S. Appl. No. 14/867,552 dated Nov. 21, 2018, pp. 1-37.
Official Communication for U.S. Appl. No. 15/260,221 dated Oct. 5, 2018, pp. 1-40.
Official Communication for U.S. Appl. No. 15/379,267 dated Oct. 18, 2018, pp. 1-9.
Official Communication for U.S. Appl. No. 15/859,058 dated Dec. 5, 2018, pp. 1-20.
Official Communication for U.S. Appl. No. 14/033,130 dated Dec. 18, 2018, pp. 1-11.
Official Communication for U.S. Appl. No. 15/271,013 dated Dec. 18, 2018, pp. 1-47.
Official Communication for U.S. Appl. No. 13/917,503 dated Jul. 19, 2018, pp. 1-3.
Official Communication for U.S. Appl. No. 14/846,349 dated Jul. 20, 2018, pp. 1-40.
Official Communication for U.S. Appl. No. 14/981,747 dated Jul. 5, 2018, pp. 1-62.
Official Communication for U.S. Appl. No. 15/271,013 dated Jul. 6, 2018, pp. 1-49.
Official Communication for U.S. Appl. No. 15/379,267 dated Jul. 19, 2018, pp. 1-34.
Official Communication for U.S. Appl. No. 13/935,147 dated Aug. 10, 2018, pp. 1-25.
Official Communication for U.S. Appl. No. 14/033,130 dated Aug. 9, 2018, pp. 1-47.
Official Communication for U.S. Appl. No. 15/858,945 dated Sep. 10, 2018, pp. 1-25.
Official Communication for U.S. Appl. No. 15/859,008 dated Jul. 31, 2018, pp. 1-28.
Official Communication for U.S. Appl. No. 13/935,147 dated Mar. 28, 2019.
Official Communication for U.S. Appl. No. 14/033,130 dated Apr. 10, 2019.
Official Communication for U.S. Appl. No. 13/917,503 dated Apr. 1, 2019, pp. 1-53.
Official Communication for U.S. Appl. No. 14/846,349 dated Apr. 11, 2019.
Official Communication for U.S. Appl. No. 14/867,552 dated Feb. 11, 2019.
Official Communication for U.S. Appl. No. 14/981,747 dated Dec. 26, 2018.
Official Communication for U.S. Appl. No. 15/260,221 dated Jan. 8, 2019.
Official Communication for U.S. Appl. No. 15/271,013 dated Mar. 28, 2019.
Official Communication for U.S. Appl. No. 15/351,313 dated Apr. 1, 2019.
Official Communication for U.S. Appl. No. 15/858,945 dated Feb. 26, 2019.
Official Communication for U.S. Appl. No. 15/859,058 dated Mar. 25, 2019.
Official Communication for U.S. Appl. No. 15/859,008 dated Apr. 12, 2019.
Official Communication for U.S. Appl. No. 14/869,721 dated Jun. 20, 2019.
Official Communication for U.S. Appl. No. 15/260,221 dated Jul. 11, 2019.
Official Communication for U.S. Appl. No. 15/351,313 dated Jun. 14, 2019.
Official Communication for U.S. Appl. No. 14/981,747 dated May 8, 2019.
Official Communication for U.S. Appl. No. 15/271,013 dated Jun. 14, 2019.
Official Communication for U.S. Appl. No. 14/981,747 dated Aug. 1, 2019, pp. 1-5.
Official Communication for U.S. Appl. No. 15/260,221 dated Sep. 3, 2019, pp. 1-27.
Official Communication for U.S. Appl. No. 15/351,313 dated Aug. 28, 2019, pp. 1-47.
Selen, et al. "Model-Order Selection: A review of information criterion rules," IEEE Signal Processing Magazine, Jul. 2004, pp. 38-47.
Official Communication for U.S. Appl. No. 13/935,147 dated Mar. 28, 2019, pp. 1-80.
Official Communication for U.S. Appl. No. 14/033,130 dated Apr. 10, 2019, pp. 1-80.
Official Communication for U.S. Appl. No. 14/846,349 dated Apr. 11, 2019, pp. 1-57.

(56) References Cited

OTHER PUBLICATIONS

Official Communication for U.S. Appl. No. 14/867,552 dated Feb. 11, 2019, pp. 1-76.
Official Communication for U.S. Appl. No. 14/981,747 dated Dec. 26, 2018, pp. 1-63.
Official Communication for U.S. Appl. No. 15/260,221 dated Jan. 8, 2019, pp. 1-27.
Official Communication for U.S. Appl. No. 15/271,013 dated Mar. 28, 2019, pp. 1-109.
Official Communication for U.S. Appl. No. 15/351,313 dated Apr. 1, 2019, pp. 1-38.
Official Communication for U.S. Appl. No. 15/858,945 dated Feb. 26, 2019, pp. 1-13.
Official Communication for U.S. Appl. No. 15/859,058 dated Mar. 25, 2019, pp. 1-57.
Official Communication for U.S. Appl. No. 15/859,008 dated Apr. 12, 2019, pp. 1-24.
Official Communication for U.S. Appl. No. 14/869,721 dated Jun. 20, 2019, pp. 1-346.
Official Communication for U.S. Appl. No. 15/260,221 dated Jul. 11, 2019, pp. 1-40.
Official Communication for U.S. Appl. No. 15/351,313 dated Jun. 14, 2019, pp. 1-9.
Official Communication for U.S. Appl. No. 14/981,747 dated May 8, 2019, pp. 1-77.
Official Communication for U.S. Appl. No. 15/271,013 dated Jun. 14, 2019, pp. 1-8.
Official Communication for U.S. Appl. No. 14/846,349 dated Oct. 18, 2019, pp. 1-52.
Official Communication for U.S. Appl. No. 14/981,747 dated Oct. 24, 2019, pp. 1-62.
Official Communication for U.S. Appl. No. 15/271,013 dated Nov. 21, 2019, pp. 1-108.
Daytime vs Night display on Garmin GPS, POI Factory, Jun. 2008, http://www.poi-factory.com/node/14562 (Year: 2008), pp. 1-3.
Official Communication for U.S. Appl. No. 15/859,008 dated Oct. 24, 2019, pp. 1-22.
Official Communication for U.S. Appl. No. 13/917,503 dated Dec. 31, 2019, pp. 1-28.
Official Communication for U.S. Appl. No. 14/846,349 dated Jan. 21, 2020, pp. 1-6.
Official Communication for U.S. Appl. No. 15/859,008 dated Feb. 26, 2020, pp. 1-8.
Beraldi, et al., "A Clustering Approach for Scenario Tree Reduction: an Application to a Stochastic Programming Portfolio Optimization Problem," TOP, vol. 22, No. 3, 2014, pp. 934-949.
Official Communication for U.S. Appl. No. 15/271,013 dated Mar. 23, 2020, pp. 1-45.
Official Communication for U.S. Appl. No. 14/981,747 dated Apr. 23, 2020, pp. 1-14.
Office Communication for U.S. Appl. No. 15/859,008 dated May 28, 2020, pp. 1-20.
Office Communication for U.S. Appl. No. 14/846,349 dated Jun. 8, 2020, pp. 1-32.
Office Communication for U.S. Appl. No. 13/917,503 dated Jun. 15, 2020, pp. 1-6.
Office Communication for U.S. Appl. No. 13/917,503 dated Jul. 29, 2020, pp. 1-6.
Examination Report for UK Patent Application No. GB1617238.9 dated Sep. 24, 2020, pp. 1-7.
Office Communication for U.S. Appl. No. 15/859,008 dated Oct. 9, 2020, pp. 1-22.
Office Communication for U.S. Appl. No. 14/846,349 dated Nov. 27, 2020, pp. 1-23.
Office Communication for U.S. Appl. No. 14/846,349 dated Dec. 9, 2020, pp. 1-12.
Office Communication for U.S. Appl. No. 15/271,013 dated Dec. 10, 2020, pp. 1-39.
Office Communication for U.S. Appl. No. 14/846,349 dated Feb. 12, 2021, pp. 1-4.
Examination Report for UK Patent Application No. GB1617238.9 dated Feb. 24, 2021, pp. 1-7.
Examination Report for UK Patent Application No. GB1621064.3 dated Feb. 26, 2021, pp. 1-3.
Office Communication for U.S. Appl. No. 14/846,349 dated Mar. 26, 2021, pp. 1-12.
Office Communication for U.S. Appl. No. 15/859,008 dated Apr. 19, 2021, pp. 1-23.
Examination Report for UK Patent Application No. GB1621092.4 dated Jan. 28, 2021, pp. 1-3.
Examination Report for UK Patent Application No. GB1722189.6 dated Jul. 8, 2021, pp. 1-4.
Office Communication for U.S. Appl. No. 14/846,349 dated Jul. 12, 2021, pp. 1-11.
"Apptio TBM Unified Model™ (ATUM™) The Standard Cost Model for IT," Apptio, 2014, pp. 1-13.
Official Communication for U.S. Appl. No. 14/867,552 dated Nov. 29, 2017, pp. 1-26.
Official Communication for U.S. Appl. No. 15/260,221 dated Jan. 9, 2018, pp. 1-28.
Official Communication for U.S. Appl. No. 15/379,267 dated Jan. 2, 2018, pp. 1-25.
Official Communication for U.S. Appl. No. 14/846,349 dated Jan. 18, 2018, pp. 1-39.
Official Communication for U.S. Appl. No. 13/837,815 dated Jan. 26, 2018, pp. 1-18.
Official Communication for U.S. Appl. No. 13/935,147 dated Jan. 17, 2018, pp. 1-3.
Official Communication for U.S. Appl. No. 14/869,721 dated Jan. 19, 2018, pp. 1-3.
Official Communication for U.S. Appl. No. 14/867,552 dated Feb. 13, 2018, pp. 1-3.
Official Communication for U.S. Appl. No. 15/859,008 dated Mar. 5, 2018, pp. 1-75.
Official Communication for U.S. Appl. No. 13/917,503 dated May 10, 2018, pp. 1-38.
Official Communication for U.S. Appl. No. 13/837,815 dated Apr. 5, 2018, pp. 1-4.
Official Communication for U.S. Appl. No. 14/869,721 dated May 11, 2018, pp. 1-33.
Official Communication for U.S. Appl. No. 14/867,552 dated May 31, 2018, pp. 1-22.
Official Communication for U.S. Appl. No. 15/858,945 dated Apr. 4, 2018, pp. 1-74.
Official Communication for U.S. Appl. No. 15/859,058 dated May 14, 2018, pp. 1-76.
Official Communication for U.S. Appl. No. 13/935,147 dated Apr. 5, 2018, pp. 1-14.
Official Communication for U.S. Appl. No. 14/981,747 dated Dec. 12, 2017, pp. 1-14.
Official Communication for U.S. Appl. No. 14/033,130 dated Dec. 20, 2017, pp. 1-14.

\* cited by examiner

| Hardware Costs | Purchased | Leased | Depreciation | Maintenance |
|---|---|---|---|---|
| Middleware Appliances | √ | √ | √ | √ |
| Servers | √ | √ | √ | √ |

| Software Costs | Purchased | Leased | Amortization | Maintenance |
|---|---|---|---|---|
| Servers - Run | √ | √ | √ | √ |
| Servers - System Software | √ | √ | √ | √ |
| Middleware | √ | √ | √ | √ |
| RDBMS | √ | √ | √ | √ |

| Labour/Outside Services Costs/Facilities Costs | Internal Labour Costs | External Labour Costs | Outside Services - Consulting | Outside Services - Service Providers | Facilities and Power |
|---|---|---|---|---|---|
| Plan | √ | √ | √ | √ | |
| Build | √ | √ | √ | √ | |
| Run | √ | √ | √ | √ | |
| Middleware | √ | √ | √ | √ | |
| Databases | √ | √ | √ | √ | |
| Servers | | | √ | √ | √ |

*FIG. 15*

| Hardware Costs | Purchased | Leased | Depreciation | Maintenance |
|---|---|---|---|---|
| Middleware Appliances | √ | √ | √ | √ |
| Mainframe | √ | √ | √ | √ |

| Software Costs | Purchased | Leased | Amortization | Maintenance |
|---|---|---|---|---|
| Mainframes - Run | √ | √ | √ | √ |
| Middleware Applications | √ | √ | √ | √ |
| Databases | √ | √ | √ | √ |
| Mainframe | √ | √ | √ | √ |

| Labour/Outside Services Costs/Facilities Costs | Internal Labour Costs | External Labour Costs | Outside Services | | Facilities and Power |
|---|---|---|---|---|---|
| | | | Consulting | Service Providers | |
| Plan | √ | √ | √ | √ | |
| Build | √ | √ | √ | √ | |
| Run | √ | √ | √ | √ | |
| Middleware | √ | √ | √ | √ | |
| Databases | √ | √ | √ | √ | |
| Mainframe | | | √ | √ | √ |

*FIG. 17*

| Hardware Costs | Purchased | Leased | Depreciation | Maintenance |
|---|---|---|---|---|
| Tiered Disk | √ | √ | √ | √ |
| Virtual Tape | √ | √ | √ | √ |
| Tape | √ | √ | √ | √ |
| Storage Infrastructure | √ | √ | √ | √ |

| Software Costs | Purchased | Leased | Amortization | Maintenance |
|---|---|---|---|---|
| Storage - Run | √ | √ | √ | √ |
| Tiered Disk | √ | √ | √ | √ |
| Storage Infrastructure | √ | √ | √ | √ |

| Labour/Outside Services Costs/Facilities Costs | Internal Labour Costs | External Labour Costs | Outside Services (Consulting) | Outside Services (Service Providers) | Other | Facilities and Power |
|---|---|---|---|---|---|---|
| Plan | √ | √ | √ | √ | | |
| Build | √ | √ | √ | √ | | |
| Run | √ | √ | √ | √ | | |
| Tiered Disk | | | √ | √ | | |
| Virtual Tape | | | √ | √ | | |
| Tape | | | √ | √ | √ | |
| Storage Infrastructure | | | √ | √ | | √ |

*FIG. 19*

| Config/Volumes | | | | |
|---|---|---|---|---|
| Run | 2<sup>nd</sup> level incidents | | | |
| Tiered Disk | Total installed Tb * | Total addressable TB * | % SAN<br>%NAS | %Mainframe<br>%Server |
| Tiered Disk | % Servers | % By Tier | GB per Month (cloud) | |
| Virtual Tape | Total installed TB * | Total addressable TB | Number of Tape Libraries | |
| Tape | Total addressable TB * | Number of Tape Libraries | | |
| Storage Infrastructure | Number of * Switches | Number of Ports * | | |

| Utilisation | | |
|---|---|---|
| Tiered Disk | Percentage utilisation | |
| Virtual Tape | Percentage utilisation | |
| Tape | Percentage utilisation | |
| Storage Infrastructure | Percentage Availability | Number of Used Ports |

| Personnel Counts | Internal FTEs | External FTEs |
|---|---|---|
| Plan | √ | √ |
| Build | √ | √ |
| Run | √ | √ |

*FIG. 20*

| Hardware Costs | Purchased | Leased | Depreciation | Maintenance |
|---|---|---|---|---|
| Local Print | √ | √ | √ | √ |
| Devices | √ | √ | √ | √ |

| Software Costs | Purchased | Leased | Amortization | Maintenance |
|---|---|---|---|---|
| EUC - Run | √ | √ | √ | √ |
| Office Applications | √ | √ | √ | √ |
| Collaboration | √ | √ | √ | √ |
| Devices | √ | √ | √ | √ |

| Labour/Outside Services Costs/Facilities Costs | Internal Labour Costs | External Labour Costs | Outside Services | | Other | Facilities and Power |
|---|---|---|---|---|---|---|
| | | | Consulting | Service Providers | | |
| Plan | √ | √ | √ | √ | | |
| Build | √ | √ | √ | √ | | |
| Run | √ | √ | √ | √ | | |
| Office Applications | √ | √ | √ | √ | | |
| Collaboration | √ | √ | √ | √ | | |
| Local Print | | | √ | √ | √ | |
| Devices | | | √ | √ | | √ |

| Config/Volumes | | | | |
|---|---|---|---|---|
| Run | 2nd level incidents | | | |
| Office Applications | Total user licenses ✻ | | | |
| Collaboration | Total user licenses ✻ | | | |
| Local Print | Total printers ✻ | | | |
| Devices | Total users ✻ | Total PCs | Total Laptops | Total mobiles |
| Devices | Total thin clients | Total virtual clients | Total tablets | |

| Utilisation | |
|---|---|
| Devices | % EUC Service Availability |

| Personnel Counts | Internal FTEs | External FTEs |
|---|---|---|
| Plan | √ | √ |
| Build | √ | √ |
| Run | √ | √ |
| Office Applications | √ | √ |
| Collaboration | √ | √ |

| Config/Volumes | | | | |
|---|---|---|---|---|
| Run | 2<sup>nd</sup> level incidents | | | |
| Email | Number of Mailboxes * | Number of Address Lists | Number of instances of Email server * | Total User Count |
| Email | Total Email Storage GB | | | |

| Utilisation | |
|---|---|
| Email | Percentage Availability |

| Personnel Counts | Internal FTEs | External FTEs |
|---|---|---|
| Plan | √ | √ |
| Build | √ | √ |
| Run | √ | √ |

| Hardware Costs | Purchased | Leased | Depreciation | Maintenance |
|---|---|---|---|---|
| Service Desk | √ | √ | √ | √ |

| Software Costs | Purchased | Leased | Amortization | Maintenance |
|---|---|---|---|---|
| Incident & Problem | √ | √ | √ | √ |
| Service Desk | √ | √ | √ | √ |

| Labour/Outside Services Costs/Facilities Costs | Internal Labour Costs | External Labour Costs | Outside Services | | Facilities and Power |
|---|---|---|---|---|---|
| | | | Consulting | Service Providers | |
| Level 0/1 | √ | √ | √ | √ | |
| Incident & Problem | √ | √ | √ | √ | |
| Service Desk | √ | √ | √ | √ | √ |

*FIG. 25*

| Hardware Costs | Purchased | Leased | Depreciation | Maintenance |
|---|---|---|---|---|
| LAN | √ | √ | √ | √ |
| WLAN | √ | √ | √ | √ |

| Labour/Outside Services Costs/Facilities Costs | Internal Labour Costs | External Labour Costs | Outside Services | | Facilities and Power |
|---|---|---|---|---|---|
| | | | Consulting | Service Providers | |
| Plan | √ | √ | √ | √ | |
| Build | √ | √ | √ | √ | |
| Run | √ | √ | √ | √ | |
| LAN | | | √ | √ | |
| WLAN | | | √ | √ | |

3000

| Hardware Costs | Purchased | Leased | Depreciation | Maintenance |
|---|---|---|---|---|
| WAN | √ | √ | √ | √ |

| Labour/Outside Services Costs/Facilities Costs | Internal Labour Costs | External Labour Costs | Outside Services | | Facilities and Power |
| | | | Consulting | Service Providers | |
|---|---|---|---|---|---|
| Plan | √ | √ | √ | √ | |
| Build | √ | √ | √ | √ | |
| Run | √ | √ | √ | √ | |
| WAN | | | √ | √ | |

*FIG. 29*

| Hardware Costs | Purchased | Leased | Depreciation | Maintenance |
|---|---|---|---|---|
| Non - VoIP | √ | √ | √ | √ |
| VoIP | √ | √ | √ | √ |

| Software Costs | Purchased | Leased | Amortization | Maintenance |
|---|---|---|---|---|
| Non - VoIP | √ | √ | √ | √ |
| VoIP | √ | √ | √ | √ |

| Labour/Outside Services Costs/Facilities Costs | Internal Labour Costs | External Labour Costs | Outside Services | | Facilities and Power |
|---|---|---|---|---|---|
| | | | Consulting | Service Providers | |
| Plan | √ | √ | √ | √ | |
| Build | √ | √ | √ | √ | |
| Run | √ | √ | √ | √ | |
| Non - VoIP | | | √ | √ | |
| VoIP | | | √ | √ | |

| Config/Volumes | | | | |
|---|---|---|---|---|
| Run | 2nd level incidents | | | |
| Non - VoIP | Number of locations ✶ | Number of Handsets | Number of PBxs ✶ | Number of Voice Mailboxes |
| VoIP | Number of ✶ locations | Number of Handsets | Number of Ports ✶ | Number of Voice Mailboxes |

| Utilisation | | |
|---|---|---|
| Non - VoIP | Percentage service availability | |
| VoIP | Percentage service availability | Number of Used Ports |

| Personnel Counts | Internal FTEs | External FTEs |
|---|---|---|
| Plan | √ | √ |
| Build | √ | √ |
| Run | √ | √ |

*FIG. 32*

| Hardware Costs | Purchased | Leased | Depreciation | Maintenance |
|---|---|---|---|---|
| Contact Centre | √ | √ | √ | √ |
| Network Security | √ | √ | √ | √ |
| VPN/RAS | √ | √ | √ | √ |
| Cable | √ | √ | √ | √ |
| Telepresence | √ | √ | √ | √ |

| Software Costs | Purchased | Leased | Amortization | Maintenance |
|---|---|---|---|---|
| Contact Centre | √ | √ | √ | √ |
| Network Security | √ | √ | √ | √ |
| VPN/RAS | √ | √ | √ | √ |

| Labour/Outside Services Costs/Facilities Costs | Internal Labour Costs | External Labour Costs | Outside Services | | Facilities & Power |
| | | | Consulting | Service Providers | |
|---|---|---|---|---|---|
| Contact Centre | √ | √ | √ | √ | |
| Network Security | √ | √ | √ | √ | |
| VPN/RAS | √ | √ | √ | √ | |
| Cable | √ | √ | √ | √ | |
| Telepresence | √ | √ | √ | √ | |

*FIG. 33*

| Config/Volumes | | | | |
|---|---|---|---|---|
| Contact Centre | Number of Stations✶ | Number of ACDs | Number of IVRs | Number of ✶ Locations |
| Network Security | Number of Security Devices ✶ | Number of Access Links ✶ | Number of Sensors | Number of Users |
| VPN/RAS | Number of RAS Servers | Number of VPN Servers | $2^{nd}$ level incidents | Number of Users✶ |
| Cable | Number of Outlets | Number of Changes ✶ | | |
| Telepresence | Number of Suites✶ | Number of Audio ✶ Bridges | | |

| Utilisation | |
|---|---|
| Contact Centre | Number of Used Stations |
| Network Security | Percentage availability |
| VPN/RAS | Percentage availability |
| Telepresence | Percentage availability |

| Personnel Counts | Internal FTEs | External FTEs |
|---|---|---|
| Contact Centre | √ | √ |
| Network Security | √ | √ |
| VPN/RAS | √ | √ |
| Cable | √ | √ |
| Telepresence | √ | √ |

| Config/Volumes | | | | |
|---|---|---|---|---|
| Telecoms | Percentage of costs for WAN | Percentage of costs for Voice | Percentage of costs for ISP Line | Percentage of costs for ISP Usage charges |

3502

| Labour/Outside Services Costs/Facilities Costs | Internal Labour Costs | External Labour Costs | Outside Services | Telecoms | Facilities and Power |
|---|---|---|---|---|---|
| Telecoms | | | | √ | |

*FIG. 35*

| Hardware Costs | Purchased | Leased | Depreciation | Maintenance |
|---|---|---|---|---|
| Central Print | √ | √ | √ | √ |
| Post Processing | √ | √ | √ | √ |

| Software Costs | Purchased | Leased | Amortization | Maintenance |
|---|---|---|---|---|
| Central Print | √ | √ | √ | √ |
| Post Processing | √ | √ | √ | √ |

| Labour/Outside Services Costs/Facilities Costs | Internal Labour Costs | External Labour Costs | Outside Services | | Facilities and Power |
|---|---|---|---|---|---|
| | | | Consulting | Service Providers | |
| Central Print | √ | √ | √ | √ | |
| Post Processing | √ | √ | √ | √ | |

| Config/Volumes | | | |
|---|---|---|---|
| Central Print | Total Pages/Images * | Number of Printers | Number of standard Page Types |
| Post Processing | Number of Envelopes * processed | Number of Enveloping Machines | Number of Items Processed * |

| Personnel Counts | Internal FTEs | External FTEs |
|---|---|---|
| Central Print | √ | √ |
| Post Processing | √ | √ |

*FIG. 37*

| Software Costs | Purchased | Leased | Amortization | Maintenance |
|---|---|---|---|---|
| App Operations | √ | √ | √ | √ |
| App Support | √ | √ | √ | √ |
| Fix on Fail | √ | √ | √ | √ |
| Apps Mgmt & Ops | √ | √ | √ | √ |

| Labour/Outside Services Costs/Facilities Costs | Internal Labour Costs | External Labour Costs | Outside Services | | Managed Services |
| | | | Consulting | Service Providers | |
|---|---|---|---|---|---|
| App Operations | √ | √ | √ | √ | |
| App Support | √ | √ | √ | √ | √ |
| Fix On Fail | √ | √ | √ | √ | √ |
| Apps Mgmt & Ops | √ | √ | √ | √ | √ |

| Software Costs | Purchased | Leased | Amortization | Maintenance |
|---|---|---|---|---|
| App Dev Projects | √ | √ | √ | √ |

| Labour/Outside Services Costs/Facilities Costs | Internal Labour Costs | External Labour Costs | Outside Services | | Managed Services |
|---|---|---|---|---|---|
| | | | Consulting | Service Providers | |
| Analysis | √ | √ | √ | √ | |
| Design | √ | √ | √ | √ | |
| Development/Code | √ | √ | √ | √ | |
| Test | √ | √ | √ | √ | |
| Release Packaging | √ | √ | √ | √ | |
| App Dev Projects | √ | √ | √ | √ | |

*FIG. 40*

| Config/Volumes | | |
|---|---|---|
| Release Packaging | Total number of software releases | |
| App Dev Projects | Total number of application development projects * | Total number of application releases |

| Personnel Counts | Internal Staffing | External Staffing |
|---|---|---|
| Analysis | Hours or FTEs * | Hours or FTEs * |
| Design | Hours or FTEs * | Hours or FTEs * |
| Development/Code | Hours or FTEs * | Hours or FTEs * |
| Test | Hours or FTEs * | Hours or FTEs * |
| Release Packaging | Hours or FTEs * | Hours or FTEs * |
| App Dev Projects | Hours or FTEs * | Hours or FTEs * |

FIG. 41

| Software Costs | Purchased | Leased | Amortization | Maintenance |
|---|---|---|---|---|
| SaaS | √ | √ | √ | √ |
| PaaS | √ | √ | √ | √ |
| COTS | √ | √ | √ | √ |

| Labour/Outside Services Costs/Facilities Costs | Internal Labour Costs | External Labour Costs | Outside Services | | Managed Services |
| | | | Consulting | Service Providers | |
|---|---|---|---|---|---|
| PaaS | √ | √ | √ | √ | |
| COTS | √ | √ | √ | √ | |

— 4300

| Config/Volumes | | | |
|---|---|---|---|
| SaaS | Number of Users | Number of applications | Number of Licences ✻ |
| PaaS | Number of Users | Number of applications | Number of Licences ✻ |
| COTS | Number of Users | Number of applications | Number of Licences ✻ |

| Personnel Counts | Internal Staffing | External Staffing |
|---|---|---|
| SaaS | Hours or FTEs | Hours or FTEs |
| PaaS | Hours or FTEs | Hours or FTEs |
| COTS | Hours or FTEs | Hours or FTEs |

*FIG. 43*

| Software Costs | Purchased | Leased | Amortization | Maintenance |
|---|---|---|---|---|
| Plan | √ | √ | √ | √ |
| Implement | √ | √ | √ | √ |
| Manage | √ | √ | √ | √ |

| Labour/Outside Services Costs/Facilities Costs | Internal Labour Costs | External Labour Costs | Outside Services | | Facilities and Power |
| | | | Consulting | Service Providers | |
|---|---|---|---|---|---|
| Plan | √ | √ | √ | √ | |
| Implement | √ | √ | √ | √ | |
| Manage | √ | √ | √ | √ | |

— 4500

| Config/Volumes | | | |
|---|---|---|---|
| Plan | Number of Projects * | Number of Project Hours | Total Project Budget * |
| Implement | Number of Projects * | Number of Project Hours | |
| Manage | Number of People Managed | Total Number of Projects * | Total Number of Project Hours | Total Project Budget * |

| Personnel Counts | Internal Staffing | External Staffing |
|---|---|---|
| Plan | Hours or FTEs | Hours or FTEs |
| Implement | Hours or FTEs | Hours or FTEs |
| Manage | Hours or FTEs | Hours or FTEs |

| Software Costs | Purchased | Leased | Amortization | Maintenance |
|---|---|---|---|---|
| Service Continuity | √ | √ | √ | √ |
| Security Policy | √ | √ | √ | √ |
| Management Services | √ | √ | √ | √ |

| Labour/Outside Services Costs/Facilities Costs | Internal Labour Costs | External Labour Costs | Outside Services | | Facilities and Power |
| | | | Consulting | Service Providers | |
|---|---|---|---|---|---|
| Vendor Management | √ | √ | | | |
| Service Continuity | √ | √ | √ | √ | |
| Security Policy | √ | √ | √ | √ | |
| Service & Account Management | √ | √ | √ | √ | |
| Management Services | √ | √ | √ | √ | |

| Config/Volumes | | |
|---|---|---|
| Vendor Management | Number of Vendors | |
| Management Services | Total Number of IT Users ✱ | Total IT Budget ✱ |

| Personnel Counts | Internal FTEs | External FTEs |
|---|---|---|
| Vendor Management | √ | √ |
| Service Continuity | √ | √ |
| Security Policy | √ | √ |
| Service & Account Management | √ | √ |
| Management Services | √ | √ |

*FIG. 47*

UNIFIED MODELING OF TECHNOLOGY TOWERS

TECHNICAL FIELD

The present invention relates generally to computer automated activity based budget modeling, forecasting and cost accounting, and more particularly, but not exclusively to unified modeling of budgets.

BACKGROUND

Businesses that strive to remain viable and successful in today's competitive commercial environment are required to adopt accurate and responsive budgeting practices. To improve efficiency, businesses use financial models that apply modern budgeting, forecasting and cost accounting techniques. For some accounting techniques, the complexity of the financial allocation model may increase as the number of tracked activities and elements increases. Therefore, for larger organizations, sophisticated computer programs and computers are often required to assist in generating useful and relevant budgets based on financial allocation models.

In some cases, the large number of items and entities required for financial modeling can make development of modeling applications difficult. Further, the size and complexity of modern financial allocation models can make it difficult to design allocation rules for the cost allocations between groups and/or items within the model. Historically, the size and complexity of these financial allocation models have made it difficult to accurately ascertain a total cost of ownership for an offering such as a product and/or service. Thus, it is with respect to these considerations and others that the invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. For a better understanding of the present invention, reference will be made to the following Description of the Various Embodiments, which is to be read in association with the accompanying drawings, wherein:

FIGS. 15-18 illustrate the cost pools and cost drivers for a compute technology tower in accordance with at least one of the various embodiments;

FIGS. 19-20 illustrate cost pools and cost drivers for including in a storage technology tower in accordance with at least one of the various embodiments;

FIGS. 21-26 illustrate the cost pools and cost drivers for an end-users services technology tower in accordance with at least one of the various embodiments;

FIGS. 27-34 illustrate the cost pools and cost drivers for a network technology tower in accordance with at least one of the various embodiments;

FIG. 35 illustrate the cost pools and cost drivers for including in a telecoms technology tower in accordance with at least one of the various embodiments;

FIGS. 36-37 illustrate the cost pools and cost drivers for including in an output management technology tower in accordance with at least one of the various embodiments;

FIGS. 38-43 illustrate the cost pools and cost drivers for an application management technology tower in accordance with at least one of the various embodiments;

FIGS. 44-45 illustrate the cost pools and cost drivers for including in a projects technology tower in accordance with at least one of the various embodiments; and FIGS. 46-47 illustrate the cost pools and cost drivers for including in a cross-functional services technology tower in accordance with at least one of the various embodiments.

DETAILED DESCRIPTION OF THE INVENTION

Figure 1:
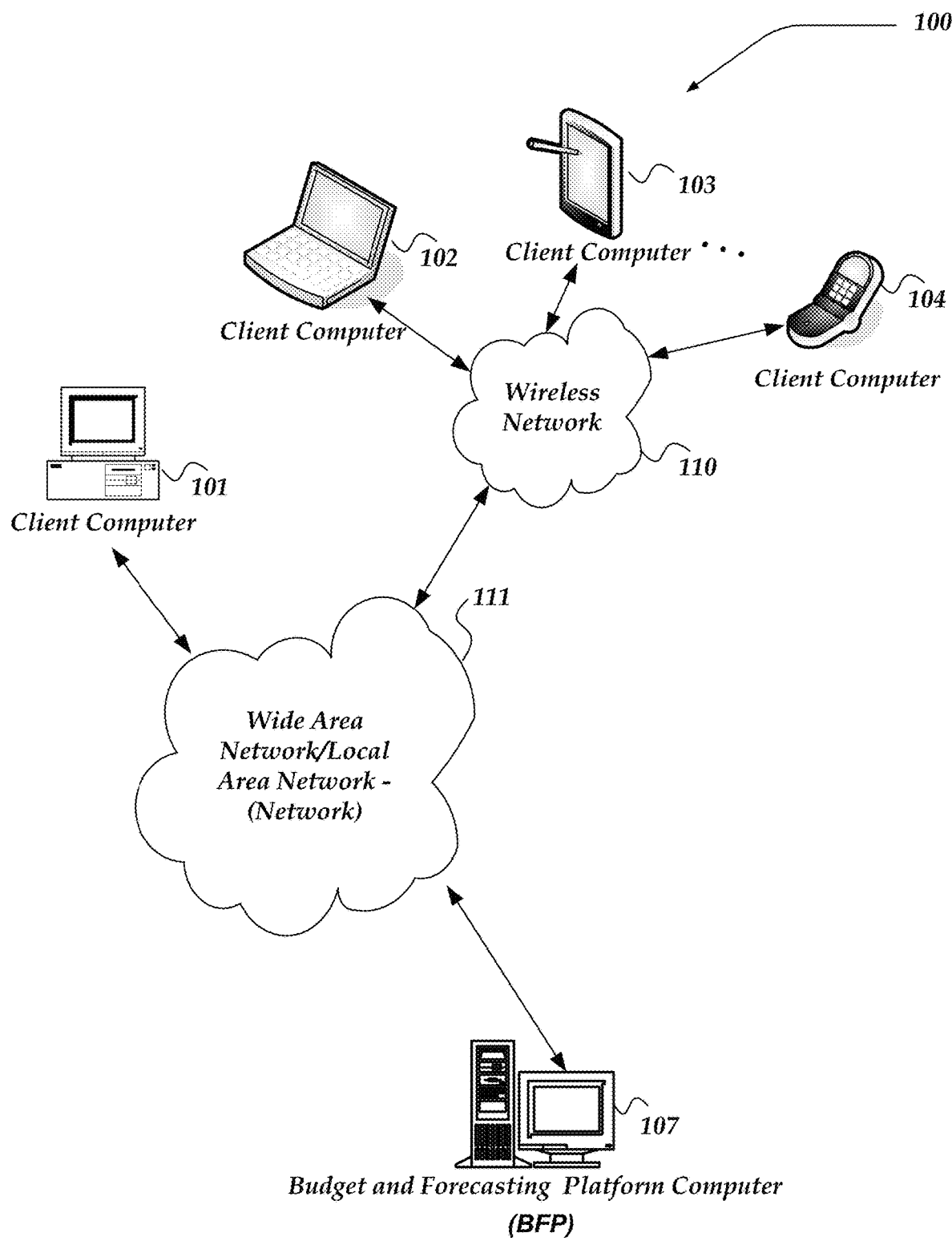
FIG. 1 illustrates a system diagram showing components of an environment in which at least one of the various embodiments may be practiced.

The present invention now will be described more fully hereinafter with reference to the accompanying drawings, which forma part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, computers, or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "In one of the embodiments" or "in at least one of the various embodiments" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "Financial model," "data model", "financial data model," and "cost model" refers to one or more embodiments of a representation of a system of a financial model that may include allocation rules that can be used for costing actual expenditures (for management accounting) or budgeting future expenditures. In some embodiments, nodes in a graph-based model may represent classes of items and/or cost items that may be associated with costs and/or expenses. The edges of the graph may represent how the costs and/or expenses may be allocated between the nodes. A financial model may be a visual rendering of a graph showing the nodes and the edges connecting the nodes. Technology towers may be used to provide model information such as, costs, cost drivers, and key performances for a financial model As used herein, the term "cost pool" refers to an entry in a technology tower that represents a portion of the money cost for a particular cost item. Cost pools may aggregate the costs for one or more assets or services that may be associated with a cost item. Technology towers may include one or more cost pools for each cost item in the tower.

As used herein, the term "cost driver" refers to known characteristics and/or features of a cost item. Cost drivers may vary based on the features/characteristics of their associated cost item. Technology towers may enable the generation of one or more key performance indicators based on cost pools and cost drivers.

As used herein, the term "activity driver" refers to a cost driver that may be determined to be suitable for use in an allocation rule, or otherwise employed as part of a financial model. Activity drivers may be known characteristics and/or features of a cost item that may be determined to significantly influence the costs of the cost item. Accordingly, in at least one of the various embodiments, different cost items may include different activity drivers.

As used herein, the term "cost item" refers to an item in a technology tower and its associated cost/expense. Accordingly, one or more cost pools and one or more cost drivers may be associated with each cost item. In some cases, cost items may represent one or more categories of costs that an organization may incur.

As used herein, the term "external data source" refers to any separately located system that may enable and/or provide access to one or more datasets of information. An example of external data sources may include an organization's configuration management database, or the like.

As used herein, the term "dataset" refers to a collection of data, usually presented in tabular form. Each column may represent a particular variable. Each row may represent a given member of the dataset. Also, it may list values for fields for each of the variables, such as name, location, cost, owner, manufacturer, serial number, or the like. Non-tabular datasets can also take the form of marked up strings of characters, such as an XML file. Datasets may include information used for determining cost items, cost information, cost pools, cost driver, or the like, that may be employed for generating a technology tower. Datasets may include information that may be used for generating technology towers, business systems and data models. General Ledger (GL) accounting records relating to the cost items, cost pools, and cost drivers may be included in datasets. Further, datasets may include information about physical IT assets, fixed assets, software licenses, employees, labor costs, insurance records, vendor costs, utility costs (electricity, water, sewer, broadband, natural gas, oil, or the like), consulting expenses, legal fees, or the like. In some cases, the information included in datasets may be provided by one or more configuration management databases, or the like.

As used herein, the term "technology tower" refers to a data structure that includes cost items, cost pools, cost drivers, and activity drivers that may be grouped and/or associated together. Technology towers may be arranged to represented different category of resources that may be provisioned in an organization, such as, compute services, end-user services, networking, application/development management, storage, telecommunication, projects, output management, cross-functional services, or the like. Cost pools and cost drivers, and activity drivers that are associated with cost items and the task and/or services they may be used for may be included in a technology tower.

As used herein the term "technology sub-tower," "services sub-tower," "infrastructure sub-tower," or "sub-tower" refer to cost items, cost pools, cost drivers, and activity drivers that are grouped and/or associated together that represent a sub-classification and/or specialization with a technology tower. For example, the technology tower "networking" may include the sub-towers, local area networking, wide area networking, voice networks, or the like. Sub-towers often share cost pool definitions while having different cost drivers and/or activity drivers.

As used herein the term "template information" refers to information for defining the particular cost items, cost pools, cost drivers, activity drivers, or the like for a technology tower.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated various embodiments are directed toward unified modeling of technology towers. In at least one of the various embodiments, template information that corresponds to a technology tower may be selected by a user such that the template information identifies cost items, cost pools, and cost drivers for the technology tower. In at least one of the various embodiments, cost information corresponding to the cost items may be determined from a dataset that include information about the organization technology resources. In at least one of the various embodiments, cost information from the dataset may be mapped to cost pools based in part on the template information. In at least one of the various embodiments, cost driver information for the cost drivers may be determined from the information that was included in the dataset.

In at least one of the various embodiments, a technology tower may be generated based on the cost pools and the cost drivers such that the cost pools and cost drivers correspond to at least one cost item. In at least one of the various embodiments, the technology tower may include one or more sub-towers. In at least one of the various embodiments, the technology tower may be provided to an application such as a budget and forecasting application and employed for generating one or more financial models that include one or more of the cost items.

In at least one of the various embodiments, mapping the cost information to the cost pools, may include, mapping hardware costs and software costs such that the hardware costs and the software cost are separated into at least purchase costs, lease costs, and maintenance costs. Likewise, in at least one of the various embodiments, mapping the cost information to the cost pools may include, mapping labor costs such that the labor costs are separated into at least internal labor costs and external labor costs.

In at least one of the various embodiments, determining the cost driver information for some of the cost drivers may include, determining one or more countable configuration features of the cost items included in the technology tower. Also in at least one of the various embodiments, determining the cost driver information for one or more of the cost drivers may include, determining personnel counts associated with a cost item such that the personnel counts are separated into internal full-time equivalents (FTEs) and external FTEs.

In at least one of the various embodiments, one or more key performance indicators for a cost item may be generated based on the cost pools and the cost drivers.

In at least one of the various embodiments, the cost pools, or the cost drivers may be modified based on business information that is separate from the dataset. In at least one of the various embodiments, business information may include information that may be provided by a user employing a user interface.

Illustrated Operating Environment

FIG. 1 shows components of one embodiment of an environment in which at least one of the various embodiments may be practiced. Not all of the components may be required to practice various embodiments, and variations in the arrangement and type of the components may be made. As shown, system 100 of FIG. 1 includes local area networks ("LANs")/wide area networks ("WANs")-(network) 111, wireless network 110, client computers 101-104, and Budget and Forecasting Platform (BFP) Computer 107.

Generally, client computers 102-104 may include virtually any portable computer capable of receiving and sending a message over a network, such as network 111, wireless network 110, or the like. Client computers 102-104 may also be described generally as client computers that are configured to be portable. Thus, client computers 102-104 may include virtually any portable computer capable of connecting to another computer and receiving information. Such devices include portable devices such as, cellular telephones, smart phones, display pagers, radio frequency (RF) devices, infrared (IR) devices. Personal Digital Assistants (PDA's), handheld computers, laptop computers, wearable computers, tablet computers, integrated devices combining one or more of the preceding devices, computer, or the like. As such, client computers 102-104 typically range widely in terms of capabilities and features. For example, a cell phone may have a numeric keypad and a few lines of monochrome Liquid Crystal Display (LCD) on which only text may be displayed. In another example, a web-enabled mobile computer may have a touch sensitive screen, a stylus, and several lines of color LCD in which both text and graphics may be displayed.

Client computer 101 may include virtually any computer capable of communicating over a network to send and receive information, including messaging, performing various online actions, or the like. The set of such computers may include computers that typically connect using a wired or wireless communications medium such as personal computers, tablet computers, multiprocessor systems, microprocessor-based or programmable consumer electronics, network Personal Computers (PCs), or the like. In at least one of the various embodiments, at least some of client computers 102-104 may operate over wired and/or wireless network. Today, many of these computers include a capability to access and/or otherwise communicate over a network such as network 111 and/or wireless network 110. Moreover, client computers 102-104 may host or access various computing applications, including a browser, or other web-based application.

In at least one of the various embodiments, one or more of client computers 101-104 may be configured to operate within a business or other entity to perform a variety of services for the business or other entity. For example, client computers 101-104 may be configured to operate as a web server, an accounting server, a production server, an email server, video game server, an inventory server, or the like. However, client computers 101-104 are not constrained to these services and may also be employed, for example, as an end-user computing node, in other embodiments. Further, it should be recognized that more or less client computers may be included within a system such as described herein, and embodiments are therefore not constrained by the number or type of client computers employed.

A web-enabled client computer may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In at least one of the various embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, or the like, to display and send a message. In at least one of the various embodiments, a user of the client computer may employ the browser application to perform various actions over a network.

Client computers 101-104 also may include at least one other client application that is configured to receive and/or send data, including budgeting and forecasting information, between another computer. Client applications may include a capability to provide requests and/or receive data relating to the cost models, budget reports, budget project information, allocation rules, or the like. The client application may provide data representing assignment and/or allocation changes, selecting templates, editing cost allocations between or among categories, inputs for a unified model, or the like. In at least one of the various embodiments, client applications may receive and/or generate data related to budgeting and financial models and may generate tables and relationships between and among the data. In at least one of the various embodiments, client computers 101-104 may view and/or modify one or more data models.

Wireless network 110 is configured to couple client computers 102-104 and its components with network 111. Wireless network 110 may include any of a variety of wireless sub-networks that may further overlay stand-alone ad-hoc networks, or the like, to provide an infrastructure-oriented connection for client computers 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G), 5th (5G) generation radio access for cellular systems, WLAN, Wireless Router (WR) mesh, or the like. Access technologies such as 2G, 3G, 4G, 5G, and future access networks may enable wide area coverage for mobile computers, such as client computers 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), High Speed Downlink Packet Access (HSDPA), Long Term Evolution (LTE), or the like. In essence, wireless network 110 may include virtually any wireless communication mechanism by which information may travel between client computers 102-104 and another computer, network, or the like.

Network 111 is configured to couple network computers with other computers, including, BFP 107, client computer(s) 101, and through wireless network 110 to client computers 102-104. Network 111 is enabled to employ any form of computer readable media for communicating information from one electronic device to another. Also, network 111 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. For example, various Internet Protocols (IP), Open Systems Interconnection (OSI) architectures, and/or other communication protocols, architectures, models, and/or standards, may also be employed within network 111 and wireless network 110. Furthermore, remote computers and other related electronic devices could be remotely connected to either LANs or WANs via a modem and temporary telephone link. In essence, network 111 includes any communication method by which information may travel between computers.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media. Such communication media is distinct from, however, processor-readable storage devices described in more detail below.

Figure 2:
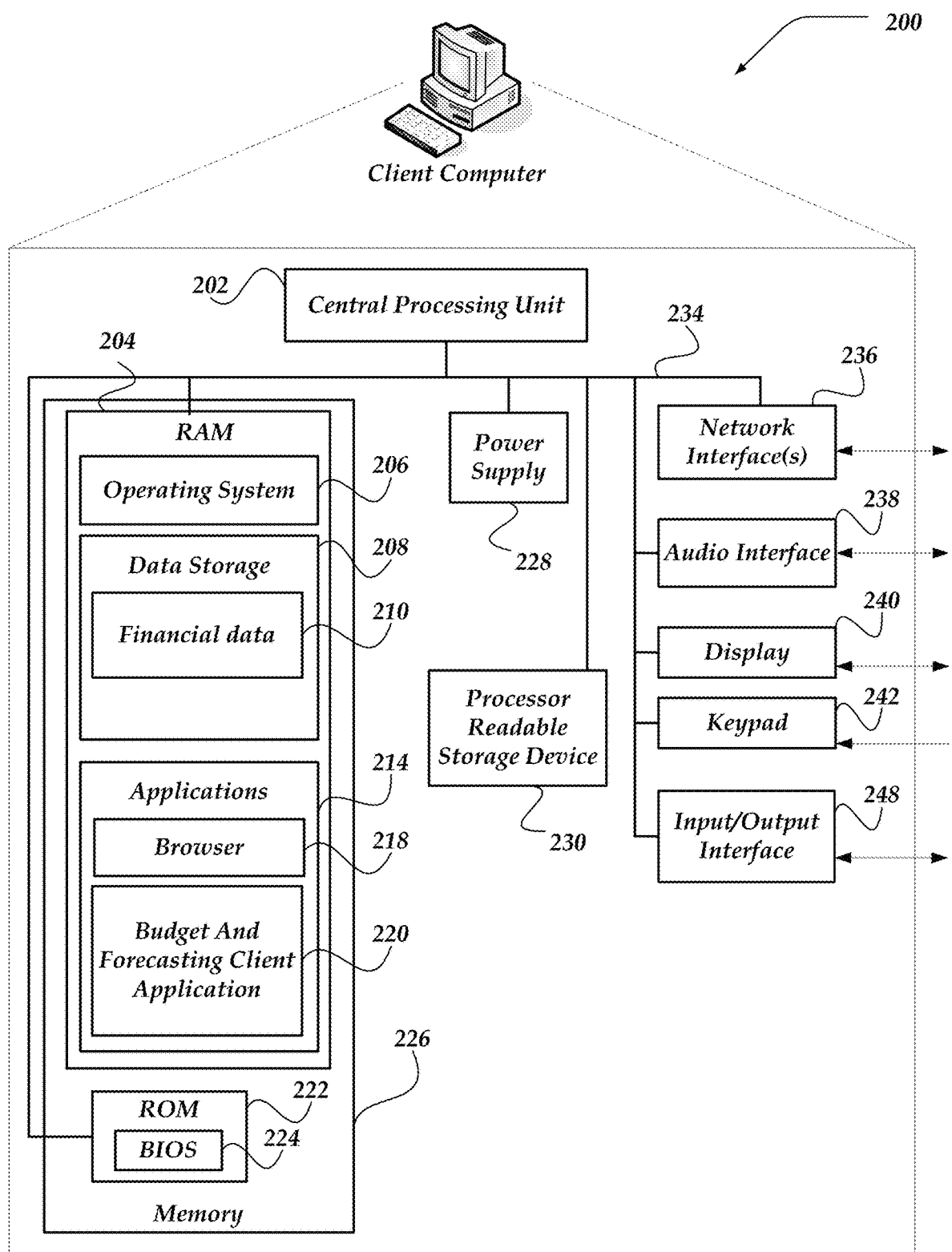
FIG. 2 shows one embodiment of a client computer that may be included in a system.

BFP 107 may include virtually any network computer usable to perform data processing operation that may be used for generating unified models, cost models, data models, allocation rules, recursive allocation rules, cost allocations, heritage information, total cost values for offerings, displays and/or reports thereof, such as network computer 200 of FIG. 2. In at least one of the various embodiments, BFP 107 employs various techniques to create, define, generate, and/or automated data processing applications such as budgeting and financial management applications and one or more cost models and/or data models. BFP 107 may include modules for generating data processing applications that may apply models that may include dataset templates, category templates, allocation rules, unified models, or the like. Furthermore, BFP 107 may include and/or generate data processing applications for visualizing the generated allocation categories, cost allocations, budgets, cost models, data models, allocation rules, unified models, or the like.

Computers that may operate as BFP 107 include various network computers, including, but not limited to personal computers, desktop computers, multiprocessor systems, microprocessor-based or programmable consumer electronics, network PCs, server computers, tablet computers, network appliances, or the like. It should be noted that while BFP 107 is illustrated as a single network computer, the invention is not so limited. Thus, in another embodiment, BFP 107 may represent a plurality of network computers. For example, in at least one of the various embodiments, BFP 107 may be distributed over a plurality of network computers and/or implemented using cloud architecture.

Moreover, BFP 107 is not limited to a particular configuration. Rather, BFP 107 may operate using a controller/ worker approach over a plurality of network computers, within a cluster, a peer-to-peer architecture, cloud-based architecture (e.g., virtual machines), and/or any of a variety of other architectures. Thus, BFP 107 is not to be construed as being limited to a single environment, and other configurations, and architectures are also envisaged. BFP 107 may employ processes and such as described below in conjunction with FIG. 4 and above to perform at least some of its actions.

Illustrative Client Computer

FIG. 2 shows one embodiment of client computer 200 that may be included in a system implementing at least one of the various embodiments. Client computer 200 may include many more or less components than those shown in FIG. 2. However, the components shown are sufficient to disclose an illustrative embodiment for practicing the present invention. Client computer 200 may represent, for example, one embodiment of at least one of client computers 101-104 of FIG. 1.

As shown in the figure, client computer 200 includes a central processing unit ("CPU") 202 in communication with a mass memory 226 via a bus 234. Client computer 200 also includes a power supply 228, one or more network interfaces 236, an audio interface 238, a display 240, a keypad 242, and an input/output interface 248. Power supply 228 provides power to client computer 200. A rechargeable or non-rechargeable battery may be used to provide power. The power may also be provided by an external power source, such as an AC adapter or a powered docking cradle that supplements and/or recharges a battery.

Client computer 200 may optionally communicate with a base station (not shown), or directly with another computer. Network interface 236 includes circuitry for coupling client computer 200 to one or more networks, and is constructed for use with one or more communication protocols and technologies including, but not limited to, global system for mobile communication ("GSM"), code division multiple access ("CDMA"), time division multiple access ("TDMA"), LTE, HSDPA, user datagram protocol ("UDP"), transmission control protocol/Internet protocol ("TCP/IP"), short message service ("SMS"), general packet radio service ("GPRS"), WAP, ultra wide band ("UWB"), IEEE 802.16 Worldwide Interoperability for Microwave Access ("WiMax"), session initiated protocol/real-time transport protocol ("SIP/RTP"), or any of a variety of other wireless communication protocols. Network interface 236 is sometimes known as a transceiver, transceiving device, or network interface card ("NIC").

Audio interface 238 may be arranged to produce and receive audio signals such as the sound of a human voice. For example, audio interface 238 may be coupled to a speaker and microphone (not shown) to enable telecommunication with others and/or generate an audio acknowledgement for some action. Display 240 may be a liquid crystal display ("LCD"), gas plasma, light emitting diode ("LED"), organic LED, electronic ink, or any other type of display used with a computer. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Client computer 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Mass memory 226 includes a Random Access Memory ("RAM") 204, a Read-only Memory ("ROM") 222, and other storage means. Mass memory 226 illustrates an example of computer readable storage media (devices) for storage of information such as computer readable instructions, data structures, program modules or other data. Mass memory 226 stores a basic input/output system ("BIOS") 224 for controlling low-level operation of client computer 200. The mass memory also stores an operating system 206 for controlling the operation of client computer 200. It will be appreciated that this component may include a general-purpose operating system such as a version of UNIX, or LINUX™, or a specialized client communication operating system such as Windows Mobile™, Google Android™, Apple iOS™, or the Symbian® operating system. The operating system may include, or interface with a Java virtual machine module that enables control of hardware components and/or operating system operations via Java application programs.

Mass memory 226 further includes one or more data storage 208, which can be utilized by client computer 200 to store, among other things, applications 214 and/or other data. For example, data storage 208 may also be employed to store information that describes various capabilities of client computer 200. The information may then be provided to another computer based on a variety of events, including being sent as part of a header during a communication, sent upon request, or the like. At least a portion of the information may also be stored on a disk drive or other computer-readable storage device (not shown) within client computer 200. Further, as illustrated, data storage 208 may also financial data 210. In some embodiments, financial data 210 may include a database, text, spreadsheet, folder, file, or the like, that may be configured to maintain and store various budget data, allocation rules, recursive allocation rules, audit logs, dataset templates, category templates, datasets, modeling information for unified models, or the like. Such financial data 210 may also be stored within any of a variety of other computer-readable storage devices, including, but not limited to a hard drive, a portable storage device, or the like, such as illustrated by non-transitory computer-readable storage device 230. In yet other embodiments, data storage 208 may also store data associated with cost data models that may be generated in part by BFP 107.

Applications 214 may include computer executable instructions which, when executed by client computer 200, transmit, receive, and/or otherwise process network data. Examples of application programs include, but are not limited to calendars, search programs, email clients, IM applications, SMS applications, voice over Internet Protocol ("VOIP") applications, contact managers, task managers, transcoders, database programs, word processing programs, security applications, spreadsheet programs, games, search programs, and so forth. Applications 214 may include, for example, browser 218 and budget and forecasting client application 220.

Browser 218 may include virtually any application configured to receive and display graphics, text, multimedia, and the like, employing virtually any web based language. In at least one of the various embodiments, the browser application is enabled to employ HDML, WML, WMLScript, JavaScript, SGML, HTML, XML, and the like, to display and send a message. However, any of a variety of other web-based languages may be employed. In one embodiment, browser 218 may enable a user of client computer 200 to communicate with another network computer, such as BFP 107 of FIG. 1. In one embodiment, browser 218 may enable a user to view and/or manipulate data models, unified models, budget projects, including creating budgets, modifying cost models, or the like.

In at least one of the various embodiments, a user may employ client computer 200 to manage budgeting and finance applications, and to access information stored or otherwise managed through BFP 107. Also, in at least one of the various embodiments, the user may be enabled to perform a variety of actions on the data, including, queries, comparisons, summations, analysis, or the like. Additionally, in at least one of the various embodiments, a user may employ client 200 to automate one or more processes that may be used for generating business systems, cost models, budget projects, or the like. In at least one of the various embodiments, budget and forecasting client application 220 may be arranged to enable a user to rapidly generate business systems that include allocation rules, cost values, cost models, data models, unified models, or the like. In at least one of the various embodiments, application 220 may be arranged to generate and render visualizations and display reports of allocation rules among cost categories in a cost model.

In any event, budget and forecasting client application 220 may employ processes similar to those described below and illustrated in FIG. 4 and above to perform at least some of its actions.

Illustrative Network Computer

Figure 3:
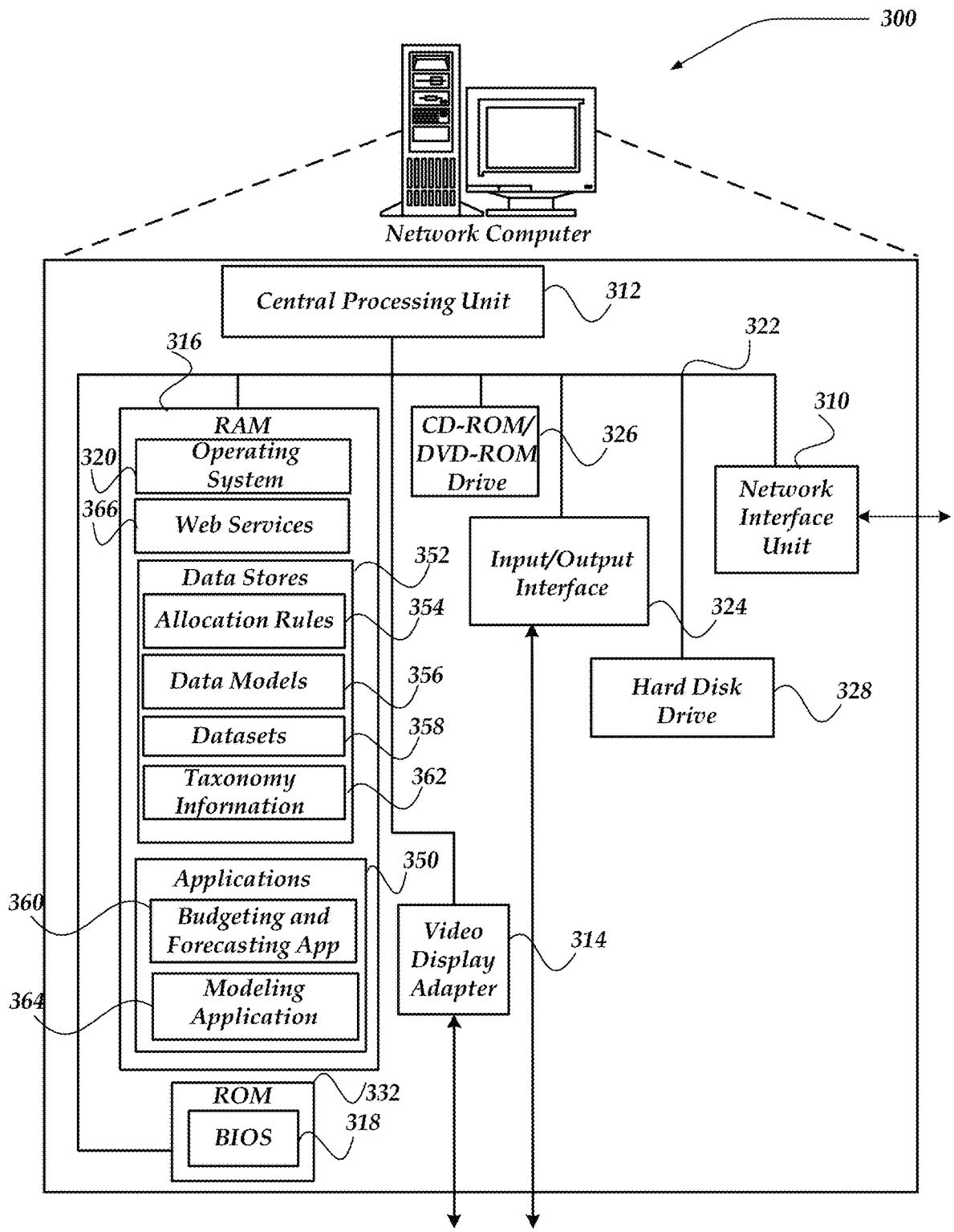
FIG. 3 illustrates one embodiment of a network computer that may be included in a system.

FIG. 3 shows one embodiment of network computer 300 that may be included in a system implementing at least one of the various embodiments. Network computer 300 may include many more or less components than those shown. The components shown, however, are sufficient to disclose an illustrative embodiment for practicing the invention. Network computer 300 may represent, for example, BFP 107 of FIG. 1.

Network computer 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, flash drive, and/or floppy disk drive that may be coupled to a processor such as CPU 312. The mass memory stores operating system 320 for controlling the operation of network computer 300. Any general-purpose operating system may be employed. Basic input/output system ("BIOS") 318 is also provided for controlling the low-level operation of network computer 300. As illustrated in FIG. 3, network computer 300 also can communicate with the Internet, or some other communications network, via network interface unit 310, which is constructed for use with various communication protocols including the TCP/IP protocol Network interface unit 310 is sometimes known as a transceiver, transceiving device, or network interface card (NIC). Network computer 300 also includes input/output interface 324 for communicating with external devices, such as a headset, or other input or output devices not shown in FIG. 3. Input/output interface 324 can utilize one or more communication technologies, such as USB, infrared, Bluetooth™, or the like.

The mass memory as described above illustrates another type of processor readable storage media. Processor-readable storage media (devices) may include volatile, nonvolatile, removable, and non-removable media implemented in any method or technology for storage of information, such as computer readable instructions, data structures, program modules, or other data. Examples of computer readable storage media include RAM, ROM, Electronically Erasable Programmable Read-Only Memory (EEPROM), flash memory or other memory technology, Compact Disc Read-Only Memory (CD-ROM), digital versatile disks (DVD), Blu-Ray, or other optical storage, magnetic cassettes, magnetic tape, magnetic disk storage or other magnetic storage devices, or any other physical medium which can be used to store the desired information and which can be accessed by any computer.

As shown, data stores 352 may include a database, text, spreadsheet, folder, file, or the like, that may be configured to maintain and store various cost models, budget data, audit logs, device data, or the like. In at least one of the various embodiments, data stores 352 may further include program code, data, algorithms, or the like, for use by a processor, such as central processing unit (CPU) 312 to execute and perform actions. In at least one of the various embodiments, at least some of data and/or instructions stored in data stores 352 might also be stored on another computer of network computer 300, including, but not limited to cd-rom/dvd-rom 326, hard disk drive 328, or other computer-readable storage device resident on network computer 300 or accessible by network computer 300 over, for example, network interface unit 310.

The mass memory also stores program code and data. One or more applications 350 are loaded into mass memory and run on operating system 320. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Mass memory may also include allocation rules 354, web services 366, data models 356, datasets 358, budget and forecasting application 360, modeling application 364, taxonomy information 362, or the like.

Web services 366 represent any of a variety of services that may be configured to provide content, over a network to another computer. Thus, web services 366 include for example, a web server, a File Transfer Protocol (FTP) server, a database server, a content server, or the like. Web services 366 may provide the content over the network using any of a variety of formats, including, but not limited to WAP, HDML, WML, SGML, HTML, XML, compact HTML (cHTML), extensible (xHTML), or the like.

In at least one of the various embodiments, budget and forecasting application 360 may enable a user to generate budgets, allocation rules, data model, cost models, reports, unified models, or the like. Also in at least one of the various embodiments, budget and forecasting application 360, and/or allocation application 364 may employ processes, or parts of processes, similar to those described below and shown in FIG. 4 and above to perform at least some of its actions.

Illustrative Logical System Architecture

FIGS. 4-7 are presented to illustrate logical system architectures at least one of the various embodiments for unified modeling of technology towers. Furthermore, one of ordinary skill in the art will appreciate that objects and architectures discussed herein may be implemented using one or more computer programming languages, computer scripting languages, database stored procedures, or the like, or combination thereof. Further, in at least one of the various embodiments, cost objects and/or data model objects may be stored and/or implemented using databases, including, SQL databases, object oriented databases, column-oriented databases, NoSQL databases, custom databases, or the like, combination thereof.

Figure 4:
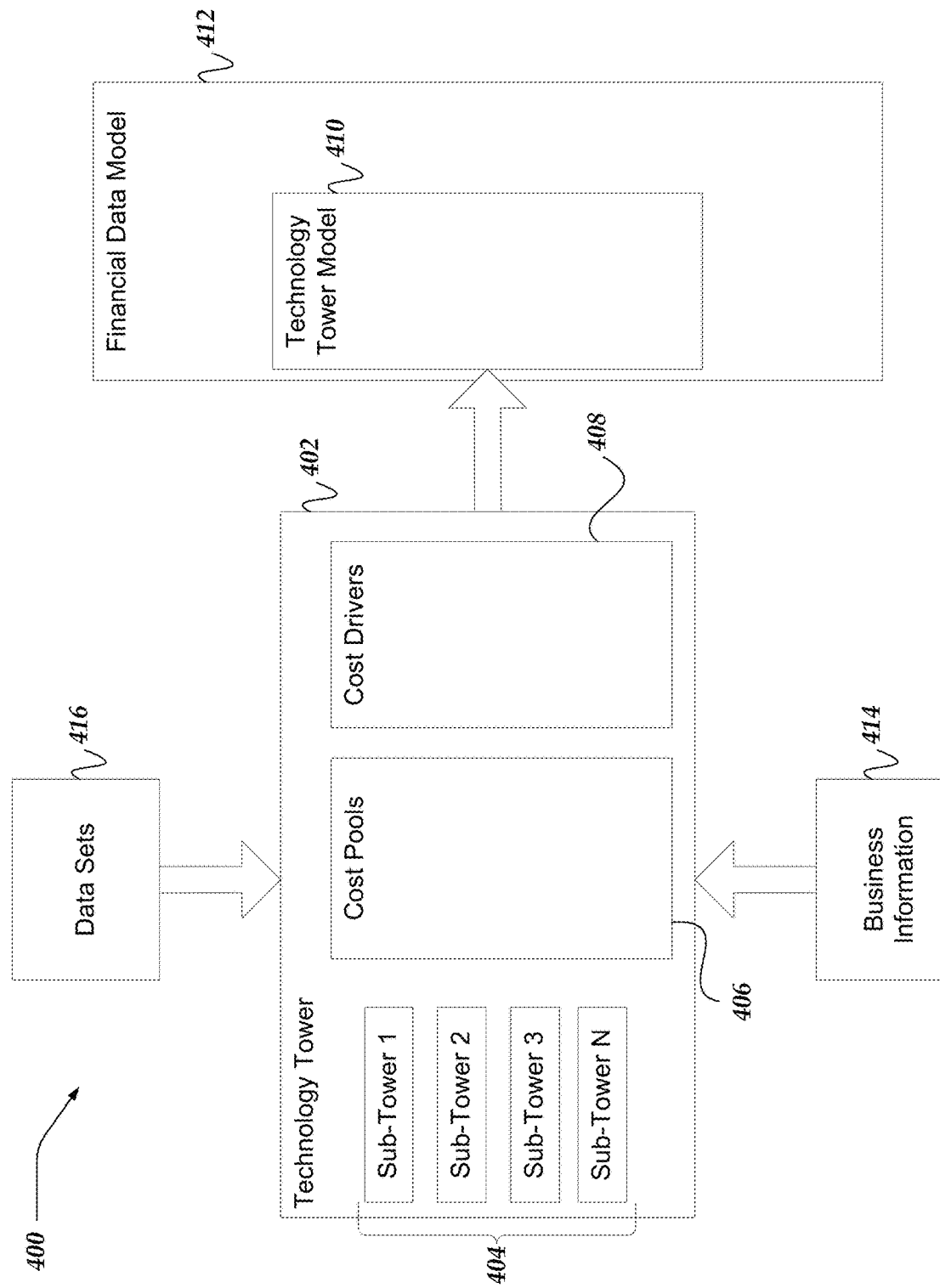
FIG. 4 shows one embodiment of a system for generating models for a business system in accordance with at least one of the various embodiments.

FIG. 4 shows a logical architecture for modeling application 400 for generating technology tower and models for a business system in accordance with at least one of the various embodiments. In at least one of the various embodiments, modeling application 400 may be arranged to generate one or more technology towers, such as, technology tower 402. In at least one of the various embodiments, technology tower 402 may be comprised of one or more sub-towers, such as, sub-towers 404. Also, in at least one of the various embodiments, technology tower 402 may be comprised of at least cost pools 406 and cost drivers 408.

In at least one of the various embodiments, modeling application 400 may be arranged to use technology tower 402 to generate one or more models, such as, technology tower model 410. In at least one of the various embodiments, technology towers models, such as, technology tower model 410 may be included in a financial data model, such as, financial data model 412.

In at least one of the various embodiments, modeling application 400 may be arranged to employ business information 414 for determining one or more characteristics of sub-towers 404, cost pools 406, or cost drivers 408. Likewise, in at least one of the various embodiments, modeling application 400 may be arranged to process data sets 416 to generate a technology tower.

In at least one of the various embodiments, template information may be employed by modeling application 400 for determining the particular sub-towers that may comprise the technology tower. Also, in at least one of the various embodiments, the modeling application may be arranged to use the template information to determine the particular cost pools and/or cost drivers for a particular technology tower.

In at least one of the various embodiments, template information may be implemented using one or more well-known data structures, such as, arrays, lists, structures, classes, or the like. In at least one of the various embodiments, template information may include configuration information that defines the sub-towers, cost pools, cost drivers, or the like, for a given type of technology tower. (See, FIGS. 12 and 13)

In at least one of the various embodiments, each type of technology tower may be arranged based on the particular characteristics of the resources that are associated with the tower. Accordingly, in at least one of the various embodiments, technology towers for different kinds of technology resources may include different cost pools and cost drivers. Likewise, in at least one of the various embodiments, different datasets and/or business information may be required to generate different technology towers. For example, technology towers related to servers, printers, network infrastructure, or the like, may require datasets that include hardware costs. In contrast, in some embodiments, some technology towers that may be directed towards services or software applications may exclude costs associated with hardware.

In at least one of the various embodiments, technology towers may require business information that may be provided by other sources other than datasets 416. In some embodiments, this business information may be provided by one or more users. For example, if a dataset does not provide information needed for a technology tower, modeling application 400 may be arranged to provide a user interface that enables a user to input the information.

In at least one of the various embodiments, technology towers may be arranged to enable the determination of various key performance indicators (KPI) related to the costs captured by the technology tower. In at least one of the various embodiments, KPIs may be determined by dividing a cost in the cost pool with a value from the cost driver. In at least one of the various embodiments, KPI's generated from using a technology tower may be arranged to provide insight into how features of resources in the technology tower contribute to the total costs. For example, a cost pool may include an entry indicating Servers hardware costs of $100,000. And, Server cost drivers may include number of devices, and number of CPUs. Accordingly, in this example, a KPI of cost per server device may be determined by dividing the Servers hardware cost of $100,000 by the value of the number-of-devices cost drivers.

Figure 5:
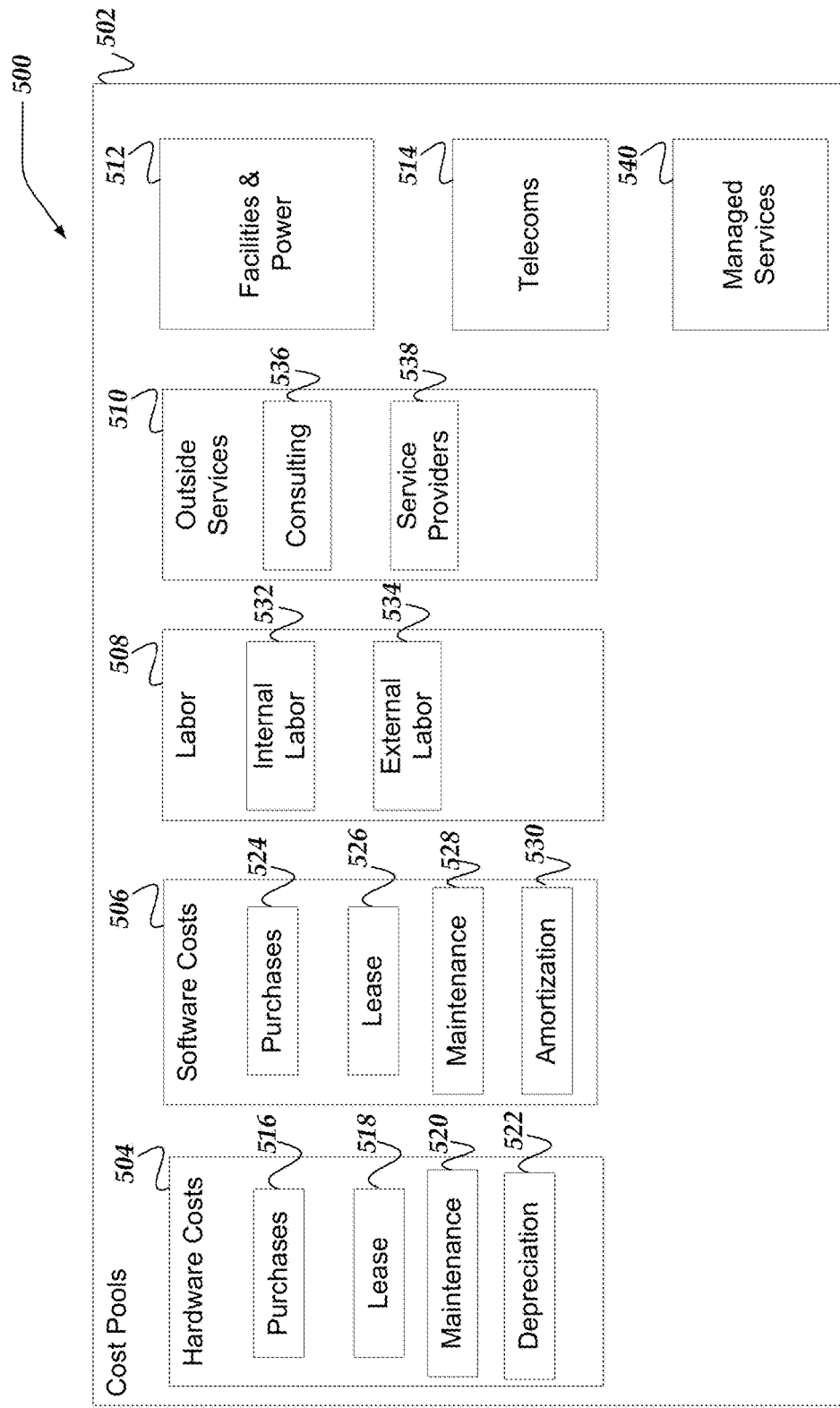
FIG. 5 shows a logical architecture for cost pools in accordance with at least one of the various embodiments.

FIG. 5 shows logical architecture 500 representing a portion of a technology tower in accordance with at least one of the various embodiments. In at least one of the various embodiments, cost pool 502 may be comprised of at least hardware costs 504, software costs, 506, labor costs 508, outside costs 510, facilities and power 512, telecommunication 514, Managed Services 540, or the like. Further, in at least one of the various embodiments, cost pools 502 may be an embodiment of cost pools 408 in FIG. 400.

In at least one of the various embodiments, hardware costs 504 may be comprised of purchased hardware costs 510, leased hardware costs 512, hardware maintenance costs 514, depreciation costs 522, or the like. In at least one of the various embodiments, software costs 506 may be comprised of purchased software costs 516, leased software costs 518, software maintenance costs 518, amortization costs 530, or the like.

In at least one of the various embodiments, using the different cost periods (e.g., purchases, lease, and maintenance) may further enable costs comparisons across organizations within an organization, regardless of business vertical, size of organization and across national boundaries.

In at least one of the various embodiments, physical assets (excluding property, office space or raised floor facilities) may be classified as hardware costs 504—the range of assets may vary depending on the particular technology tower, but examples may include Servers, PCs, Storage Arrays, Network Appliances, Printers, or the like. In at least one of the various embodiments, if a device includes embedded software (firmware), such as a network firewall, associated costs may be classified as hardware costs 504 even if the software can be upgraded for a separate fee. In at least one of the various embodiments, hardware costs 504 may be further characterized into sub-pools, such as, purchases 516, lease 518, maintenance 520, or depreciation 522.

In at least one of the various embodiments, software assets may vary by technology tower type. For example, in at least one of the various embodiments, software costs may include operating systems, middleware, databases, tools, utilities, applications, or the like. In at least one of the various embodiments, software costs 506 may include enterprise or per instance licenses, client-access licenses, maintenance/update costs, customization fees and Software as a Service (SaaS) fees, or the like. Similar to hardware costs 504, software costs 506 may be collected into four sub-pools based on the pattern of spending. Accordingly, in at least one of the various embodiments, software costs 506 may be organized into at least purchases 524, lease 526, maintenance 528, or amortization 530. In at least one of the various embodiments, amortization 524 may include costs related to software amortization of capitalized software license purchases and software development efforts.

In at least one of the various embodiments, purchases may include the costs of new assets as well as upgrades to existing assets. In at least one of the various embodiments, leases may include actual rental costs, leasing costs, license fees or equivalent charges, where the ownership of the asset remains with the leasing/rental company. In at least one of the various embodiments, operating leases may fall into this category. Also, in at least one of the various embodiments, financial leases, where the equipment becomes the responsibility of the organization at the end of the lease period, may be treated as purchases. In at least one of the various embodiments, in cases where ownership may be transferred from a vendor to the organization, the capital cost on which the agreement is based may be recorded as a purchase price. In some embodiments, if the capital cost may not be available, the payment stream may be capitalized (adjusting for interest) and recorded as a purchase price (cost).

In at least one of the various embodiments, maintenance costs may be reported for hardware that may be in use, regardless of age. In at least one of the various embodiments, for rented, leased or licensed hardware, maintenance cost may be reported if such costs are not included in the regular lease costs. In at least one of the various embodiments, the maintenance cost pool may include one-off or occasional maintenance payments made to repair assets in the absence of a maintenance contract. Further, in at least one of the various embodiments, depreciation 522 may include costs related to depreciation of capitalized purchases and hardware expenses of non-capitalized purchases.

In at least one of the various embodiments, labor 508 may be comprised of internal labor costs 532, external labor costs 534, or the like. In at least one of the various embodiments, labor costs should be assigned to sub-pools internal labor 532 and external labor 534. The costs in each sub-pool should reflect the full range of personnel activities required for the technology tower—including direct operational activities, support and management and administration activities. The range of activities included in the labor costs may be determined based on the arrangement of each particular technology tower.

In at least one of the various embodiments, labor costs may include internal and external labor. In at least one of the various embodiments, internal labor may include employees that may be performing functions within the scope of the different sections of the taxonomy. In at least one of the various embodiments, costs for internal labor may include the fully-loaded cost of employing a person. Accordingly, in at least one of the various embodiments, it may include base-salary, standard benefits, employment taxes, national insurance costs, or the like.

In at least one of the various embodiments, internal labor cost excludes costs for work-related travel or other costs that may be incurred by the employer in providing facilities (office space, computer etc.) or for equipment for the employees to perform their functions. In at least one of the various embodiments, the costs should include costs for part-time employees, such as, those on temporary assignment from other parts of the business, including employees providing cover for sick leave, maternity leave, sabbaticals, on the like.

In at least one of the various embodiments, external labor may include temporary workers who are not employed directly by the business. Such as employees that may be paid on a time and materials basis. For example, external consultants or freelance contractors may be considered external labor. In at least one of the various embodiments, personnel supplied on-site by a vendor for an agreed number of hours per week "at no extra charge" should be counted as external labor (e.g., contractors) that have zero cost associated with them.

In at least one of the various embodiments, both internal and external labor costs may be represented in terms of the cost of a Full-Time Equivalent (FTE) where one FTE represents 100% of a full time person's working time. For example, in at least one of the various embodiments, a person who works in the Service Desk full-time during the normal contracted week would be reported as one FTE in the Service Desk tower. An individual person may contribute to more than one category of FTEs. For example, a person who works half a shift monitoring Windows servers and the other half of the shift managing Storage Arrays should be reported as half an FTE in Windows Servers and half an FTE in Storage. In at least one of the various embodiments, for project-based activity, such as, the Applications area, internal and external effort may be recorded as the count of hours rather than as FTEs.

In at least one of the various embodiments, outside services costs 510 may include sub-pools including, consulting 536, or service providers 538. In at least one of the various embodiments, consulting 536 may include external consulting project-based services, or the like. And, in at least one of the various embodiments, service providers 538 may include, external managed service providers including but not limited to infrastructure management, application support, desktop/helpdesk support, collocation services; public cloud service providers including infrastructure as a service (IaaS), platform as a service (PaaS), software as a service (SaaS), or the like.

In at least one of the various embodiments, outside service 510 may include IT services purchased from external service providers. Maintenance costs for hardware or software may be recorded in the appropriate hardware or software cost sub-pools. Likewise, the costs associated with employing outside contract staff may be included in the labour cost pools. Examples of outside services include managed network services, cloud storage for end user backup, externally provided email services, or the like. In at least one of the various embodiments, costs for retained function may be recorded in the appropriate technology towers. Likewise, in at least one of the various embodiments, the costs associated with managing the contracts and/or vendor relationships may be included in a Cross-Functional Services technology tower.

In at least one of the various embodiments, facilities and power 512 may represent costs associated with data center space, power, security and other operating expenses, including depreciation of lease hold improvements.

In at least one of the various embodiments, some technology towers, such as, mainframe, servers, storage, or the like, may have costs assigned to facilities and power 512 that may represent the costs associated with hosting the physical assets/infrastructure for delivering the services that the technology tower provides. In at least one of the various embodiments, costs for facilities may exclude floor space costs per square yard or square meter costs), but may include the costs of air-conditioning and/or cooling, electrical and other utilities costs, outside services and personnel costs related to managing a data center environment. In at least one of the various embodiments, costs for shared facilities (e.g., data centers) may be apportioned across one or more relevant technology tower based on a ratio of power usage, floor space or other mechanism consistent with the data model.

In at least one of the various embodiments, some technology towers may be associated with additional cost pools for "other costs" (not shown). For example, other costs may include consumables related to particular functions associated with the technology tower, such as the cost of data storage tapes or other media, print cartridge costs, or the like. Also, in at least one of the various embodiments, telecoms 514 may comprise cost pools for including telecommunications charges, such as, leased lines, domestic and international voice callings (including mobile), multiprotocol label switching (MPLS), internet service providers (ISP), or the like. Also, in at least one of the various embodiments, telecoms 514 may further include costs related to voice and data network connectivity including circuit and usage expenditures.

Also, in at least one of the various embodiments, managed services 540 may comprise cost pool related to information technology and/or enterprise services provided by one or more outside service provider. For example, one or more managed services may include, IT planning, IT operations, IT maintenance, help desk services, or the like.

Figure 6:
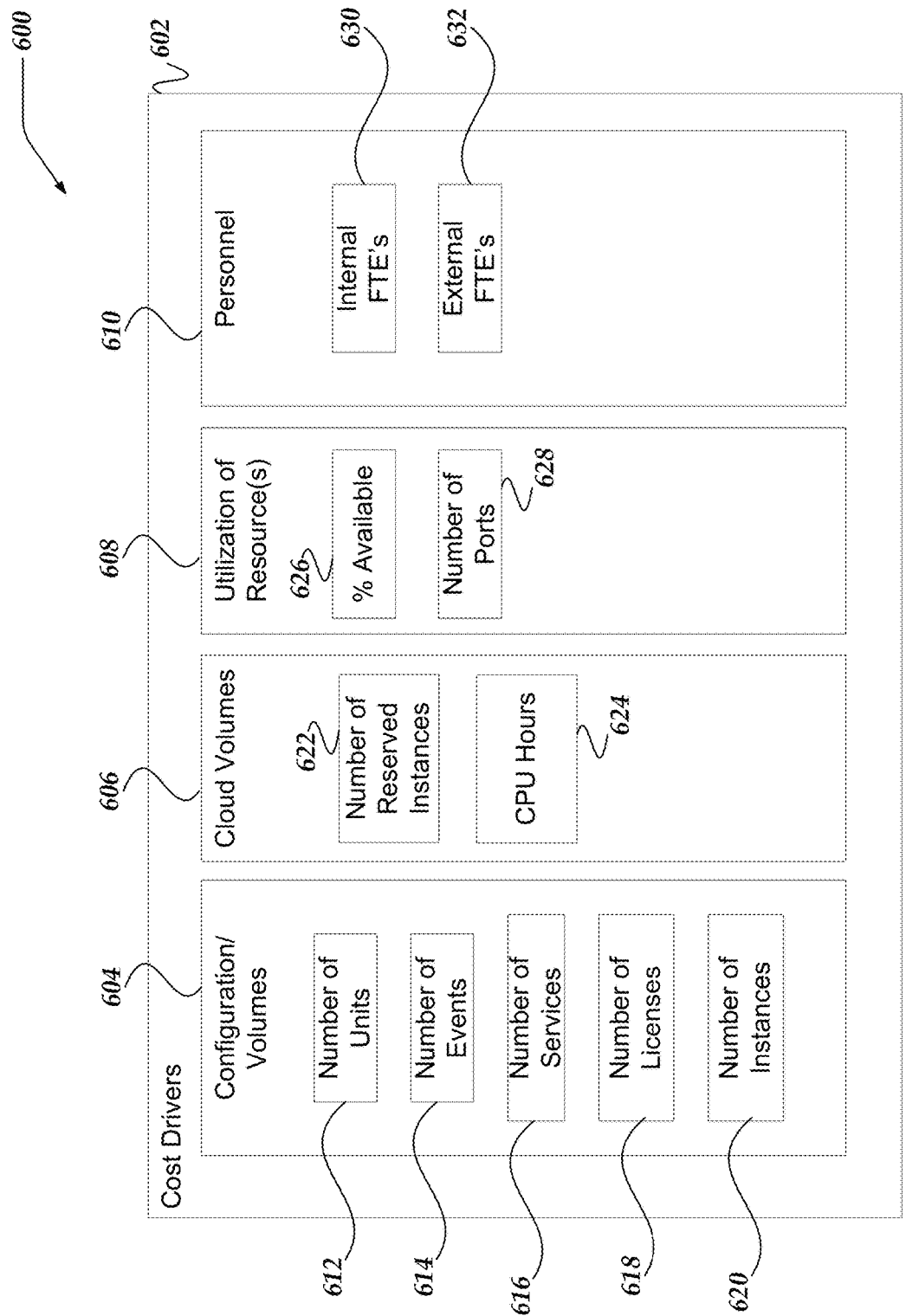
FIG. 6 shows a logical architecture for cost drivers and key performance indicators in accordance with at least one of the various embodiments.

FIG. 6 shows logical architecture 600 that includes cost drivers in accordance with at least one of the various embodiments. In at least one of the various embodiments, cost drivers 602 may be arranged to include information related to the features for items that may comprise the cost pools. Cost drivers may be a component of technology tower 402 though for clarity cost drivers 602 is shown here separately. For example, cost drivers 600 may be an embodiment of cost drivers 408 of FIG. 4.

In at least one of the various embodiments, cost drivers 600 may be organized into standard categories. In at least one of the various embodiments, categories may include configuration/volumes 604, cloud volumes 606, utilization 608, personnel 610, or the like.

In at least one of the various embodiments, configuration/volumes 604 may comprise cost drivers based on the how a given sub-tower may be configured and/or how many of a given feature (e.g., CPU per computer, number of computers, software licenses, or the like) may be included. In at least one of the various embodiments, number of units 612 may include values representing a number of units of a particular type of feature. In at least one of the various embodiments, number of events 614 may be used if costs of in the tower may be associated with a number of events. In at least one of the various embodiments, number of services 616, may be used to represent how many services associated with a cost item in the tower may be used. Likewise, in at least one of the various embodiments, number of licenses 618 may represent to number of licenses associated with one more cost items in the tower. And, number of instances 620 may represent the number of instances of cost items in a tower that may be operative.

In at least one of the various embodiments, the specific cost drives included in technology may be driven the template information corresponding to the technology tower and the availability of relevant captured information. Accordingly, in at least one of the various embodiments, the particular number, quantity, volume represented in the technology tower may depend on the particular technology tower being generated and the information provided by the organization that is being modeled.

In at least one of the various embodiments, cloud volumes 606, may include cost drivers, such as, number of reserved instances 622, and/or CPU hours 624. Also, in at least one of the various embodiments, utilization of resources 608 may include cost drivers, such as, percentage of availability 626 and/or number of ports 628. In at least one of the various embodiments, personnel 610 may include cost drivers, such as, internal FTE's 630 and/or external FTE's 632.

Furthermore, in at least one of the various embodiments, certain cost drivers may be considered activity drivers. In at least one of the various embodiments, activity drivers may be defined in the template information used for generating the technology towers. In at least one of the various embodiments, activity drivers may vary depending on the item and the technology tower. In at least one of the various embodiments, activity drivers represent cost drivers that may have significant impact on the costs associated with an activity.

Figure 7:
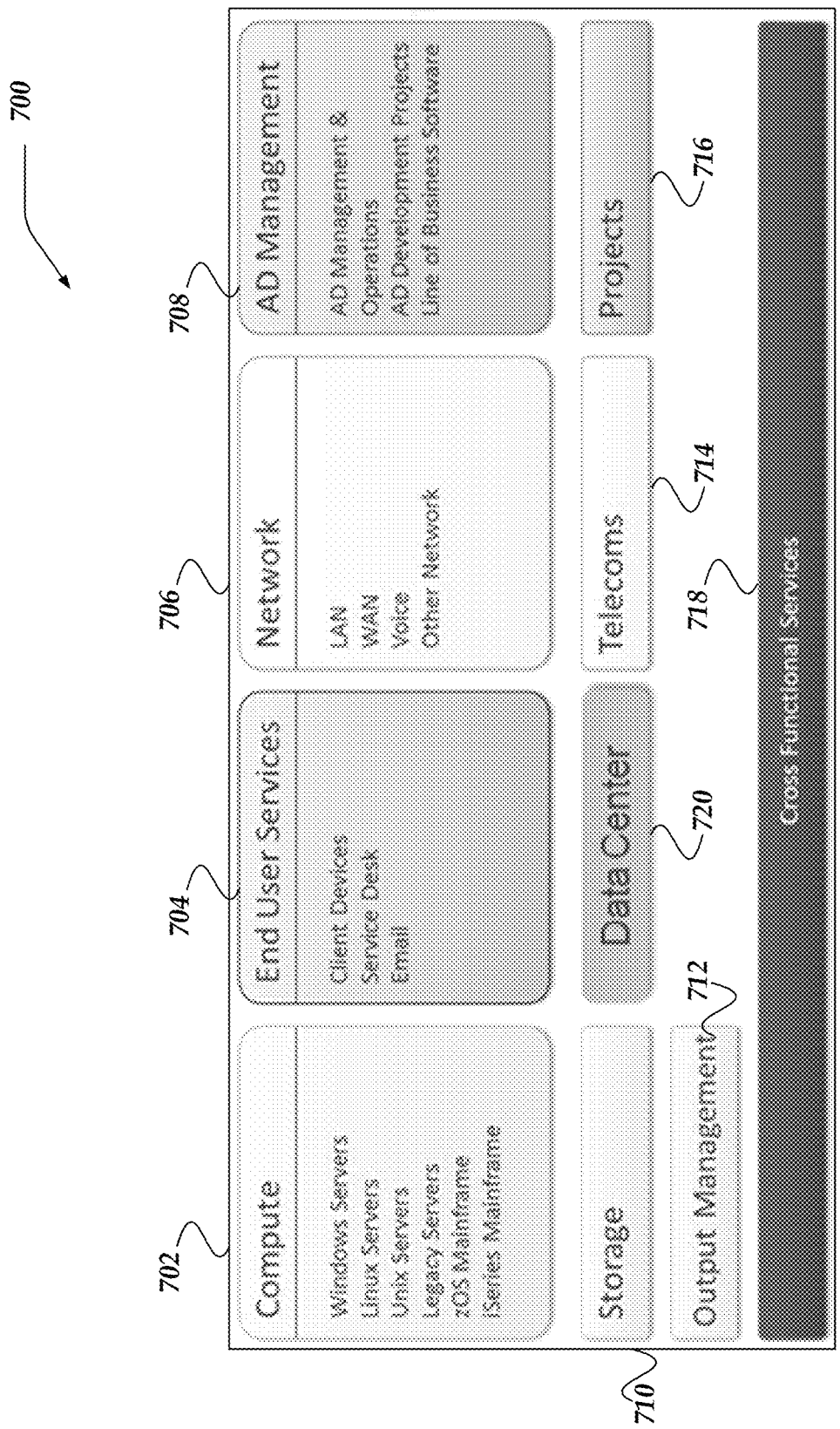
FIG. 7 illustrate technology towers for unified modeling in accordance with at least one of the various embodiments.

FIG. 7 illustrates technology towers for unified modeling system 700 in accordance with at least one of the various embodiments. In at least one of the various embodiments, a modeling application may be arranged to generate various technology towers, where each tower captures a particular portion of an organizations assets and services. In at least one of the various embodiments, such as technology tower may include, compute tower 702, end user services tower 704, network tower 706, application development (AD) management tower 708, storage tower 710, output management tower 712, telecoms tower 714, projects tower 716, cross functional services tower 718, data center 720, or the like.

In at least one of the various embodiments, compute tower 702 may be arranged to model costs related to the provisioning of computers and computer environments for hosting various applications for an organization. Accordingly, in at least one of the various embodiments, computer tower 702 may comprise one or more sub-towers, including, Windows Server, Linux Servers, Unix Servers, Legacy Servers, Mainframes (mainframe computers), or the like.

In at least one of the various embodiments, end user services tower 704 may be arranged to model costs related to the provisioning of services to end user computing devices, including desktop PCs, laptops, thin clients, virtual desktop, tablets, mobile devices, or the like. Accordingly, in at least one of the various embodiments, end user services tower 704 may comprise one or more sub-towers, including, client devices, service desk, end user email, or the like.

In at least one of the various embodiments, network tower 706 may be arranged to model costs related to LAN, WAN, Voice and other network-related services, including virtual private network (VPN) provisioning, network security, or the like. Accordingly, in at least one of the various embodiments, network tower 706 may comprise one or more sub-towers, including, LAN, WAN, Voice, "other" networks, or the like.

In at least one of the various embodiments, AD management tower 708 may be arranged to model costs related to various aspects of the development, deployment and support of business applications, including those developed in-house, purchased/licensed commercial applications, Software as a Service (Saas), or the like. Accordingly, in at least one of the various embodiments, AD management tower 708 may comprise one or more sub-towers, including, AD management & Operation, AD development projects, line of business software, or the like.

In at least one of the various embodiments, storage tower 710 may be arranged to model costs related to the provisioning of centrally managed storage services across all tiers and technologies for the organization. In at least one of the various embodiments, storage tower 710 may include archive, backup and restore, disaster recovery, or the like. Accordingly, in at least one of the various embodiments, storage tower 710 may comprise one or more sub-towers, related to various storage technologies, and so on.

In at least one of the various embodiments, output management tower 712 may be arranged to model costs related to central printing functions, (including print to non-paper media), document output to fiche/DVD or other permanent storage medium, post-print processing (such as collation and binding), automatic enveloping, print dispatch (for example franking), or the like.

In at least one of the various embodiments, telecoms tower 714 may be arranged to model costs related to all carrier/telecoms costs, including fixed line costs, internet charges, and data and voice charges (including domestic and internal, fixed line and mobile).

In at least one of the various embodiments, projects tower 716 may be arranged to model costs related to "change the business" projects such as consolidating data centers, IT consolidation following mergers and acquisitions, migrating the business to a radically new software platform, or similar high-risk, high-visibility activity.

In at least one of the various embodiments, cross functional services tower 718 may be arranged to model costs related to the costs and personnel performing IT functions which cut across platform and technology boundaries within an organization.

In at least one of the various embodiments, data center tower 720 may be arranged to model costs related to the owning and/or operating a enterprise level data center.

In at least one of the various embodiments, one of ordinary skill in the art will appreciate that a modeling application, such as, modeling application 364 may be arranged to generate more or fewer technology towers than those shown in FIG. 7.

In at least one of the various embodiments, template information for each technology tower type may be arranged to prescribe to sub-tower, cost items, cost pools, and cost drivers for generating a technology tower. One of ordinary skill in the art will appreciate that technology tower types in addition to those described above are envisaged. Likewise, in at least one of the various embodiments, technology towers may have more or fewer sub-towers than as described above.

Generalized Operations

FIGS. 8-12 represent the generalized operations of allocating heritage information in data models in accordance with at least one of the various embodiments. In at least one of the various embodiments, processes 800, 900, 1000, 1100, and 1200 described in conjunction with FIGS. 8-12 may be implemented by and/or executed on a single network computer, such as network computer 300 of FIG. 3. In other embodiments, these processes or portions thereof may be implemented by and/or executed on a plurality of network computers, such as network computer 300 of FIG. 3. However, embodiments are not so limited, and various combinations of network computers, client computers, virtual machines, or the like may be utilized. Further, in at least one of the various embodiments, the processes described in conjunction with FIGS. 8-12 may be operative in unified architectures such as those described in conjunction with FIGS. 4-7 and in for embodiments described in conjunction with FIGS. 13-47.

Figure 8:
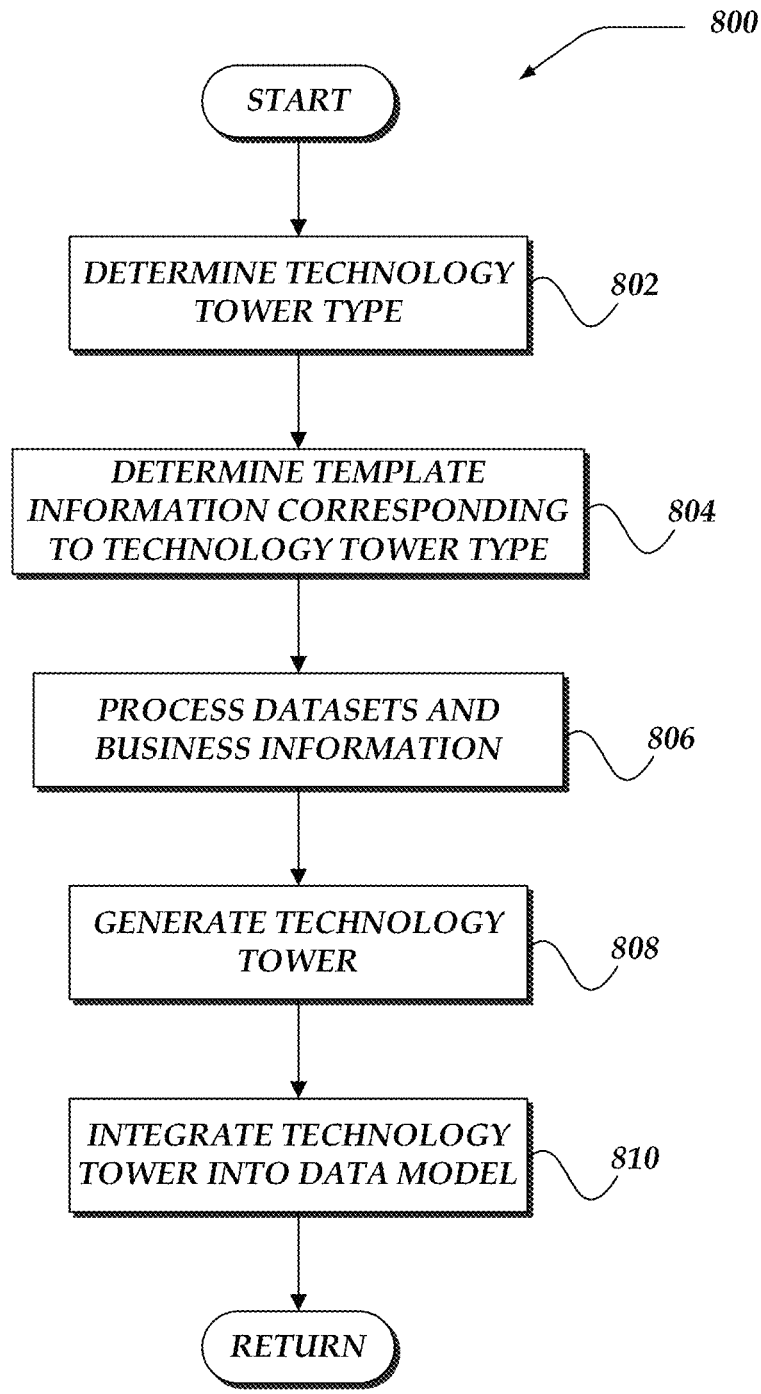
FIG. 8 illustrates a flowchart for a process for generating technology towers for unified modeling in accordance with at least one of the various embodiments.

FIG. 8 illustrates a flowchart for process 800 for generating technology towers for unified modeling in accordance with at least one of the various embodiments. After a start block, at block 802, a modeling application may determine the technology tower type. In at least one of the various embodiments, technology tower types may include the types described in conjunction with FIG. 7. At block 804, in at least one of the various embodiments, template information corresponding to the technology tower type may be determined. At block 806, in at least one of the various embodiments, one or more datasets and/or one or more portions of business information may be processed. At block 808, in at least one of the various embodiments, the technology tower may be generated based on the template information, datasets, and/or business information. At block 810, in at least one of the various embodiments, the technology tower may be provided to another application, such as, budget and forecasting application 360, for integrating with a financial data model for the organization. Next, in at least one of the various embodiments, control may be returned to a calling process.

Figure 9:
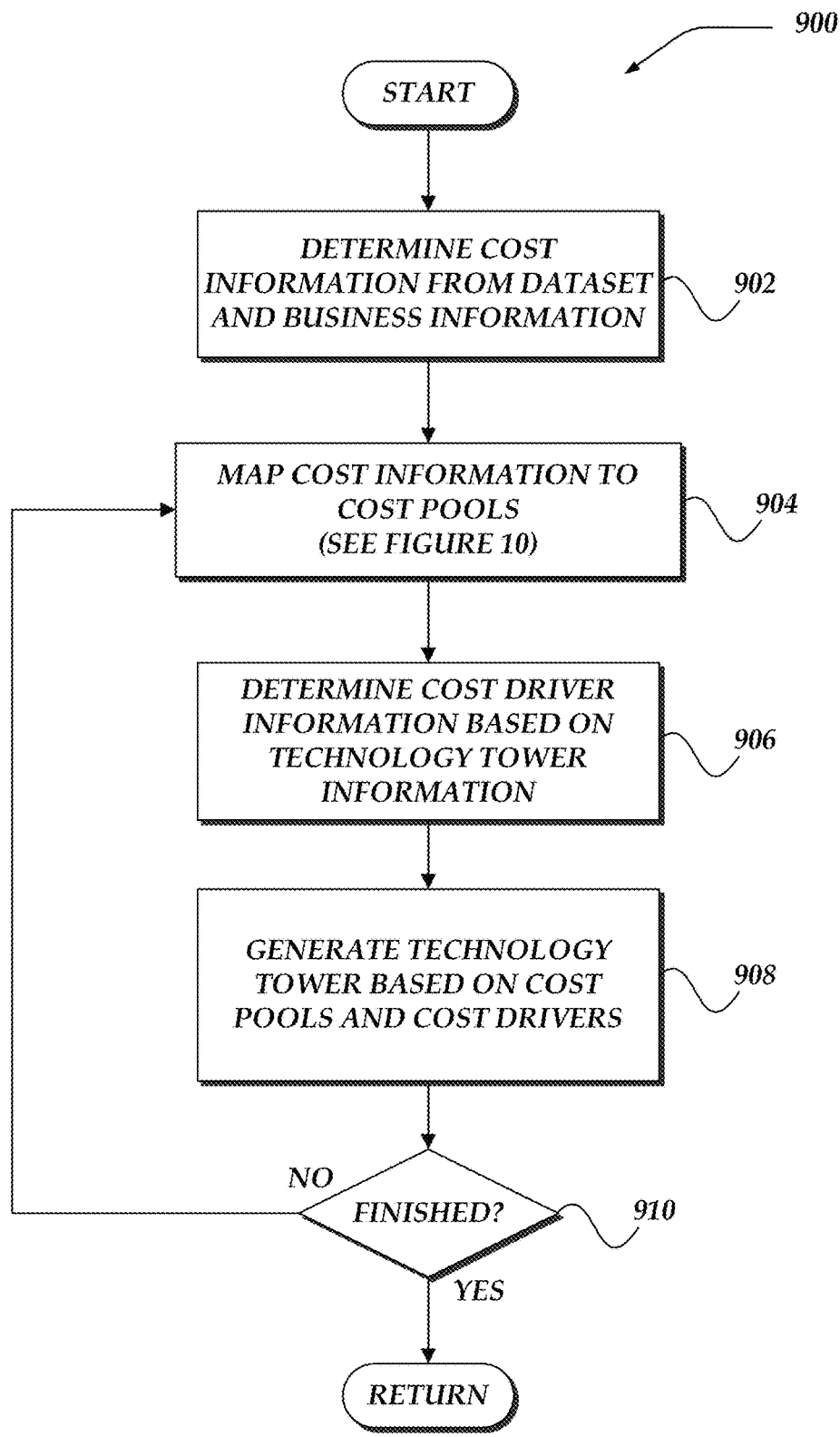
FIG. 9 illustrates a flowchart for a process for processing dataset and business information for generating technology towers for unified modeling in accordance with at least one of the various embodiments.

FIG. 9 illustrates a flowchart for process 900 for processing dataset and business information for generating technology towers for unified modeling in accordance with at least one of the various embodiments. After a start block, at block 902, cost information may be determined from one or more datasets and/or one or more sources of business information.

At block 904, in at least one of the various embodiments, the cost information may be mapped to one or more cost pools. In at least one of the various embodiments, a budget and forecasting application and/or a modeling application may be arranged to map information from the datasets to the cost pools in the technology tower. For example, if the dataset includes GL ledger data describing the costs of Windows Server, Linux Servers, or the like, those costs may be aggregated and entered into the technology tower.

At block 906, in at least one of the various embodiments, cost driver information for the one or more cost items included in the technology tower may be determined based on the datasets and business information. Also, in at least one of the various embodiments, cost driver information may be retrieved from an external data source or database. For example, if the model number or serial number of computers being incorporated into a Server cost item may be known, the CPU type and/or count for the particular models may be retrieved from an external database.

At block 908, in at least one of the various embodiments, a technology tower that corresponds to the template information and the organizations datasets and business information may be generated based on the cost pools, and cost drivers.

At decision block 910, in at least one of the various embodiments, if the generated technology mode is determined to be insufficient for modeling the technology tower for the organization, control may loop back to block 904; otherwise, control may be returned to a calling process.

Figure 10:
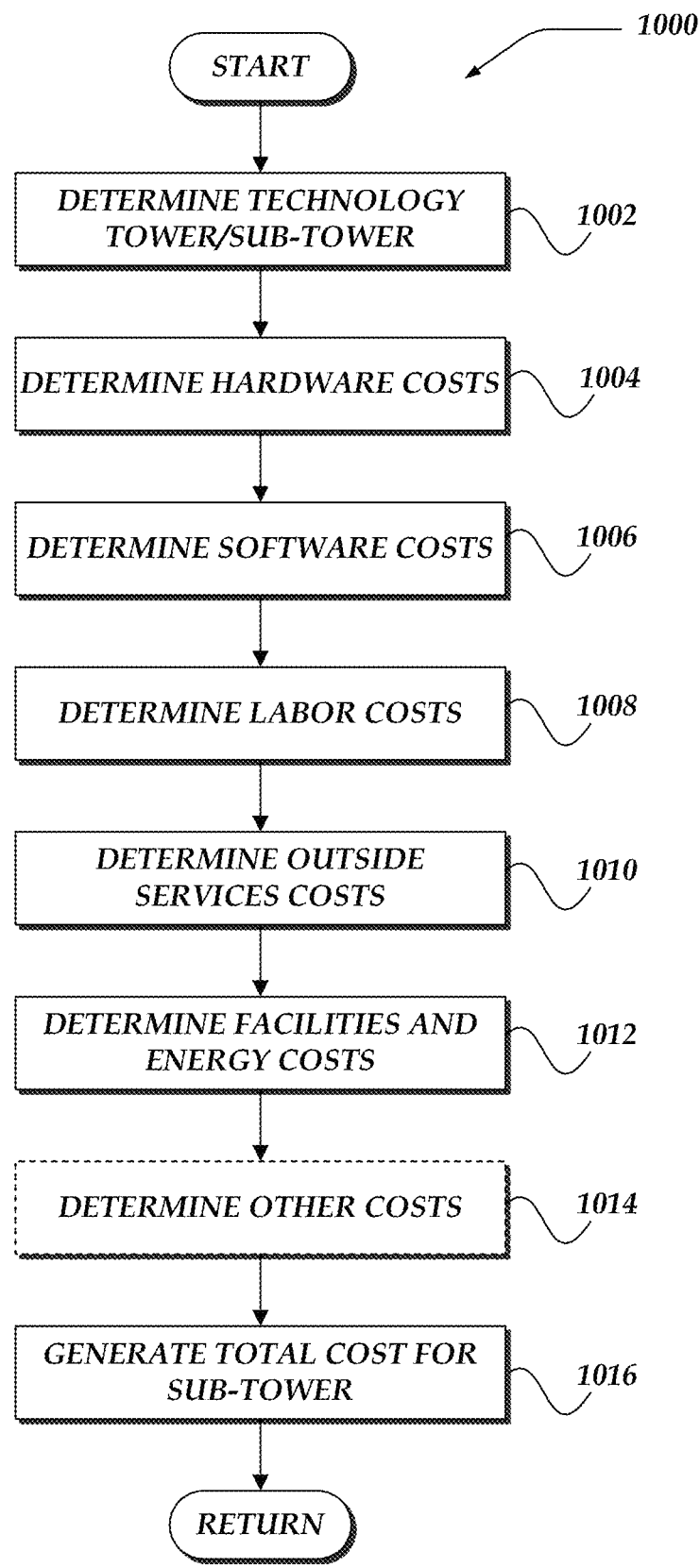
FIG. 10 illustrates a flowchart for a process for generating cost pool information for generating technology towers for unified modeling in accordance with at least one of the various embodiments.

FIG. 10 illustrates a flowchart for process 1000 for generating cost pool information for generating technology towers for unified modeling in accordance with at least one of the various embodiments. After a start block, at block 1002, the current technology tower or sub-tower of a technology tower may be determined. In at least one of the various embodiments, technology towers may include one or more sub-towers. Sub-towers may represent various assets or services that may be included in a technology tower. For example, in at least one of the various embodiments, a compute tower may include sub-towers, such as, server computers, mainframe, or the like.

However, in some cases, technology towers may not include sub-towers, in such cases, the information included in the technology tower may be treated that same as a single sub-tower. Accordingly, in at least one of the various embodiments, the technology tower may be treated as a single sub-tower for the purposes of modeling, determining cost pools, determining cost drivers, or the like.

In at least one of the various embodiments, the information used for determining the cost values used for the cost pools may be provided in the datasets and/or business information described above. In at least one of the various embodiments, costs may be aggregated into totals and added to the technology tower. In at least one of the various embodiments, the time periods that may be aggregated may vary depending on the needs of the enterprise. Accordingly, a cost pool value may be an aggregation of costs over different lengths of time such as, a month, year, multi-year, or the like. Also, in at least one of the various embodiments, the dataset information may represent projected costs of resources yet to be provisions or otherwise acquired. As well as services not yet received. Further, in at least one of the various embodiments, a modeling application may provide one or more user interfaces that enable users to modify the cost pool values in a technology tower. Such user interfaces may enable interactive modification of the technology tower and/or its associated financial models.

At block 1004, in at least one of the various embodiments, hardware costs for the cost items in the sub-tower may be determined. In at least one of the various embodiments, the template information for the current technology tower may be arranged to include information for determining the particular items to include in the hardware costs for the sub-tower.

For example, in at least one of the various embodiments, if a storage tower is being generated, the template information may be arranged such that costs for, tiered disks, virtual tape, tape drives, storage infrastructure, or the like, may be include as a hardware cost for the technology tower. Also, in at least one of the various embodiments, hardware costs may be organized into categories such as, purchase, lease, and maintenance, as described above.

At block 1006, in at least one of the various embodiments, software costs for the cost items in the sub-tower may be determined. In at least one of the various embodiments, each sub-tower may include one or more software costs that may be added to the technology tower. In at least one of the various embodiments, the template information for the current technology tower may be arranged to include information for determining which cost items are included in the software costs for the technology tower.

For example, in at least one of the various embodiments, if a storage technology tower is being generated, the template information may include software costs such as the costs for, running the storage system, software for operating a tiered disk system, and storage infrastructure operations, or the like. Also, in at least one of the various embodiments, software costs may be organized into categories such as, purchase, lease, and maintenance, as described above.

At block 1008, in at least one of the various embodiments, labor costs for the cost items in the sub-tower may be determined. In at least one of the various embodiments, different items in a sub-tower may have various types of labor costs attributed to them. For example, in at least one of the various embodiments, sub-towers may include cost items for costing the planning, building, and running (operating) labor that may be associated with a technology tower. Continuing with using a storage tower as an example, the provisioning and deployment of storage resources may often include labor costs related to the planning, building, and running of the storage resources in addition to the hardware and software expense. If such labor costs are omitted from the technology tower, subsequent modeling may produce inaccurate results.

At block 1010, in at least one of the various embodiments, outside services costs for the cost items in sub-tower may be determined. In at least one of the various embodiments, for many resources represented by the sub-tower, the costs of outside services may contribute significantly the costs. Accordingly, in at least one of the various embodiments, the modeling application may be arranged to incorporate one or more outside services costs to the items in the sub-tower. At block 1012, in at least one of the various embodiments, facilities and energy costs for the cost items in the sub-tower may be determined. At block 1014, in at least one of the various embodiments, optionally, other costs associated with the items in the sub-tower may be determined, including, in at least one of the various embodiments, telecommunication costs associated with one or more items. In at least one of the various embodiments, other costs may include managed services as well. At block 1016, in at least one of the various embodiments, a total cost for the items in the sub-tower may be generated based on the costs determined in blocks 1004, 1006, 1008, 1010, 1012, and 1014. Next, control may be returned to a calling process.

Figure 11:
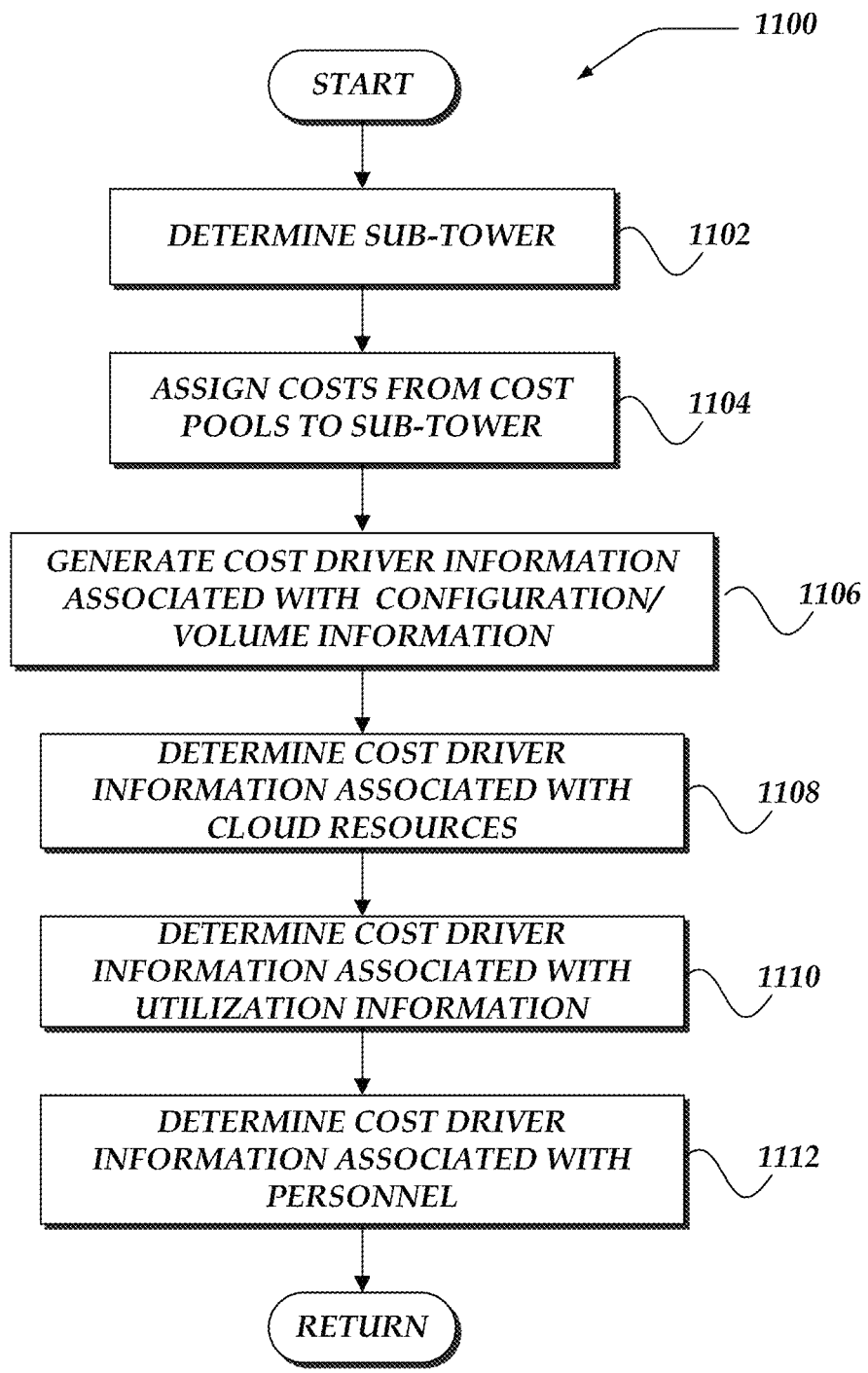
FIG. 11 illustrates a flowchart for a process for generating cost driver information that may be used for generating technology towers for unified modeling in accordance with at least one of the various embodiments.

FIG. 11 illustrates a flowchart for process 1100 for generating cost driver information that may be used for generating technology towers for unified modeling in accordance with at least one of the various embodiments. In at least one of the various embodiments, the cost pools may be the source of costs that may be associated with the sub-tower, such as, hardware, software, labor, or the like. In at least one of the various embodiments, a modeling application, such as, modeling application 364 may be arranged to generate technology towers that include one or more cost drivers for various cost items for a cost pool.

In at least one of the various embodiments, each technology tower type may be arranged to identify one or more cost drivers that may be organized into one or more general categories and shown in FIG. 6. In at least one of the various embodiments, the template information that corresponds to a technology tower may be employed to determine the particular cost drivers to be determined. In at least one of the various embodiments, the template information may include one or more formulas/algorithms for computing cost drivers with respect to one or more cost pools. In at least one of the various embodiments, similarly as with cost pools, different cost drivers may be associated with different cost items of the sub-tower. Accordingly, each cost item in the technology tower may be associated with one or more cost drivers.

After a start block, at block 1102, a sub-tower of the technology tower may be determined. In at least one of the various embodiments, technology towers may include one or more sub-towers. Sub-towers may represent various resources that may be included in a technology tower. For example, in at least one of the various embodiments, a compute tower may include sub-towers, such as, server computers, mainframe, or the like. In some cases, technology towers may not include sub-towers, in such cases, the information included in the technology tower may be treated that same as a single sub-tower. Accordingly, in at least one of the various embodiments, the technology tower may be treated as a single sub-tower for the purposes of modeling, determining cost pools, determining cost drivers, or the like.

At block 1104, in at least one of the various embodiments, costs from one or more cost pools may be assigned and/or allocated to the cost items in the sub-tower. (See, FIG. 10). In at least one of the various embodiments, the cost pools may be the source of costs that may be associated with the sub-tower, such as, hardware, software, labor, or the like.

At block 1106, in at least one of the various embodiments, cost driver information that may be associated with configuration/volume information may be determined based on the technology tower information. In at least one of the various embodiments, configuration and/or volume information may result in one or more cost drivers for resources represents by the sub-tower.

In at least one of the various embodiments, configuration/volume type cost drivers may be related to countable features or events. For example, for a storage technology tower, the labor costs associated with running the storage resources may be highly dependent on the number incidents (e.g., trouble tickets) that occur in year that are related to problem with the storage resource. Likewise, in at least one of the various embodiments, staying with a storage tower example for now, other configuration/volume cost drivers may include number of installed tiered storage devices. Also, staying with this example, configuration such as percentage of ratio of SAN versus NAS may be added to the technology tower since it may drive the cost of storage.

At block 1108, in at least one of the various embodiments, the cost driver information that may be associated with one or more cloud resources may be determined based on the technology tower information. In at least one of the various embodiments, technology towers may be arranged to capture information related to cloud computing resources that may be associated with one or more components of a sub-tower. In at least one of the various embodiments, cloud resources may be measured in terms of storage volumes, CPU hours per year, number of reserve compute instances, or the like.

At block 1110, in at least one of the various embodiments, the cost driver information that may be associated with utilization information may be determined based on the technology tower information. In at least one of the various embodiments, utilization information for one or more of the sub-tower components may be included in a technology tower. For example, utilization information may include CPU utilization, storage utilization, availability information, or the like.

At block 1112, in at least one of the various embodiments, the cost driver information that may be associated with personnel may be determined based on the technology tower information. In at least one of the various embodiments, sub-tower components, such as, planning, building, running, or the like, the may be associated with labor costs may have personnel cost drivers. In at least one of the various embodiments, cost drivers such as, number of employees and/or number of contractors may be included in the technology tower. Next, in at least one of the various embodiments, control may be returned to a calling process.

Figure 12:
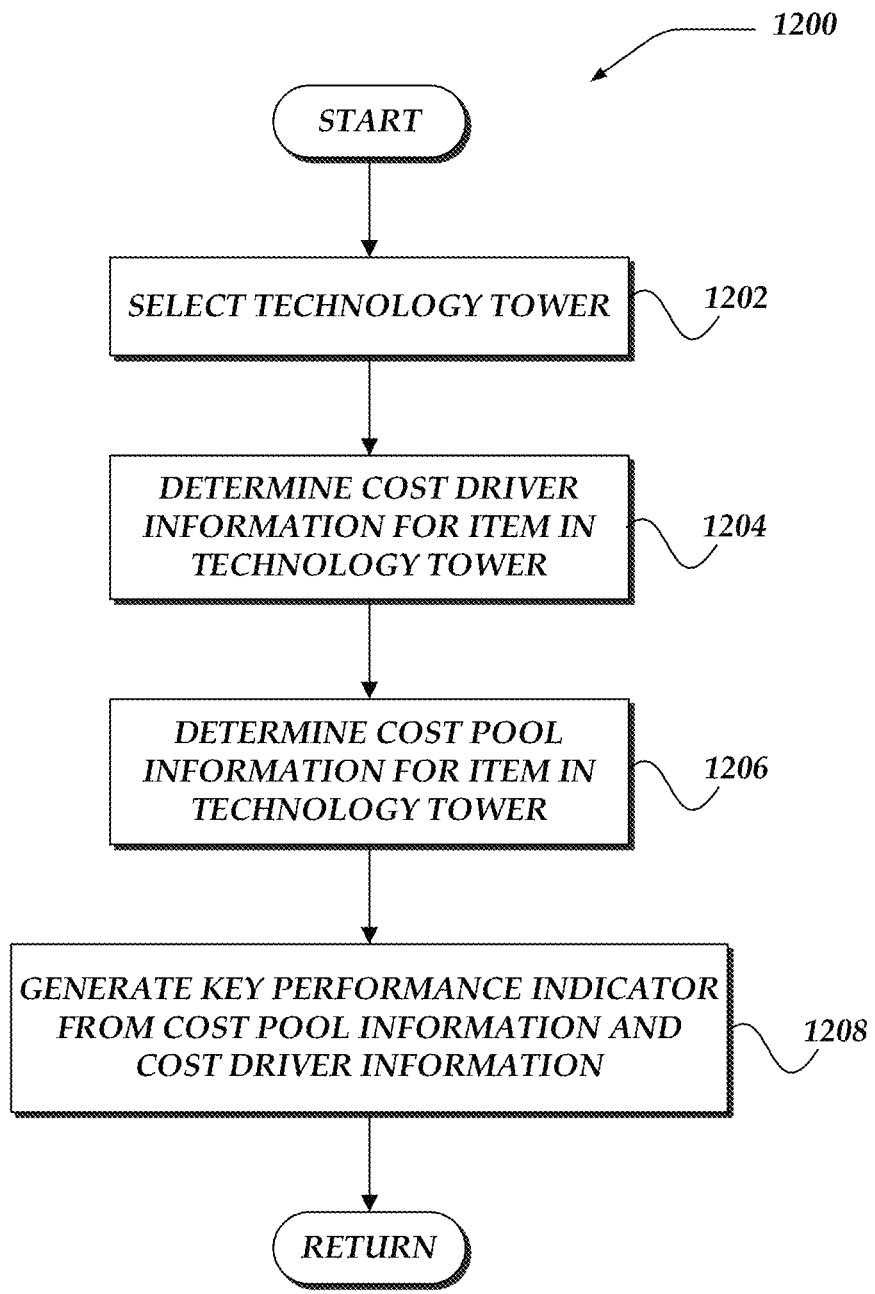
FIG. 12 shows a flowchart for a process for employing a technology tower for generating a key performance indicator in accordance with at least one of the various embodiments.

FIG. 12 shows a flowchart for process 1200 for employing a technology tower for generating a key performance indicator in accordance with at least one of the various embodiments. After a start block, at block 1202, in at least one of the various embodiments, a particular technology tower of interest may be selected. In at least one of the various embodiments, the technology tower of interest may be incorporated into a financial model or otherwise accessible using an application, such as, budget and forecasting application 360, modeling application 364, or the like. At block 1204, in at least one of the various embodiments, cost driver information for particular cost items of interest may be determined using the selected technology tower. At block 1206, in at least one of the various embodiments, one or more of the cost pools may be selected from the cost pools in the technology tower that may be associated with the same cost item. At block 1208, in at least one of the various embodiments, a key performance indicator KPI may be generated based on the determined cost pool information and the determined cost driver information. In at least one of the various embodiments, the KPI may be generated by dividing the value of the determined cost pool with the value of the cost driver. For example, given a technology tower that includes a cost item such as Servers that is associated with a cost pool having the value of $50,000, various KPI's may be generated based on cost drivers that may be associated with the cost item Servers. Continuing with this example, the Servers item may be associated with multiple cost drivers, such as, number of physical servers, number of CPU's, number of cores, and so on. Accordingly, in this example, KPI's such as cost per physical server, cost per CPU, cost per core, or the like, may be generated using the technology tower. Next, control may be returned to a calling process.

It will be understood that figures, and combinations of actions in the flowchart-like illustrations, can be implemented by computer program instructions. These program instructions may be provided to a processor to produce a machine, such that the instructions executing on the processor create a means for implementing the actions specified in the flowchart blocks. The computer program instructions may be executed by a processor to cause a series of operational actions to be performed by the processor to produce a computer implemented process for implementing the actions specified in the flowchart block or blocks. These program instructions may be stored on some type of machine readable storage media, such as processor readable non-transitive storage media, or the like.

Furthermore, in at least one of the various embodiments, the actions specified in one or more blocks may be performed concurrently if appropriate and/or if enabled by the underlying hardware and computer processor.

Illustrative Use Cases

FIGS. 13-47 illustrate use cases for unified modeling of technology towers in accordance with at least one of the various embodiments. Furthermore, in the template information in FIGS. 15-47 activity drivers may be indicated with an asterisk.

Figure 13:
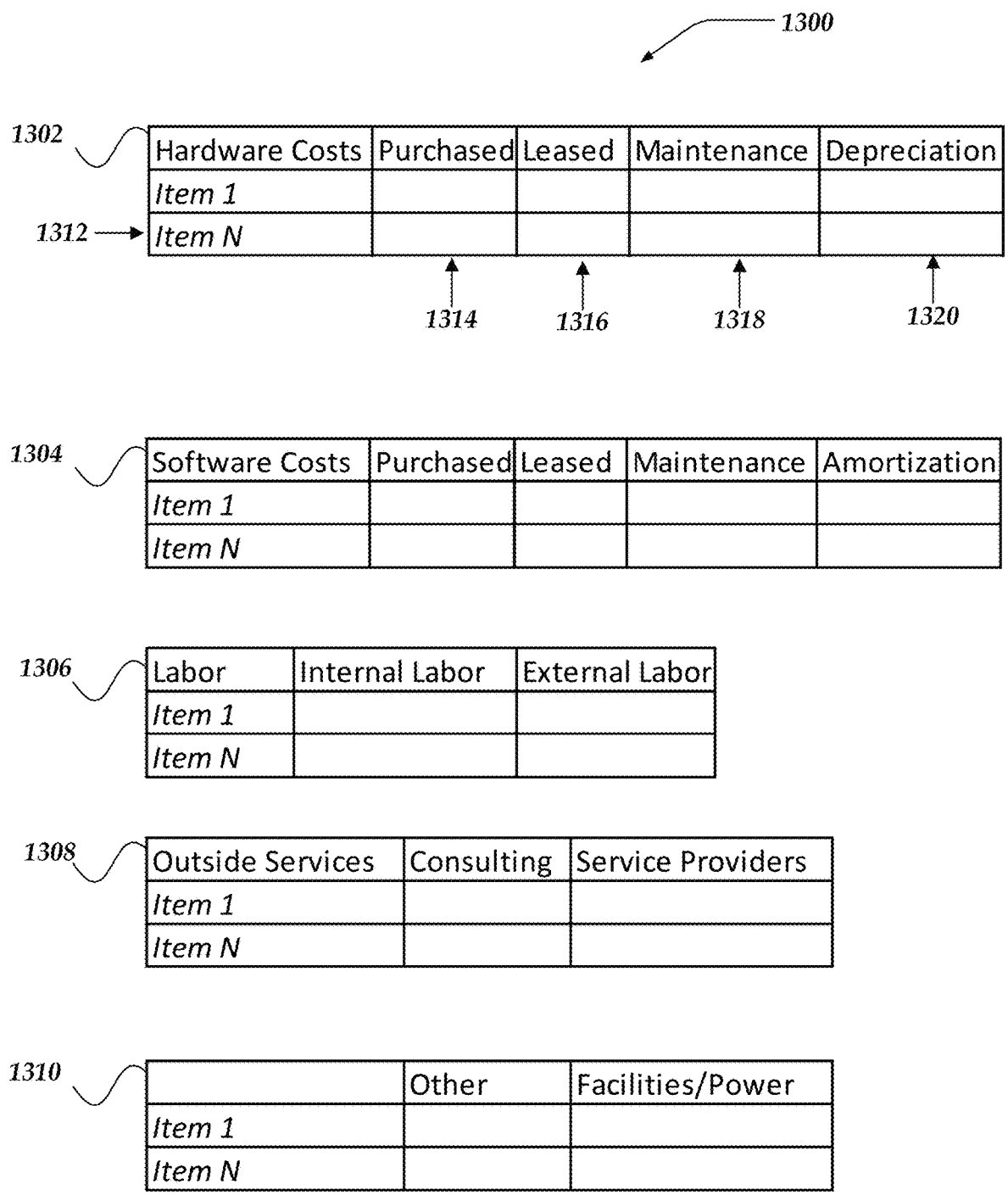
FIG. 13 illustrates a cost pool structure for unified modeling of technology towers in accordance with at least one of the various embodiments.

FIG. 13 illustrates cost pool structure 1300 for unified modeling of technology towers in accordance with at least one of the various embodiments. In at least one of the various embodiments, template information for generating technology may be arranged using a data structures, such as, cost pool structure 1300. Accordingly, in at least one of the various embodiments, technology towers may be generated based on a unified model that may be represented and/or enabled by using a defined data structure, such as, cost pool structure 1300. In some embodiments, a cost pool structure may be defined as a database schema, in other embodiments a cost pool structure may be defined in software as part of a modeling application, such as, modeling application 364.

In at least one of the various embodiments, cost pool structure 1300 may be comprised of various components, including, hardware costs 1302, software costs 1304, labor 1306, outside services 1308, other/facilities and Power costs 1310. These components represent embodiments of the cost pool information that may be described for FIG. 5.

In at least one of the various embodiments, each component may include zero or more cost items, such as, Item 1312. Also, each component may include one or more columns, such as, columns 1314, column 1316, column 1318, and column 1320 for recording and/or generating cost values corresponding to the cost item and the column. Typically, a cost item may represent an entire an entire class, category, or type of item that may be associated with technology tower that is being modeled/generated. For example, Item 1 of hardware costs 1302 may be "tiered storage" for a Storage technology tower. Accordingly, in at least one of the various embodiments, different types of technology towers may include different cost items.

In at least one of the various embodiments, a modeling application such as modeling application 364 may be arranged to determine the cost items for a cost pool component based on the template information that corresponds to the technology tower. Accordingly, in at least one of the various embodiments, different technology tower types may include different cost items.

In at least one of the various embodiments, the columns in the cost pool component may represent the aggregated costs for the cost item. For example, column 1310 may be employed to contain the aggregated costs for purchasing the cost item in the corresponding row. For example, in at least one of the various embodiments, if Item 1 in hardware cost 1302 is Servers, column 1314 of the corresponding row may contain the aggregated purchase costs of all the Servers in the organization being modeled. Likewise, column 1316 may contain the aggregated lease costs of corresponding to the Servers leased by the organization. And, column 1318 may contain the aggregate maintenance costs of corresponding to Servers owner or operated by the organization while in at least one of the various embodiments, column 1320 may used of accumulate depreciation costs for capitalized hardware.

In at least one of the various embodiments, different technology towers may have different cost items for each cost pool component. Likewise, in at least one of the various embodiments, some organizations being modeled may not have every type of cost item called out in the template information for a given technology tower. For example, a technology tower may be defined to include information related to mainframe computers even though the organization being modeled may just use server computers. Accordingly, in at least one of the various embodiments, if a technology tower calls for items not present in an organization those cost items may be ignored.

In at least one of the various embodiments, within a technology tower the cost items in the different cost pools may be the same or different for each other. For example, hardware costs 1302 may include cost items corresponding to hardware devices used or purchased by the organization. Software costs 1304 may include cost items corresponding software used or purchased by the organization. However, in at least one of the various embodiments, cost items may be shared across one or more cost pool components. For example, in at least one of the various embodiments, labor 1306 may include cost items that may be listed in other cost pool components.

In at least one of the various embodiments, as described software cost 1306 includes costs related to software applications, labor 1306 may be employed to capture internal and external labor costs, outside services costs 1308 may included such as consulting and/or service providers. And, towers, for "other" costs, or facilities/power costs may be represents in towers 1310, as discussed above.

Figure 14:
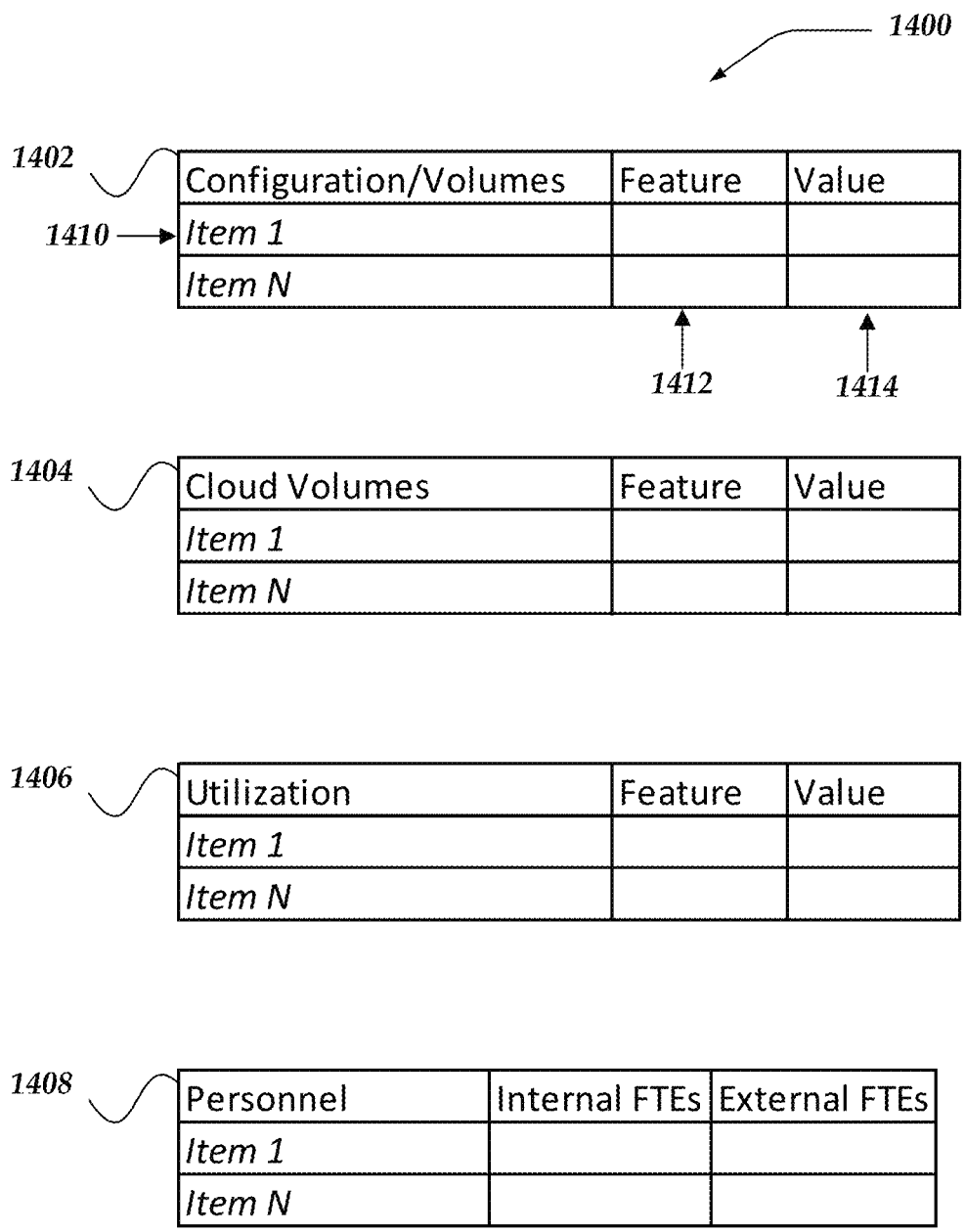
FIG. 14 illustrates a cost driver structure for unified modeling of technology towers in accordance with at least one of the various embodiments.

FIG. 14 illustrates cost driver structure 1400 for unified modeling of technology towers in accordance with at least one of the various embodiments. In at least one of the various embodiments, in addition to a cost pool structure that comprises one or more components (See, FIG. 5 and FIG. 13), a technology tower may include a cost driver structure that includes one or more cost driver components. In at least one of the various embodiments, cost driver components may include configuration/volume 1402, cloud volumes 1404, utilization 1406, or personnel 1408.

In at least one of the various embodiments, cost driver components 1402, 1404, and 1406 may represent different types of cost drives but they share certain characteristics. In at least one of the various embodiments, cost driver components 1402, 1404, and 1406 may include zero or more rows that correspond to an cost item (e.g., Servers, Databases, Printers, or the like), a feature (e.g., CPU, Events, Licenses, Instances, or the like) and a value function. For example, if cost item 1410 is Servers, an example of a feature may be CPU and the value may be the sum of CPUs for all Servers in the organization. The features and the value formula may vary depending on the cost item and the cost driver component Also, in at least one of the various embodiments, there may be multiple cost driver components of the same type associated with an cost item—one for each important cost driving feature. For example, in at least one of the various embodiments, if the cost item is Servers, there may be Configuration/Volume components for number of CPUs, number physical devices, number of core, or the like.

In at least one of the various embodiments, configuration/volume component 1402 may be arrange to represent cost driver information that may be related to the feature configuration and/or volumes (e.g., quantity) of those features. In at least one of the various embodiments, such cost driver information may include counts or quantity of feature or assets associated with the cost item. For example, number of CPUs for Servers; number of licenses for software applications cost items; number of switches for network cost items; number of incidents for helpdesk cost items; or the like.

In at least one of the various embodiments, cloud volumes component 1404 may be arranged to represent cost driver information that may be related to cloud resources that may be associated with a particular cost item. For example; cloud storage per month; number of reserved compute instances; or the like.

In at least one of the various embodiments, utilization component 1406 may be arranged to represent cost driver information that may be related to utilization metrics that may be associated with a particular cost item. For example; percent utilized; percent available (uptime); or the like.

In at least one of the various embodiments, personnel component 1408 may be organized somewhat differently than component 1402, 1404, and 1406. Accordingly, in at least one of the various embodiments, personnel component 1408 may be arranged to represent cost driver information that may be related to the number of fulltime employees or contractors that may be associated with a particular cost item. As such for each cost item in component 1408, a value representing the number of internal fulltime equivalents (FTEs) and/or a value of representing the number of external FTE that may be associated with the cost item.

FIGS. 15-18 illustrate the cost pools and cost drivers for a compute technology tower in accordance with at least one of the various embodiments. In at least one of the various embodiments, the Compute tower covers the provision of application hosting environments, both Server and Mainframe based.

Figure 16:

FIGS. 15-16 illustrate the cost pools 1500 and cost drivers 1600 for including in a servers sub-tower for a compute technology tower in accordance with at least one of the various embodiments. In at least one of the various embodiments, the server technology tower covers the provision of Servers based on Windows, Unix, Linux and legacy (VMS, for example) architectures.

The scope for this tower includes all personnel activities, hardware, software, outside services and facilities and power to build, manage, and run a Server environment. This may include:

Planning and design of the environment, including the design of standard server images Initial build and configuration of servers Monitoring and operational activities Second level support Hardware maintenance and upgrades Configuration and support of the following categories of software: operating system, system software, RDBMS, middleware, application servers, utilities and tools. It does not cover the installation and support of business or end-user applications that utilise the underlying platform.

Figure 18:

The management and administration of the environment, including the day to day management of resources, including personnel, dedicated to the Servers environment FIGS. 17-18 illustrate the cost pools 1700 and cost drivers 1800 for including in a mainframe sub-tower for a compute technology tower in accordance with at least one of the various embodiments. In at least one of the various embodiments, this technology tower covers the provision of Mainframe based on zOS, Fujistsu and iSeries hardware. Although iSeries may be considered as a Server platform in terms of hardware, in terms of support best practices and application scope, it is closer to a Mainframe environment than to a traditional Windows or Linux environment.

The scope for this tower includes all personnel activities, hardware, software, outside services and facilities and power to build, manage, and run a Mainframe environment. This may include:

Initial build and configuration of Mainframes
Monitoring and operational activities
Batch, interactive and transaction processing workloads
Second level support
Hardware maintenance and upgrades, including secondary or legacy hardware (e.g. ESCON/FICON switches, FEPs etc.)
Configuration and support of the following categories of software: operating system, system software, RDBMS, middleware, transaction processing monitors (e.g. CICS), application servers, utilities and tools. It does not cover the installation and support of business or end-user applications that utilise the underlying platform The management and administration of the environment, including the day to day management of resources, including personnel, dedicated to the Mainframe environment FIGS. 19-20 illustrate the cost pools 1900 and cost drivers 2000 for including in a storage technology tower in accordance with at least one of the various embodiments. In at least one of the various embodiments. The Storage tower covers the provision of centrally managed storage services across all tiers and technologies. It includes archive, backup and restore and disaster recovery. The scope for this tower includes all personnel activities, hardware, software, outside services and facilities and power to build, manage, and run an enterprise storage environment. These may include:

SAN infrastructure
Tiered disk (all tiers)
Virtual tape
Tape (all technologies, including ATL ald manual tape)
Planning and design, including capacity planning of storage
Operational and support activities (including second level support)
Server backup and restore
Central archiving
Disaster recovery FIGS. 21-26 illustrate the cost pools and cost drivers for an end-users services technology tower in accordance with at least one of the various embodiments. In at least one of the various embodiments, end user services technology tower represents the provisioning of services to end user computing devices, including desktop PCs, laptops, thin clients, virtual desktop, tablets and mobile devices. It includes support for end users, maintenance of devices, Email services and Office applications. It also includes the IT Service Desk tower.

FIGS. 21-22 illustrate the cost pools 2100 and cost drivers 2200 for including in a client devices sub-tower for an end-user services technology tower in accordance with at least one of the various embodiments. In at least one of the various embodiments, this tower covers the provisioning of End User Computing (EUC) devices, including virtualized desktops, on PCs, laptops, thin clients, tablets, mobile devices and local printers. Devices supported under Bring Your Own Device programs may also be included if they utilize resources or support of the EUC function. In addition to the build and deployment of EUC devices, software services are included for operating system, collaboration tools and office applications. In at least one of the various embodiments, the provisioning of application servers, LAN infrastructure, central storage or business applications may be excluded in this tower.

The scope of this tower may include:
Office applications and office application support
Collaboration applications (e.g. SharePoint)
EUC planning and design
Moves/Adds/Changes
EUC software distribution
EUC hardware maintenance
Infrastructure server administration (e.g. DHCP server administration, print queue handling etc.)
Desktop backup and restore
End user training (excluding training on business applications)

Figure 23:

FIGS. 23-24 illustrate the cost pools 2300 and cost drivers 2400 for including in a email devices sub-tower for an end-user services technology tower in accordance with at least one of the various embodiments. In at least one of the various embodiments, this tower includes all software, personnel and outside services associated with the provisioning of Email services for end users. It does not include the costs for hardware platforms that host Email servers as this should be included in the appropriate Servers tower. Included costs are the Email server costs, client access licenses and any additional Email tools (spam filtering, content controls or specialist email archiving tools).

Figure 26:
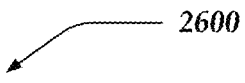

FIGS. 25-26 illustrate the cost pools 2500 and cost drivers 2600 for including in a service desk sub-tower for an end-user services technology tower in accordance with at least one of the various embodiments. In at least one of the various embodiments, the Service Desk tower covers the provisioning of central and local IT service desks. It may include first level contact, (including user self-service via web or email), and incident and problem management. Excluded is second-level support, (including desk-side support), third-level support or non-IT related service elements (e.g. HR and Finance functions). Hardware and software may be included where it is providing specific Service Desk functionality, for example Service Desk software systems, knowledgebase applications and so on.

FIGS. 27-34 illustrate the cost pools and cost drivers for a network technology tower in accordance with at least one of the various embodiments. In at least one of the various embodiments, the services grouped into the Network technology tower may include LAN, WAN, Voice and other network-related services (such as VPN provision or Network Security). In at least one of the various embodiments, costs associated with data or voice usage charges (e.g. per minute or per GB charges) should not be included in Network but they may be recorded as part of the Telecoms tower.

Figure 27:
Figure 28:
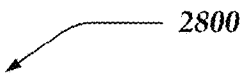

FIGS. 27-28 illustrate the cost pools 2700 and cost drivers 2800 for including in a LAN sub-tower for a network technology tower in accordance with at least one of the various embodiments. In at least one of the various embodiments, Local Area Network (LAN) is a short distance data communications network (typically within a building or campus) used to link computers and peripheral equipment under a form of standard control such as TCP/IP. Both wired and wireless LANs are within scope. It may include switches and routers in data centers that support data between servers and end user devices. It may exclude equipment for connecting mainframes, storage, and servers to each other, such as Storage Area Networks, Sysplex interconnectivity equipment, or backplanes in rack-mounted servers and blade servers.

Figure 30:

FIGS. 29-30 illustrate the cost pools 2900 and cost drivers 3000 for including in a WAN sub-tower for a network technology tower in accordance with at least one of the various embodiments. In at least one of the various embodiments, the Wide Area Network (WAN) may be the part of a data network that links different locations (e.g. beyond a metropolitan area). Hardware components may include routers, encryption modules, multiplexers (e.g. WDM, CWDM, DWDM), modems, packet switches (PSE), frame relay switches (FRSE), protocol converters, network management and monitoring systems. Software may include network system software, cryptography and protocol conversion; planning, inventory, documentation or administrative software. Note that charges for data or voice usage—i.e. carrier costs—are not included in this tower and are instead collected in the Telecoms tower.

FIGS. 31-32 illustrate the cost pools 3100 and cost drivers 3200 for including in a Voice sub-tower for a network technology tower in accordance with at least one of the various embodiments. In at least one of the various embodiments, the Voice technology tower service may include cost items related to basic voice telephony and associated services such as voicemail. Accordingly, it may include PBXs, Centrex services, call managers, and voice mail servers. A Voice technology tower may include the infrastructure for Voice over IP as well as 'classical' voice systems. The costs for voice handsets, including 'soft' phones for IP traffic may also be included within this scope. It may excludes call charges (transport) for cellular or mobile phones, pagers, and the voice facilities provided to a contact centre such as ACDs, IVR, or CTI.

FIGS. 33-34 illustrate the cost pools 3300 and cost drivers 3400 for including in an "other network" sub-tower for a network technology tower in accordance with at least one of the various embodiments. In at least one of the various embodiments, Network components not otherwise included in LAN/WAN/Voice sub-towers are collected in this tower. They may include:

Contact Center: includes the hardware and software assets used to support Business Contact Centers, along with the personnel effort needed to integrate, support, and manage the operation. These IT services go beyond a simple telephone and voicemail facility, and may include ACDs, Call Management Systems, Voice Recorders, Wall Boards/Flat Screens and IVR Network Security: includes the assets and effort concerned with managing the inbound and outbound traffic flow between external (i.e. untrusted) networks and the client internal network. This may include assuring that the client's network is kept secure. Examples of devices include firewalls, network security appliances, intrusion detection/prevention systems, load balancers (that terminate SSL tunnels), application delivery controllers and proxy servers. Broader IT Security Management policy making and day to day operations (such as password resets) may be excluded.

VPN/RAS: Virtual Private Network/Remote Access Services—remote network access technologies which provide users with access to the organisation's network from locations which are not permanently connected to the LAN. All specialist hardware, software (back-end and front-end) and personnel activities to provide this service are included. These activities are functionally different from Network Security, which ensures that users from other organisations can only access the network ports and protocols for which they have permission.

Cabling: includes the Passive Infrastructure that carries voice and data network traffic within a client's premises. It also includes the maintenance and repair of structured cabling systems (EIA/TIA 568 & 569). Do not include Active Infrastructure components such as switches, routes, firewalls etc. as they are included in other sections of the Network towers Telepresence: includes rooms permanently set up for Telepresence/Video conferencing. Telepresence conference rooms use state-of-the art room designs, video cameras, displays, sound-systems and processors, coupled with high-to-very-high capacity bandwidth transmissions—all of which should be included in this area.

FIG. 35 illustrate the cost pools 3500 and cost drivers 3502 for including in a telecoms technology tower in accordance with at least one of the various embodiments. In at least one of the various embodiments, telecoms technology tower may be used for the collection of carrier/telecoms costs, including fixed line costs, internet charges, and data and voice charges (including domestic and internal, fixed line and mobile). Charges for services such as MPLS, leased line, xDSL, IP VPN and other carrier service purchased from a telecoms service provider or ISP may be included. In at least one of the various embodiments, costs for hardware or software used to terminate lines for WAN or Voice services may be excluded.

FIGS. 36-37 illustrate the cost pools 3600 and cost drivers 3700 for including in an output management technology tower in accordance with at least one of the various embodiments. In at least one of the various embodiments, the Output Management technology tower may include the central print function, (including print to non-paper media), document output to fiche/DVD or other permanent storage medium, post-print processing (such as collation and binding), automatic enveloping and print dispatch (for example franking), or the like. It may exclude print to local (desktop or departmental) printers or the storage or archiving of non-document data.

FIGS. 38-43 illustrate the cost pools and cost drivers for an application management technology tower in accordance with at least one of the various embodiments. In at least one of the various embodiments, the Application Management technology tower area covers the development, deployment and support of business applications, including in-house developed, purchased/licensed commercial applications and Software as a Service. In at least one of the various embodiments, business applications may exclude standard office applications, general purpose utilities, operating system or infrastructure components or tools required to manage the IT environment.

Figure 39:

FIGS. 38-39 illustrate the cost pools 3800 and cost drivers 3900 for including in an application operation sub-tower for a application management technology tower in accordance with at least one of the various embodiments. In at least one of the various embodiments, this sub-tower covers the operational and support activities for deployed business applications. Operational activities may include recurring tasks such as managing batch cycles and scheduling, application and interface monitoring, application data operations user administration, application user master data maintenance, application role and rights management, application security monitoring, etc.). It does not include generic server operations activities at the operating system or application environment level (e.g. middleware) which are captured in the Mainframe or Server towers. Application support is defined as those second level support activities which are performed by applications support personnel rather than generic end user device or server support personnel. Fix-on-fail is also included in this tower—this covers activities performed by developers or development operations (DevOps) personnel to bug-fix, re-configure or alter the application so that it can continue to function in the event of application failure or outage.

FIGS. 40-41 illustrate the cost pools 4000 and cost drivers 4100 for including in an application development project sub-tower for a application management technology tower in accordance with at least one of the various embodiments. In at least one of the various embodiments, the in-house development of business applications, whether performed by on-shore/off-shore or internal/external personnel, may be captured in this tower. A software development life-cycle approach may be used to capture the effort (expressed as FTEs or project hours) it may comprise the following phases:

Analysis—Including feasibility studies and project initiation.
Design—including modelling
Development/Code—including developer unit test.
Test—including functional, integration, and user-acceptance testing.
Release Packaging—does not include deployment into production, which is normally part of the 'build' activity in Mainframe or Servers.

In addition to personnel effort, any costs of software tooling, including development environments, build tools, revision control systems, modeling tools etc. may also be included in this tower.

Figure 42:

FIGS. 42-43 illustrate the cost pools 4200 and cost drivers 4300 for including in a line-of-business software sub-tower for a application management technology tower in accordance with at least one of the various embodiments. In at least one of the various embodiments, business applications that are not developed internally may be recorded in this tower in three categories:

Software as a Service (SaaS)
Platform as a Service (PaaS)
Commercial Off The Shelf (COTS)

In the case of PaaS and COTS, personnel activity involved in customization or extending the purchased application/platform may be included in addition to the software licensing/usage costs.

Figure 44:

FIGS. 44-45 illustrate the cost pools 4400 and cost drivers 4500 for including in a projects technology tower in accordance with at least one of the various embodiments. In at least one of the various embodiments, "Change the business" projects may be included in the project technology tower. Normal operational projects ("Run the business"), for example migrating workstations from one location to another, deploying software upgrades or installing a new wireless access point, may be excluded. Examples of "change the business" projects include consolidating data centers, IT consolidation following mergers and acquisitions, migrating the business to a radically new software platform and similar high-risk, high-visibility activity. Activity may be recorded in three areas:

Plan

Implement

Manage

FIGS. 46-47 illustrate the cost pools 4600 and cost drivers 4700 for including in a cross-functional services technology tower in accordance with at least one of the various embodiments. In at least one of the various embodiments, this tower may include the costs and personnel performing IT functions which cut across platform and technology boundaries and which may be required to effectively run an IT organization. The specific areas included in this tower may comprise:

Vendor Management—The management of externally sourced IT contracts. It covers the governance of the contract and the relationship with the vendor only. It may exclude day-to-day operational management of an outsourcer delivering a service in one of the towers (e.g. managing externally hosted servers).

Service Continuity—This section analyses the resources which are reserved to ensure IT service continuity the event of a major incident or outage. For example the development of the overall corporate Service Continuity Plan. In at least one of the various embodiments, the cost of hardware or software assets which are reserved for use in the case of major outage (for example hot or cold standby servers) may be excluded because they may be included in the costs of the appropriate tower.

Security Policy—Security and information privacy policy, including the cost of running audits, should be included in this section. Costs for platform-specific security hardware or software, and any associated personnel activity, should be included in the appropriate tower—for example firewalls are included in Network, anti-virus software in Servers, spam filtering in Email etc.

Service and Account Management—This section covers the management of the interface between IT and its customers, whether they are tied business units, autonomous business units, or external consumers of IT services. This includes both sales and marketing of IT services, Service Level Management, and also maintenance of Service Level Agreements (SLAs).

Management Services—Includes senior management and administrative functions which span many IT disciplines. Examples include CIOs, CTOs, chiefs of staff, senior administrative assistants, executive and strategic management of the IT function, IT financial management (excluding processing/checking network invoices i.e. Telecom Expense Management), IT personnel and/or human resource administration, and purchasing/procurement functions. Contract management of IT outsourcers may be excluded.

What is claimed as new and desired to be protected by Letters Patent of the United States is:

1. A method for modeling cost items using a network computer, wherein the network computer includes one or more processors that execute instructions to perform actions, comprising:
   instantiating a budgeting and forecasting application, that performs actions, including:
      selecting template information that corresponds to a technology tower wherein the template information defines at least one cost item, at least one cost pool, one or more sub-towers, and one or more cost drivers, wherein at least one cost driver is an activity driver that corresponds to performance of an activity at a high cost relative to one or more other costs that correspond to one or more other cost drivers, and wherein each cost pool is arranged in a cost pool structure that is used for unified modeling of the technology tower, and wherein the unified modeling shares the technology tower with another application that integrates the unified modeling of the shared technology tower into a financial model for an organization;
      employing another network computer for an external data source to provide a dataset over the network to the network computer that is stored in a hardware datastore of the network computer;
      determining cost information from the dataset that is stored in a hardware datastore, wherein the cost information corresponds to the at least one cost item;
      mapping at least a portion of the cost information to the at least one cost pool based in part on the template information and a taxonomy for labor costs, wherein the taxonomy provides different sections with different scope for functions performed by internal labor that includes employees, and wherein a range of the functions include one or more of direct operational activities, support activities, management activities, and administration activities based on an arrangement of the technology tower;
      determining cost driver information for the at least activity driver based on the at least one portion of the cost information determined from the dataset;
      determining countable configuration features of the at least cost item that are included in the cost driver information, wherein the features include one or more of personnel counts that are either internal full-time equivalent personnel or external full-time equivalent personnel, or hour counts for either hours performed by internal personnel or hours performed by external personnel, and wherein the features of internal personnel counts include base salary costs, benefit costs, employment taxes, insurance costs, and costs for part time external personnel to cover absences for internal personnel, and wherein the features of external personnel counts include hourly wage costs, material costs, travel costs, and flat fee costs;
      generating the technology tower for the at least one cost item based on the at least one mapped cost pool and the at least one determined activity driver, wherein each generated technology tower represents one or more different categories of resources that includes one or more portions of the organization's one or more assets or services, wherein a cross functional services tower is separately generated for costs corresponding to costs and personnel performing Information Technology (IT) functions across boundaries in an organization that includes particular costs for management of services, comprising managing contracts with external providers, managing vendor relationships, managing senior management personnel and senior administrative functions, service continuity during an IT outage, and security and information policies for hardware and software;
      generating the one or more sub-towers, wherein the one or more sub-towers are included in the technology tower;
      allocating costs from one or more of the cost pools to cost items in the sub-tower; and
      determining one or more key performance indicators for the generated technology tower by dividing one or more of the cost pools with a value from the one or more cost drivers; and
   instantiating a modeling application to generate one or more financial data models of the at least one cost item that includes a generated technology tower model that is based on at least the generated technology tower and the one or more key performance indicators of the generated technology tower, wherein each generated technology tower model represents one or more different categories of resources.

2. The method of claim 1, further comprising, generating a key performance indicator based on the at least one cost pool and the at least one activity driver.

3. The method of claim 1, wherein generating the technology tower, further comprises, generating a plurality of sub-towers for inclusion in the technology tower.

4. The method of claim 1, wherein mapping the at least a portion of the cost information to the at least one cost pool, further comprises, mapping hardware costs and software costs to the at least one cost pool, wherein the hardware costs and the software costs are separated into at least purchase costs, lease costs, and maintenance costs.

5. The method of claim 1, wherein mapping the at least portion of the cost information to the at least one cost pool, further comprises:
   determining the labor costs based on one or more full-time equivalents or a count of hours; and
   mapping the labor costs to at least one cost pool, wherein the labor costs are separated into at least internal labor costs and external labor costs.

6. The method of claim 1, wherein determining the cost driver information for the at least one activity driver, further comprises, determining at least one countable configuration feature of the at least one cost item.

7. The method of claim 1, wherein determining the cost driver information for the at least one activity driver, further comprises, determining at least personnel counts associated with the at least one cost item, wherein the at least personnel counts are separated into at least internal full-time equivalents (FTEs) and external FTEs.

8. The method of claim 1, further comprising, modifying the at least one cost pool, or the at least one activity driver based on at least a portion of business information that is separate from the dataset.

9. A system for modeling cost items, comprising:
   a network computer, including:
      a transceiver that communicates over the network;
      a memory that stores at least instructions;
      a processor device that executes instructions that enable actions, including:
         instantiating a budgeting and forecasting application, that performs actions, including:

selecting template information that corresponds to a technology tower wherein the template information defines at least one cost item, at least one cost pool, one or more sub-towers, and one or more cost drivers, wherein at least one cost driver is an activity driver that corresponds to performance of an activity at a high cost relative to one or more other costs that correspond to one or more other cost drivers, and wherein each cost pool is arranged in a cost pool structure that is used for unified modeling of the technology tower, and wherein the unified modeling shares the technology tower with another application that integrates the unified modeling of the shared technology tower into a financial model for an organization;

employing another network computer for an external data source to provide a dataset over the network to the network computer that is stored in a hardware datastore of the network computer;

determining cost information from the dataset that is stored in a hardware datastore, wherein the cost information corresponds to the at least one cost item;

mapping at least a portion of the cost information to the at least one cost pool based in part on the template information and a taxonomy for labor costs, wherein the taxonomy provides different sections with different scope for functions performed by internal labor that includes employees, and wherein a range of the functions include one or more of direct operational activities, support activities, management activities, and administration activities based on an arrangement of the technology tower;

determining cost driver information for the at least activity driver based on the at least one portion of the cost information determined from the dataset;

determining countable configuration features of the at least cost item that are included in the cost driver information, wherein the features include one or more of personnel counts that are either internal full-time equivalent personnel or external full-time equivalent personnel, or hour counts for either hours performed by internal personnel or hours performed by external personnel, and wherein the features of internal personnel counts include base salary costs, benefit costs, employment taxes, insurance costs, and costs for part time external personnel to cover absences for internal personnel, and wherein the features of external personnel counts include hourly wage costs, material costs, travel costs, and flat fee costs;

generating the technology tower for the at least one cost item based on the at least one mapped cost pool and the at least one determined activity driver, wherein each generated technology tower represents one or more different categories of resources, wherein a cross functional services tower is separately generated for costs corresponding to costs and personnel performing Information Technology (IT) functions across boundaries in an organization that includes particular costs for management of services, comprising managing contracts with external providers, managing vendor relationships, managing senior management personnel and senior administrative functions, service continuity during an IT outage, and security and information policies for hardware and software;

generating the one or more sub-towers, wherein the one or more sub-towers are included in the technology tower;

allocating costs from one or more of the cost pools to cost items in the sub-tower; and determining one or more key performance indicators for the generated technology tower by dividing one or more of the cost pools with a value from the one or more cost drivers; and instantiating a modeling application to generate one or more financial data models of the at least one cost item that includes a generated technology tower model that is based on at least the generated technology tower and the one or more key performance indicators of the generated technology tower, wherein each generated technology tower model represents one or more different categories of resources that includes one or more portions of the organization's one or more assets or services; and a client computer, including:
a transceiver that communicates over the network;
a memory that stores at least instructions;
a processor device that executes instructions that enable actions, including:
providing business information to the network computer; and
displaying a report related to the one or more generated financial data models.

10. The system of claim 9, wherein the processor device of the network computer enables actions, further comprising, generating a key performance indicator based on the at least one cost pool and the at least one activity driver.

11. The system of claim 9, wherein generating the technology tower, further comprises, generating a plurality of sub-towers for inclusion in the technology tower.

12. The system of claim 9, wherein mapping the at least a portion of the cost information to the at least one cost pool, further comprises, mapping hardware costs and software costs to the at least one cost pool, wherein the hardware costs and the software costs are separated into at least purchase costs, lease costs, and maintenance costs.

13. The system of claim 9, wherein mapping the at least portion of the cost information to the at least one cost pool, further comprises:
determining the labor costs based on one or more full-time equivalents or a count of hours; and
mapping the labor costs to at least one cost pool, wherein the labor costs are separated into at least internal labor costs and external labor costs.

14. The system of claim 9, wherein determining the cost driver information for the at least one activity driver, further comprises, determining at least one countable configuration feature of the at least one cost item.

15. The system of claim 9, wherein determining the cost driver information for the at least one activity driver, further comprises, determining at least personnel counts associated with the at least one cost item, wherein the at least personnel counts are separated into at least internal full-time equivalents (FTEs) and external FTEs.

16. The system of claim 9, wherein the processor device of the network computer enables actions, further comprising, modifying the at least one cost pool, or the at least one activity driver based on at least a portion of business information that is separate from the dataset.

17. A processor readable non-transitory storage media that includes instructions for modeling cost items using a network computer, wherein the network computer that executes at least a portion of the instructions enables operations, comprising:

instantiating a budgeting and forecasting application, that performs actions, including:

selecting template information that corresponds to a technology tower wherein the template information defines at least one cost item, at least one cost pool, one or more sub-towers, and one or more cost drivers, wherein at least one cost driver is an activity driver that corresponds to performance of an activity at a high cost relative to one or more other costs that correspond to one or more other cost drivers, and wherein each cost pool is arranged in a cost pool structure that is used for unified modeling of the technology tower, and wherein the unified modeling shares the technology tower with another application that integrates the unified modeling of the shared technology tower into a financial model for an organization;

employing another network computer for an external data source to provide a dataset over the network to the network computer that is stored in a hardware datastore of the network computer;

determining cost information from the dataset that is stored in a hardware datastore, wherein the cost information corresponds to the at least one cost item;

mapping at least a portion of the cost information to the at least one cost pool based in part on the template information and a taxonomy for labor costs, wherein the taxonomy provides different sections with different scope for functions performed by internal labor that includes employees, and wherein a range of the functions include one or more of direct operational activities, support activities, management activities, and administration activities based on an arrangement of the technology tower;

determining cost driver information for the at least activity driver based on the at least one portion of the cost information determined from the dataset;

determining countable configuration features of the at least cost item that are included in the cost driver information, wherein the features include one or more of personnel counts that are either internal full-time equivalent personnel or external full-time equivalent personnel, or hour counts for either hours performed by internal personnel or hours performed by external personnel, and wherein the features of internal personnel counts include base salary costs, benefit costs, employment taxes, insurance costs, and costs for part time external personnel to cover absences for internal personnel, and wherein the features of external personnel counts include hourly wage costs, material costs, travel costs, and flat fee costs;

generating the technology tower for the at least one cost item based on the at least one mapped cost pool and the at least one determined activity driver, wherein each generated technology tower represents one or more different categories of resources that includes one or more portions of the organization's one or more assets or services, wherein a cross functional services tower is separately generated for costs corresponding to costs and personnel performing Information Technology (IT) functions across boundaries in an organization that includes particular costs for management of services, comprising managing contracts with external providers, managing vendor relationships, managing senior management personnel and senior administrative functions, service continuity during an IT outage, and security and information policies for hardware and software;

generating the one or more sub-towers, wherein the one or more sub-towers are included in the technology tower;

allocating costs from one or more of the cost pools to cost items in the sub-tower; and determining one or more key performance indicators for the generated technology tower by dividing one or more of the cost pools with a value from the one or more cost drivers; and instantiating a modeling application to generate one or more financial data models of the at least one cost item that includes a generated technology tower model that is based on at least the generated technology tower and the one or more key performance indicators of the generated technology tower, wherein each generated technology tower model represents one or more different categories of resources.

18. The media of claim 17, further comprising, generating a key performance indicator based on the at least one cost pool and the at least one activity driver.

19. The media of claim 17, wherein generating the technology tower, further comprises, generating a plurality of sub-towers for inclusion in the technology tower.

20. The media of claim 17, wherein mapping the at least a portion of the cost information to the at least one cost pool, further comprises, mapping hardware costs and software costs to the at least one cost pool, wherein the hardware costs and the software costs are separated into at least purchase costs, lease costs, and maintenance costs.

21. The media of claim 17, wherein mapping the at least portion of the cost information to the at least one cost pool, further comprises:

determining the labor costs based on one or more full-time equivalents or a count of hours; and mapping the labor costs to at least one cost pool, wherein the labor costs are separated into at least internal labor costs and external labor costs.

22. The media of claim 17, wherein determining the cost driver information for the at least one activity driver, further comprises, determining at least one countable configuration feature of the at least one cost item.

23. The media of claim 17, wherein determining the cost driver information for the at least one activity driver, further comprises, determining at least personnel counts associated with the at least one cost item, wherein the at least personnel counts are separated into at least internal full-time equivalents (FTEs) and external FTEs.

24. The media of claim 17, further comprising, modifying the at least one cost pool, or the at least one activity driver based on at least a portion of business information that is separate from the dataset.

25. A network computer for modeling cost items, comprising:
a transceiver that communicates over the network;
a memory that stores at least instructions;
a processor device that executes instructions that enable actions, including:
instantiating a budgeting and forecasting application, that performs actions, including:
selecting template information that corresponds to a technology tower wherein the template information defines at least one cost item, at least one cost pool, one or more sub-towers, and one or more cost drivers, wherein at least one cost driver is an activity driver that corresponds to performance of an activity at a high cost relative to one or more other costs that correspond to one or more other cost drivers, and wherein each cost pool is arranged in a cost pool structure that is used for unified modeling of the technology tower, and wherein the unified modeling shares the technology tower with another application that integrates the unified modeling of the shared technology tower into a financial model for an organization;
employing another network computer for an external data source to provide a dataset over the network to the network computer that is stored in a hardware datastore of the network computer;
determining cost information from the dataset that is stored in a hardware datastore, wherein the cost information corresponds to the at least one cost item;
mapping at least a portion of the cost information to the at least one cost pool based in part on the template information and a taxonomy for labor costs, wherein the taxonomy provides different sections with different scope for functions performed by internal labor that includes employees, and wherein a range of the functions include one or more of direct operational activities, support activities, management activities, and administration activities based on an arrangement of the technology tower;
determining cost driver information for the at least activity driver based on the at least one portion of the cost information determined from the dataset;
determining countable configuration features of the at least cost item that are included in the cost driver information, wherein the features include one or more of personnel counts that are either internal full-time equivalent personnel or external full-time equivalent personnel, or hour counts for either hours performed by internal personnel or hours performed by external personnel, and wherein the features of internal personnel counts include base salary costs, benefit costs, employment taxes, insurance costs, and costs for part time external personnel to cover absences for internal personnel, and wherein the features of external personnel counts include hourly wage costs, material costs, travel costs, and flat fee costs;
generating the technology tower for the at least one cost item based on the at least one mapped cost pool and the at least one determined activity driver, wherein each generated technology tower represents one or more different categories of resources, wherein a cross functional services tower is separately generated for costs corresponding to costs and personnel performing Information Technology (IT) functions across boundaries in an organization that includes particular costs for management of services, comprising managing contracts with external providers, managing vendor relationships, managing senior management personnel and senior administrative functions, service continuity during an IT outage, and security and information policies for hardware and software;
generating the one or more sub-towers, wherein the one or more sub-towers are included in the technology tower;
allocating costs from one or more of the cost pools to cost items in the sub-tower; and
determining one or more key performance indicators for the generated technology tower by dividing one or more of the cost pools with a value from the one or more cost drivers; and
instantiating a modeling application to generate one or more financial data models of the at least one cost item that includes a generated technology tower model that is based on at least the generated technology tower and the one or more key performance indicators of the generated technology tower, wherein each generated technology tower model represents one or more different categories of resources that includes one or more portions of the organization's one or more assets or services.

26. The network computer of claim 25, wherein the processor device enables actions further comprising, generating a key performance indicator based on the at least one cost pool and the at least one activity driver.

27. The network computer of claim 25, wherein mapping the at least a portion of the cost information to the at least one cost pool, further comprises, mapping hardware costs and software costs to the at least one cost pool, wherein the hardware costs and the software costs are separated into at least purchase costs, lease costs, and maintenance costs.

28. The network computer of claim 25, wherein mapping the at least portion of the cost information to the at least one cost pool, further comprises:
determining the labor costs based on one or more full-time equivalents or a count of hours; and
mapping the labor costs to at least one cost pool, wherein the labor costs are separated into at least internal labor costs and external labor costs.

29. The network computer of claim 25, wherein determining the cost driver information for the at least one activity driver, further comprises, determining at least one countable configuration feature of the at least one cost item.

30. The network computer of claim 25, wherein determining the cost driver information for the at least one activity driver, further comprises, determining at least personnel counts associated with the at least one cost item, wherein the at least personnel counts are separated into at least internal full-time equivalents (FTEs) and external FTEs.

* * * * *